United States Patent
Fu et al.

(10) Patent No.: US 11,678,011 B1
(45) Date of Patent: Jun. 13, 2023

(54) MOBILE DISTRIBUTED SECURITY RESPONSE

(71) Applicant: Kuna Systems Corporation, San Bruno, CA (US)

(72) Inventors: Sai-Wai Fu, Los Altos, CA (US); Ognian Mitzev, San Ramon, CA (US); Harold Sampson, Sunnyvale, CA (US); Murali Sharma, Walnut Creek, CA (US)

(73) Assignee: KUNA SYSTEMS CORPORATION, San Mateo, CA (US)

( * ) Notice: Subject to any disclaimer, the term of this patent is extended or adjusted under 35 U.S.C. 154(b) by 230 days.

(21) Appl. No.: 17/164,595

(22) Filed: Feb. 1, 2021

Related U.S. Application Data

(63) Continuation-in-part of application No. 16/850,944, filed on Apr. 16, 2020, now Pat. No. 11,195,398, and a continuation-in-part of application No. 16/792,642, filed on Feb. 17, 2020, now abandoned.

(60) Provisional application No. 62/969,400, filed on Feb. 3, 2020, provisional application No. 62/961,401, filed on Jan. 15, 2020, provisional application No. 62/835,167, filed on Apr. 17, 2019.

(51) Int. Cl.
| | |
|---|---|
| *H04N 21/44* | (2011.01) |
| *H04N 21/4385* | (2011.01) |
| *G06F 3/04842* | (2022.01) |
| *H04N 21/431* | (2011.01) |
| *H04N 21/485* | (2011.01) |

(52) U.S. Cl.
CPC ......... *H04N 21/44* (2013.01); *G06F 3/04842* (2013.01); *H04N 21/431* (2013.01); *H04N 21/4385* (2013.01); *H04N 21/4858* (2013.01)

(58) Field of Classification Search
CPC .............. H04N 21/431; H04N 21/8549; H04N 21/21805
See application file for complete search history.

(56) References Cited

U.S. PATENT DOCUMENTS

| | | | | |
|---|---|---|---|---|
| 6,031,573 | A * | 2/2000 | MacCormack | .. G08B 13/19673 348/E7.086 |
| 11,165,994 | B2 * | 11/2021 | Dedeoglu | ........ H04N 21/21805 |
| 2008/0084473 | A1 * | 4/2008 | Romanowich | ... G08B 13/19671 348/E7.086 |

(Continued)

*Primary Examiner* — Rowina J Cattungal
(74) *Attorney, Agent, or Firm* — Christopher P. Maiorana, PC

(57) ABSTRACT

The invention concerns a video feed monitoring app configured to be implemented with an interface and a processor. The interface may be configured to receive requests from an operator and present visual content to a display. The processor may be configured to process the requests and update the display. The video feed monitoring app may be configured to receive video streams from smart security devices, receive a priority signal, select a subset of the video streams in response to the priority signal and a user preference and arrange the subset of the video streams on the display. The priority signal may be generated externally based on events detected. The subset of the video streams may be updated based on the priority signal. Updating the subset of the video streams may comprise displaying the video streams that comprise events and removing the video streams that do not comprise events.

20 Claims, 21 Drawing Sheets

(56) References Cited

U.S. PATENT DOCUMENTS

2018/0341705 A1\* 11/2018 Kim ................. H04N 21/23439
2019/0087646 A1\* 3/2019 Goulden .............. G06V 40/166
2021/0117691 A1\* 4/2021 Shen .................... G06F 16/785

\* cited by examiner

MOBILE DISTRIBUTED SECURITY RESPONSE

This application relates to U.S. Provisional Application No. 62/969,400, filed on Feb. 3, 2020. This application also relates to U.S. application Ser. No. 16/792,642, filed Feb. 17, 2020. This application also relates to U.S. application Ser. No. 16/850,944, filed on Apr. 16, 2020, which relates to U.S. Provisional Application No. 62/835,167, filed Apr. 17, 2019 and U.S. Provisional Application No. 62/961,401. Each of the mentioned applications are is hereby incorporated by reference in its entirety.

FIELD OF THE INVENTION

The invention relates to security video devices generally and, more particularly, to a method and/or apparatus for implementing a mobile distributed security response.

BACKGROUND

Video surveillance is commonly used for security. Conventional security systems record video, often as a looped recording. The video footage can be reviewed later after an incident occurs, if the looped recording has not overwritten the particular incident. However, reviewing a recording of an incident after the incident has occurred does not offer a preventative measure.

Some conventional security systems are provided by deploying cameras on-site at the premises to be secured. The live video feed is piped from all the cameras to a centralized command center. At the command center, a human scans multiple video screens (i.e., a security guard stationed at in the lobby of an apartment building). Each video screen displays one of the video feeds. In order to catch an incident in progress, the security guard or security personnel has to monitor each of the video feeds simultaneously. When one of the video feeds catches the attention of the security guard or security personnel (e.g., with an unusual event), then the security guard or security personnel can investigate or dispatch a mobile patrol unit for further investigation. However, if the event does not catch the attention of the security guard or security personnel, the event might go unnoticed.

It would be desirable to implement a mobile distributed security response.

SUMMARY

The invention concerns a video feed monitoring app configured to be implemented with a user interface and a processor. The user interface may be configured to enable interaction with an operator, the interaction comprises receiving requests from the operator and presenting visual content to a display. The processor may be configured to process the requests received from the interface and update the display. The video feed monitoring app may be configured to receive a plurality of video streams from one or more smart security devices, receive a priority signal, select a subset of the plurality of video streams in response to the priority signal and a user preference and arrange the subset of the video streams on the display. The priority signal may be generated externally from the video feed monitoring app based on events detected. The subset of the video streams may be updated based on the priority signal. Updating the subset of the video streams may comprise displaying the video streams that comprise the events and removing the video streams that do not comprise the events.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
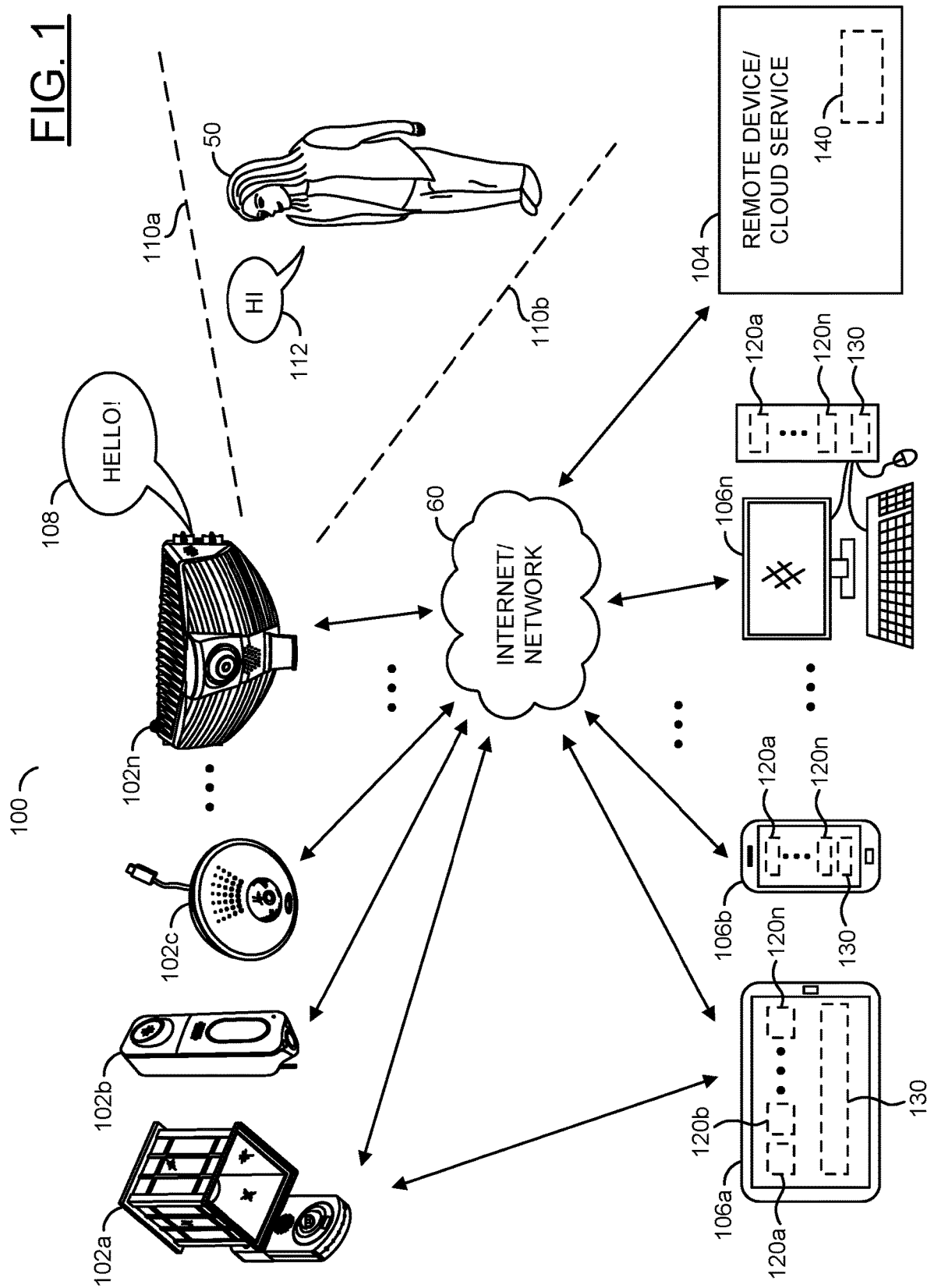
FIG. 1 is a diagram illustrating a system configured to implement mobile distributed security.

Embodiments of the present invention include providing mobile distributed security response that may (i) reduce dependency on human alertness, (ii) increase a number of cameras a person can monitor, (iii) simultaneously analyze video streams, report events and record video, (iv) schedule patrol cars, (v) intelligently select video streams to display to a user, (vi) display video streams from a particular group of cameras, (viii) reduce network bandwidth by only communicating selected video streams, (ix) learn which events to select based on human feedback and/or (x) be implemented as one or more integrated circuits.

Embodiments of the present invention may be configured to implement an artificial intelligence (AI)-based security monitoring service. The AI-based security monitoring service may be implemented using mobile devices in order to replace or improve traditional security command centers (e.g., centralized video monitoring of security cameras). The AI-Based security monitoring service (mobile or not) may make any monitoring personnel many times more efficient. Implementing the AI-based security monitoring service using mobile devices may enable a distributed video surveillance configured to efficiently focus attention on real incidents. Focusing attention on incidents may enable a dramatic reduction in response time to security threats.

The mobile distributed security service may enable security monitoring to be independent from human alertness to catching motion (e.g., noticing an event in real-time when viewing multiple video feeds). The mobile distributed security service may enable a human operator (e.g., a security guard or security personnel) to manage viewing multiple video feeds simultaneously. The AI-based security monitoring may focus attention to particular video feeds based on the current contents of each video feed to enable an operator to handle monitoring a large number of surveillance cameras without missing an event because focus was elsewhere.

By guiding the focus of the human operator to video feeds that comprise a detected event, the operator may react to deter the event from continuing. For example, a delay time between the detection of the event and dispatching a mobile patrol unit to a particular location (or premises) may be reduced (e.g., prevent security guards or security personnel from arriving at the scene too late). In some embodiments, the AI-based security monitoring service may track the locations of security guards or security personnel in real-time to enable the operator to quickly choose the closest patrol unit to the incident to respond. The AI-based security monitoring service (mobile or not) may be used by both security guards and monitoring personnel in command centers or distributed home offices. It makes monitoring personnel many times more efficient in live monitoring cameras.

Embodiments of the present invention may comprise a combination of hardware (e.g., to detect events) and a companion application to view multiple video feeds. The companion app may be developed for mobile devices (e.g., tablets, laptops, smart phones, etc.). The companion app may be configured to enable an operator to engage directly with events and/or respond promptly. The features in the hardware deployed at a particular location (e.g., customer premises) and/or cloud-based services may be configured to send and/or receive information from the companion application.

Embodiments of the present invention may be implemented on a mobile device to enable the display of various video feeds displayed in an intelligently selected arrangement. In one example, the arrangement of the video feeds may be a 3×3 grid of video feeds, with the displayed video feeds chosen by the AI as the video feeds that warrant further attention from the operator. In another example, one or more of the video feeds may be pinned to particular locations to enable some video feeds to have permanent attention. The AI-based mobile security service may exchange which of the video feeds are displayed and/or the format (e.g., size and/or location) of the display of the video feeds in order to increase a priority of attention to particular video feeds and deprecate the priority of other video feeds.

In some embodiments, the AI-based mobile security service may automatically play a series of customized alerts using the smart security cameras at the location that the video is captured such as warning messages with increasing severity (e.g., loudness, sirens, flashing strobe lights, etc.). Real-time communication and/or real-time interaction using the smart security cameras may be enabled (e.g., enabling an operator to select which actions to perform). Real-time communication may enable continual engagement with a potential intruder until a patrol service arrives on-scene. The AI-based mobile security service may be configured to calculate the most appropriate patrol to go to the site, and inform of the status of the intervention to all other patrol units. In addition, the system may automatically record events for evidentiary purposes as well as store recording with metadata about the events, allowing for automated searching and display capabilities.

Embodiments of the present invention may enable surveillance systems to be effective regardless of human alertness. Human attention may be directed to subtle incidents. Intelligently selecting which video feeds to display at a particular time may enable the human operator to monitor a higher number of cameras without missing events than if the human operator had to monitor each camera video feed simultaneously. The AI may simultaneously investigate all cameras, and generate reports on all events to all mobile units, and store recordings. By actively monitoring for events, potential security incidents may be deterred to prevent an event from continuing by progressively generating more severe automated messages and signals, and live engagement.

The intelligent selection of the video feeds to display may select all cameras in a certain group at a certain site, or all cameras at a site. The display of the video feeds may be scheduled (e.g., displaying and monitoring only a desired set of cameras during a particular time period). Compared to displaying all video feeds simultaneously, network bandwidth consumption may be reduced since only a few video streams may be watched by human eyes at any one time. Instead of full video streams, thumbnail updates (e.g., images sent at a lower framerate than the framerate of the video stream) for streams that are determined to not need continual attention may be presented.

Human operators may provide feedback about the video feeds selected and/or the patrol unit routes selected. The feedback may be used as negative or positive feedback to train the AI to improve results. The feedback may be specific to each camera and/or each operator. While embodiments of the present invention may be described in association with mobile devices, a stationary device such as computers at a central dispatching facility may be implemented. For example, for a central monitoring station with more display space available (e.g., multiple computer monitors instead of a tablet computing device), the views from more than one tablet computing device may be projected onto the larger display space (e.g., allowing more feeds to be displayed at one time and/or providing larger views of particular feeds than would be available on a smaller screen).

Fewer human operators may be able to monitor a greater amount of video feeds compared to displaying all video feeds simultaneously. The intelligent selection of automated responses for the smart security cameras to perform may enable a reduction in patrol staff for physical intervention. For example, physical presence by security personnel may be used as a last resort. Active engagement of events may talk down potential intruders and/or vandals, which may further reduce costs incurred by property owners.

Referring to FIG. 1, a diagram illustrating a system configured to implement mobile distributed security is shown. A system 100 is shown. The system 100 may comprise a visitor 50, a network 60, a number of blocks (or circuits) 102a-102n, a block (or circuit) 104 and a number of blocks (or circuits) 106a-106n. The visitor 50 may be a visitor to a premises, a property owner, an employee, etc. The network 60 may be a local network and/or a wide area network (e.g., the internet). The circuits 102a-102n may implement devices. In one example, each of the devices may implement one or more sensors. In another example, each of the devices 102a-102n may implement a smart security camera. In yet another example, the devices 102a-102n may implement an outdoor hub for outdoor internet-of-things (IoT) devices. The circuit 104 may implement a remote device and/or cloud service. The circuits 106a-106n may implement user devices. The system 100 may comprise other components (not shown). The number, type and/or implementation of the components of the system 100 may be varied according to the design criteria of a particular implementation.

The smart devices 102a-102n may implement smart security devices. In the example shown, the smart device 102a may be a smart security light, the smart device 102b may be a smart security doorbell, the smart device 102c may be a smart security camera and the smart device 102n may be a smart security camera floodlight. The smart devices 102a-102n may be implemented at a single location (e.g., at one property) and/or at multiple locations (e.g., at multiple properties such as security for a neighborhood).

The smart security devices 102a-102n may each comprise various sensors. The smart devices 102a-102n may be configured to read sensor data from the sensors to make inferences about the environment. In one example, one of the sensors implemented by the smart devices 102a-102n may be a camera sensor.

Camera sensors implemented by the smart devices 102a-102n may be configured to enable video frames to be generated (e.g., convert light input to raw pixel data that may be used by a processor to generate video frames). The smart devices 102a-102n may be configured to perform video analysis (e.g., object detection, behavior detection, facial recognition, object classification, conduct inferences against a machine learning model, etc.). In one example, each of the smart devices 102a-102n may implement on-board artificial intelligence configured to interpret the video frames, determine characteristics of objects in the video frames and communicate the data in a format that may be stored and/or read by the remote device 104 and/or the user devices 106a-106n and/or used to select a reaction by one or more of the smart devices 102a-102n.

The smart devices 102a-102n may each implement a wireless module. The wireless modules may enable the smart devices 102a-102n to communicate wirelessly (e.g., using Wi-Fi, ZigBee, Bluetooth, LTE, etc.) via the internet 60 and/or a local connection. In the example shown, the smart device 102a may communicate directly with the user device 106a (e.g., a device-to-device connection, such as Bluetooth). The wireless communication capability may enable the smart devices 102a-102n to operate as a hub for a variety of network-connected devices. For example, the network-connected devices may communicate directly with the smart devices 102a-102n on a local network and the smart devices 102a-102n may communicate information from the network-connected devices to the remote device 104 via the internet 60.

The smart devices 102a-102n may be configured to communicate the sensor data and/or the inferences made in response to performing sensor fusion operations on the sensor data to the remote device 104 and/or the user devices 106a-106n via the network 60. The smart devices 102a-102n may operate independently of the network 60 (e.g., without instructions from the remote device 104 and/or the user devices 106a-106n). Communication with the remote device 104 and/or the user devices 106a-106n may enhance the capabilities of the smart devices 102a-102n. In one example, the processing capabilities of the remote device 104 may enable faster and/or more detailed video analysis of the video frames and/or audio data captured by the smart devices 102a-102n. In another example, the remote device 104 may enable greater storage capacity than is available on the smart devices 102a-102n.

The remote device 104 may be configured to provide processing and/or mass storage for the system 100. Generally, the remote device 104 may be located off-site from the smart devices 102a-102n. The remote device 104 may be configured to store data, retrieve and transmit stored data, process data and/or communicate with other devices. The remote device 104 may be implemented as part of a cloud computing platform (e.g., distributed computing). In an example, the remote device 104 may be implemented as a group of cloud-based, scalable server computers. By implementing a number of scalable servers, additional resources (e.g., power, processing capability, memory, etc.) may be available to process and/or store variable amounts of data. For example, the remote device 104 may be configured to scale (e.g., provision resources) based on demand. The remote device 104 may implement scalable computing (e.g., cloud computing). The scalable computing may be available as a service to allow access to processing and/or storage resources without having to build infrastructure (e.g., the provider of the system 100 may not have to build the infrastructure of the remote device 104). In the example shown, the remote device 104 is shown as a single block. However, the remote device 104 may be implemented as several computing devices (e.g., servers) located in many different locations.

In some embodiments, the video analysis and/or audio analysis may be performed by a processor implemented by the smart devices 102a-102n (e.g., local inferencing performed by an edge device). For example, the smart devices 102a-102n may implement a machine learning model configured to run on a low-powered and/or low-resource device such as the smart devices 102a-102n. In some embodiments, the smart devices 102a-102n may be configured to generate the video frames and capture the audio input and upload the video frames and audio input to the remote device 104. The remote device 104 may perform the video analysis and/or the audio analysis (e.g., inferencing performed remotely by a cloud processing service). For example, the remote device 104 may comprise high-powered and/or have access to more computing resources in order to implement the machine learning model. The remote device 104 may generate results based on the video analysis and/or the audio analysis and the results may be transmitted to the smart devices 102a-102n.

The user devices 106a-106n may enable a user to send and/or receive information to/from the smart devices 102a-

102*n*. The user devices 106*a*-106*n* may provide a graphical user interface to enable a property owner (or another authorized person) to interact with the smart devices 102*a*-102*n* (e.g., a companion app). In an example, the graphical user interface of the user devices 106*a*-106*n* may be used to adjust the settings of the various sensors implemented by the smart devices 102*a*-102*n*. In another example, the companion app may provide an interface to provide a schedule to control greetings output by the smart devices 102*a*-102*n*. In yet another example, the companion app may be used to enable 2-way audio between the visitor 50 and the property owner (e.g., without having to be physically near each other).

The user devices 106*a*-106*n* may be configured to communicate with the remote device 104. For example, the user devices 106*a*-106*n* may be configured to retrieve video data and/or audio data stored by the remote device 104. The user devices 106*a*-106*n* may be configured to receive notifications from the smart devices 102*a*-102*n* and/or the remote device 104. In one example, the notification may be a message that indicates that the sensors of the smart devices 102*a*-102*n* have detected an object (e.g., a person).

The user devices 106*a*-106*n* may be implemented as portable devices configured to display graphics (e.g., text, interfaces, video, etc.), communicate audio (e.g., send and receive audio) and/or communicate with a network (wired or wirelessly). In some embodiments, one or more of the user devices 106*a*-106*n* may be implemented as a smartphone, a smart watch, a tablet computing device, a phablet, a desktop computer, a laptop computer, a netbook, etc. The user devices 106*a*-106*n* may be configured to execute instructions to provide the companion app that enables and/or facilitates communication between the user devices 106*a*-106*n* and the smart devices 102*a*-102*n*. The type of devices implemented as the user devices 106*a*-106*n* may be varied according to the design criteria of a particular implementation.

A speech bubble 108 is shown. The speech bubble 108 may be an audio message generated by the smart devices 102*a*-102*n*. In the example shown, the audio message 108 may be a greeting generated in response to the detected visitor 50. The smart devices 102*a*-102*n* may comprise an audio output device (e.g., an audio processor and/or a speaker) to generate audio and/or the speech 108. In the example shown, the visitor 50 may be an object detected based on the video analysis of the video frames. In one example, the audio message 108 may be intelligently selected by each of the smart devices 102*a*-102*n* in response to the visitor 50, characteristics of the visitor 50 and/or behavior of the visitor 50. In another example, the audio message 108 may be real-time two-way communication to enable a remote operator to speak from another location using the smart devices 102*a*-102*n*. The smart devices 102*a*-102*n* may be configured to use artificial intelligence to generate context-relevant speech (e.g., select an appropriate greeting when the visitor 50 is detected, a personalized greeting when a resident is detected, delivery instructions when a package is detected, an appropriate audio reaction to sounds made by the visitor 50, etc.). The smart devices 102*a*-102*n* may be configured to implement sensor fusion to make inferences based on various sensor readings. The sensor fusion may enable inferences to be made by combining sensor readings from disparate sources that would not be able to be determined from reading one of the sensor readings alone. Implementing the sensor fusion may enable the smart devices 102*a*-102*n* to implement a conversational artificial intelligence.

Dotted lines 110*a*-110*b* are shown. The dotted lines 110*a*-100*b* may represent a field of view of the camera implemented by the smart device 102*n*. The dotted lines 110*a*-110*b* are shown extending from the smart device 102*n*. However, the dotted lines 110*a*-110*b* may be a representative example of field of view of any one of the smart devices 102*a*-102*n*. The field of view 110*a*-110*b* may represent an area monitored by the smart devices 102*a*-102*n*. The field of view 110*a*-110*b* may capture the visitor 50. The smart devices 102*a*-102*n* may be configured perform video analysis on video frames to detect the visitor 50 and determine an identity of the visitor 50. For example, one or more features/characteristics (e.g., the face, the height, the gait, etc.) of the visitor 50 may be detected by the smart devices 102*a*-102*n* and compared with stored features/characteristics. The video analysis may be used to determine a classification and/or identification of the visitor 50 based on the object detected and/or the features/characteristics of the object.

A speech bubble 112 is shown. The speech bubble 112 may be a response from the visitor 50. In the example shown, the speech bubble 112 may be a vocal response to the audio message 108. In some embodiments, the speech bubble 112 may be a noise caused by the visitor 50 (e.g., breaking glass, knocking on a door, etc.). The smart devices 102*a*-102*n* may comprise an audio capture device (e.g., an audio processor and/or a microphone) configured to receive audio and/or the response 112. In the example shown, the visitor 50 may be an object detected based on the video analysis of the video frames. The audio input 112 may be received by the smart devices 102*a*-102*n*. The audio input 112 may be analyzed (e.g., audio analysis) in order to determine the content of the audio input 112. The content of the audio input 112 may be used to generate a context-appropriate reaction. Analyzing the audio input 112 may be part of the analysis of the response of the visitor 50 (e.g., the behavior of the visitor 50). The audio message 108, the response 112 and/or the reaction by the smart devices 102*a*-102*n* may be part of the active engagement implemented by the smart devices 102*a*-102*n*.

In some embodiments, the smart devices 102*a*-102*n* may be configured to perform the authentication of the visitor 50. In one example, the identification performed by the audio analysis may implement the authentication. Other sensors implemented by the smart devices 102*a*-102*n* may be configured to provide evidence and/or confidence for the authentication. For example, video analysis, voice detection, RFID, etc. may be implemented to perform the authentication. In some embodiments, the audio message 108 may be generated in response to the authentication (e.g., the authentication may provide the identity of the visitor 50, and the audio message 108 may be configured to greet the visitor 50 by name based on the identification).

The authentication may be configured to enable the smart devices 102*a*-102*n* to receive commands from the visitor 50. In one example, if the visitor 50 has been authenticated, the visitor 50 may provide voice-based commands (e.g., the audio input 112 may be the voice-based commands if the visitor 50 is authentication). For example, there may be a list of voice commands that property owners would like to have while outside the home. To enable voice commands outside the home, authentication may be implemented. With authentication, the voice commands may be configured to provide wireless control of various network-connected devices (e.g., door locks, garage door openers, outdoor lighting, keeping the devices quiet, arm/disarm door alarm systems, etc.). The smart devices 102*a*-102*n* may be configured to receive the commands, and then perform a functionality corresponding to the commands. The functionality corresponding to the received commands may be performed by one or more of the network-connected devices. The smart devices 102a-102n may communicate (e.g., wirelessly) the commands to the network-connected devices.

A robust and easy outdoor classification process may be implemented by the smart devices 102a-102n. The identification and/or classification may rely on two or more data points and/or signals (e.g., sensor fusion). Once visitors are authenticated (e.g., against a whitelist (or allow list) of approved visitors such as family and friends), other detected visitors may be considered 'unfamiliar' and/or 'unwanted' visitors.

The system 100 may be configured to provide a reaction to the visitor 50 detected, the classification detected and/or the behavior of the visitor 50 detected. The smart devices 102a-102n may implement a hub that provides a connection to the Internet (e.g., the network 60) and provides control to other network connected devices. For example, one or more of the smart devices 102a-102n may perform an authentication and initiate the reaction (e.g., a command) in response to a voice command The reaction may be initiated by controlling another network connected device such as a door lock. Generally, one or more of the smart devices 102a-102n and/or one or more of the internet-connected devices may implement a microphone (e.g., for voice authentication, to analyze the vocal response 112 by the visitor 50 and/or to receive the voice command 112).

A combination of audio (e.g., voice) analysis, video analysis and/or a schedule may enable intelligent selection of the audio message 108 and/or the reaction to the input audio 112. The characteristics detected may be used to adjust a confidence level of the classification and/or identification of the visitor 50. When the confidence level is determined to be above a threshold (e.g., 99% confidence) then the audio message 108 and/or reaction may be selected. The confidence level may represent a likelihood that the classification and/or identification of the visitor 50 determined is correct. Classification and/or identification factors (e.g., characteristics) may comprise facial recognition, a barcode, hand gestures, height of visitors, etc.

The smart devices 102a-102n may be configured to generate different audio messages and/or reactions that may be adapted to the situation. In one example, the situation may be the time of day. The audio message 108 and/or the reaction may be selected to correspond to the detected time of day. For example, the audio message 108 may be a greeting that comprises "good morning" may be selected for the morning (e.g., between 6 am and 11 pm) and another greeting that may comprise "good evening" may be selected for the evening (e.g., between 4 μm and midnight). Similarly, the selection of the reaction may be affected by the time of day (e.g., a welcome message during the day, and a warning to leave the premises at night).

The reaction may be selected based on an analysis of the video and/or audio detected after the audio message 108 has been provided. The reaction may be further selected based on other factors. In one example, the reaction may be further selected based on the time of day. In another example, the reaction may be further selected based on using sensors implemented by the smart devices 102a-102n (e.g., using sensor fusion). In yet another example, the reaction may be further selected based on settings input on the companion app. The selection of the audio message 108 and/or reaction may be triggered by the detection of the visitor 50 at any time of (e.g., available 24/7). For example, the visitor 50 may be an unexpected visitor (e.g., an unrecognized person).

In another example, the visitor 50 may be an expected visitor (e.g., a scheduled appointment and/or a face recognized using facial recognition video analysis). In yet another example, the video analysis may detect a package delivery and the visitor 50 may be the delivery person with a delivered package at the door.

Using camera sensor technology, AI technology (performed by the server 104 and/or the smart devices 102a-102n), and market understanding of user behavior, the smart devices 102a-102n may be configured to automatically select the audio message 108 and/or the reaction to deliver depending on the detected circumstance. The reaction may comprise a sequence of interactions with the visitor (e.g., continuous, active engagement).

The video analytics may be used to detect and/or classify objects (e.g., the visitor 50). Other sensor data may be captured (e.g., audio, motion, temperature, light levels, etc.). The processor on the smart devices 102a-102n and/or distributed (e.g., cloud) processing may be configured to perform sensor fusion to make inferences using information from multiple disparate sources (e.g., inferences that may not be performed from a single source of information alone). In one example, using video analytics and conversational AI, a package delivery person may be detected. The reaction may comprise specific instructions provided by the smart devices 102a-102n when the package delivery person is detected. For example, the conversational AI may provide the reaction having an audio message such as, "please leave packages behind planter".

The smart devices 102a-102n may be configured to intelligently react to responses (e.g., the audio response 112) by the detected visitor 50. For example, the smart devices 102a-102n may provide reactions that comprise learning questions to attempt encourage the visitor 50 to provide information that may be used to identify and/or classify the visitor 50. Once the smart devices 102a-102n learn the type (e.g., classification) of the visitor 50, the smart devices 102a-102n may generate reactions appropriately (e.g., contextually accurate reactions). For example, if the smart devices 102a-102n identify the visitor 50 as a burglar, the smart devices 102a-102n may provide escalating reactions (e.g., first ask the burglar to leave politely, then provide a warning, then perform more aggressive actions such as sounding an alarm, then contacting the police, etc.).

After providing an action based on the selected reaction (e.g., asking a question), the smart devices 102a-102n may observe the response of the visitor 50. The next reaction performed by the smart devices 102a-102n may be selected based on the response of the visitor 50 (e.g., determined by further performing video analysis and/or audio analysis). For example, if the visitor 50 leaves, then no next reaction may be necessary. If the visitor 50 provides a name in the response 112, then the next reaction may include the name of the visitor (e.g., "Hi, Bob, we were expecting you, please wait while we come to the door").

The user devices 106a-106n are shown comprising a number of blocks (or circuits) 120a-120n. The circuits 120a-120n may implement various hardware components of the user devices. In an example, the circuit 120a may implement a processor, the circuit 120b may implement a memory, the circuit 120c may implement an input/output (I/O) interface, the circuit 120d may implement a communications module, etc. The circuits 120a-120n may enable the user devices 106a-106n to present output and/or receive input. The circuits 120a-120n may be configured to execute computer readable instructions. The number, type and/or functionality of the circuits 120a-120n may be varied according to the design criteria of a particular implementation.

The user devices 106a-106n may comprise a block (or circuit or module) 130. The module 130 may be the companion app. In an example, the companion app 130 may implement a video feed monitoring app configured to provide a mobile distributed security response. The various hardware circuits 120a-120n may be configured to execute the computer readable instructions to display output, receive input and/or determine internal states for the companion app 130. The companion app 130 may be configured to implement the AI-based security monitoring service. The companion app 130 may be configured to intelligently display video feeds in response to the video data generated by the smart devices 102a-102n and/or events detected. The companion app 130 may be configured to enable the real-time two-way communication (e.g., the generation of the audio output 108 and the reception of the audio response 112). In one example, the companion app 130 may be a mobile app and/or a desktop executable program. In another example, the companion app 130 may be implemented as a web-app. The companion app 130 may be configured to operate using various computing devices (e.g., mobile phones, desktop computers, laptop computers, netbooks, tablet computing devices, etc.) and/or operate using various operating systems (e.g., Windows, iOS, Linux, Android, etc.). The functionality of the companion app 130 may be varied according to the design criteria of a particular implementation.

The remote device 104 is shown comprising a block (or circuit) 140. The circuit 140 may implement an artificial intelligence (AI) model. In the example shown, the AI model 140 may be implemented by the remote device 104. For example, the AI model 140 may be implemented using the scalable processing implemented by the cloud service 104. In another example, the AI model 140 may be implemented by one or more of the smart devices 102a-102n. For example, the AI model 140 may be implemented using the processor implemented by the smart devices 102a-102n. The implementation of the AI model 140 may be varied according to the design criteria of a particular implementation.

The AI model 140 may be configured to intelligently select the video feeds for the companion app 130 to display and/or the arrangement for displaying the video feeds. The AI model 140 may be configured to filter out only events of interest as the events occur. The AI model 140 may be configured to determine the output selected for the smart security devices 102a-102n. In an example, the AI model 140 may determine the order of responses to generate the increasingly severe messages. The AI model 140 may be configured to determine when to generate a request for live engagement (e.g., from a security service) and/or when to request a physical presence (e.g., request an on-scene visit from a security guard (or security personnel) or the police as a last resort). The AI model 140 may be configured to learn in response to feedback. The learning performed by the AI model 140 may be based on feedback received in response to the arrangement of the video feeds displayed, feedback received in response to detecting events, feedback received in response to selecting particular reactions for the smart devices 102a-102n, feedback received in response to enabling live engagement, feedback received in response to deploying on-site security, etc.

Figure 2:
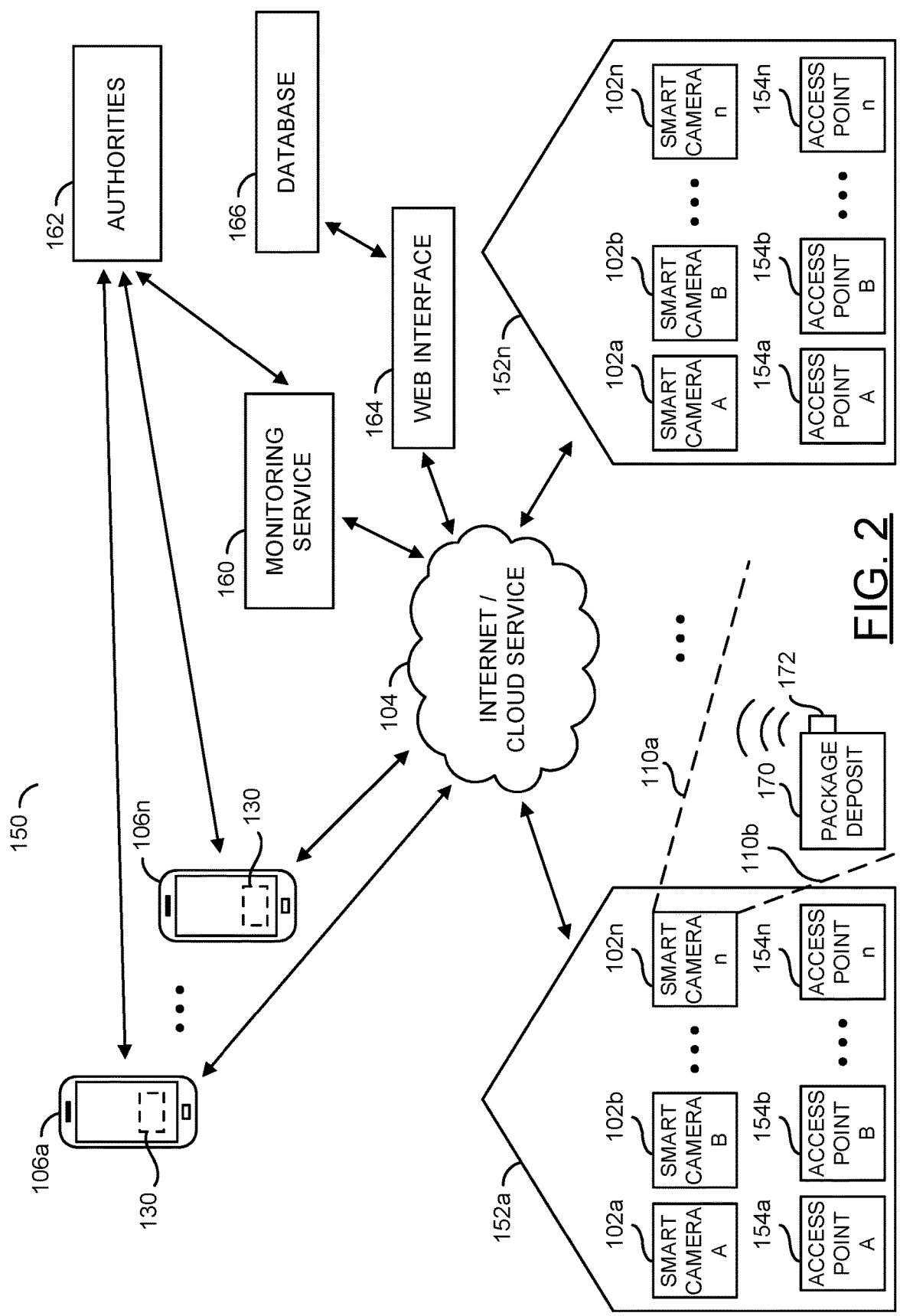
FIG. 2 is a diagram illustrating an example cloud-based security system.

Referring to FIG. 2, a diagram illustrating an example cloud-based security system 150 is shown. The system 150 generally comprises blocks 152a-152n. The blocks 152a-152n may be homes and/or business premises. Each of the homes 152a-152n may comprise blocks 154a-154n. The blocks 154a-154n may be areas of interest (e.g., access points to the homes and/or business premises 152a-152n). The smart cameras (e.g., implemented as doorbells, floodlights, security cameras, etc.) 102a-102n may be set up at each of the areas of interest 154a-154n of the homes and/or business premises 152a-152n. For example, the smart cameras 102a-102n may be configured to monitor the areas of interest 154a-154n.

The system 150 may further comprise the internet and/or cloud service 104, the mobile devices 106a-106n, a monitoring service 160, authorities 162 (e.g., for in-person response), a web interface 164 and/or a database 166. The companion app 130 is shown implemented by the mobile devices 106a-106n. In one example, the monitoring service 160 may be a virtual monitoring service. In another example, the monitoring service 160 may be a person from a central monitoring service (e.g., a live receptionist working at a remote call center that may be located anywhere in the world). In one example, the authorities 162 may be the police department, the fire department, an ambulance, a private security service and/or other emergency services.

In one example, the video feed monitoring app 130 may be used by monitoring personnel and/or patrol guards. The monitoring personnel may be located on-site and/or at an entirely different (e.g., remote location). The monitoring personnel may work for the central monitoring service 160 and/or a small distributed office monitoring. The patrol guard may be a person located on-site that may provide a live response. The patrol guard may use the video feed monitoring app 130 while on patrol and may receive notifications of events. The patrol guard may respond to the notification of the events by moving to the location of the event to provide a human presence on-site. The video feed monitoring app 130 may route the patrols of the patrol guards geographically near the protected sites 152a-152n. The video feed monitoring app 130 may route the patrol guards to a next site on a designated route (e.g., route the patrol guards from a first location at the property 152a to a second location at the property 152b).

The areas of interest 154a-154n may be doors, windows, garages, other entrances, and/or vantage points. Generally, the smart cameras 102a-102n may be mounted at the areas of interest 154a-154n. Data from the smart cameras 102a-102n at the homes and/or business premises 152a-152n may be sent to the internet and/or cloud service 104.

Data sent to the internet and/or cloud service 104 may be sent to the user devices 106a-106n. For example, an alert from one of the smart cameras 102a-102n from the home 152a may be sent to the device 106a of the homeowner indicating that another family member has arrived home. In another example, an alert from one of the smart cameras 102a-102n from the home 152n may be sent to the smartphone 106c of an owner of another home (e.g., the owner of the home 152b) that a suspicious person has been identified in the neighborhood. Users may then send a notification to the authorities 162. In yet another example, the device 106a may receive an alert from one of the smart cameras 102a-102n indicating that a package has been delivered. A user of the user devices 106a-106n may send data back to the smart cameras 102a-102n of the homes and/or business premises 152a-152n through the internet and/or cloud service 104. In one example, a homeowner may send a command to arm an alarm (e.g., one of the security responses) at their home.

In one example, the user devices 106a-106n may be in the possession of trusted volunteers. The trusted volunteers may be other home owners in the system 150. The trusted volunteers may be the first line of response to a security issue detected by the system 150. Alerts by the system 150 may be sent in parallel to all the trusted volunteers. The trusted volunteers may use available communication channels provided such as cell phones, telephone and/or emails. The homeowner may use the companion application 130 to schedule particular pre-defined responses (e.g., the audio message 108 and/or reactions) to particular alerts such as calling the authorities 162 (e.g., the police and/or the fire department). The trusted volunteers may be able to activate a set of pre-defined actions using the user devices 106a-106n. The trusted volunteers may take training sessions to learn how to properly respond to various alerts. The training sessions may be taken on-line. The on-line training sessions may be available on the web interface 164 and/or using the companion application 130. For example, the web interface 164 may be used to access the companion application 130 via a desktop computer and/or smart TV.

If the network of trusted neighbors 152a-152n has the same system (e.g., one or more of the smart cameras 102a-102n), they may exchange images, video, and/or other information of unwelcomed visitors. The website and/or web interface 164 may have the database 166 to manage the images, video, and/or other information. Unwelcome visitors stored in the database 166 may be shared with other neighbors and/or the authorities 162 using the web interface 164. For example, when the unwelcomed visitors learn about the database 166 they may not target the neighborhood 152a-152n. Data in the database 166 may be used to classify types of visitors (e.g., comparisons may be performed between the captured video data and information in the database 166).

In some embodiments, the mobile devices 106a-106n may be used by patrol officers such as the authorities 162 (e.g., police, private security, etc.). The mobile devices 106a-106n may enable the patrol officers 162 to remotely monitor the video feeds generated by the smart cameras 102a-102n. For example, the patrol officers 162 may patrol the neighborhood 152a-152n in a vehicle and the mobile devices 106a-106n may be implemented within the vehicle. The companion app 130 may indicate which access points 154a-154n have events detected and alert the patrol officers 162.

Multiple levels of alerts may be implemented to distinguish unwelcomed visitors from welcomed visitors (e.g., household members). Since most visitors may be welcomed, identifying strangers and raising the level of alert for immediate attention may be important. To prevent false alarms the smart cameras 102a-102n may be configured to provide automatic greetings (e.g., the audio message 108). The automated audio message 108 and/or the reactions may be implemented to engage the visitor 50 (e.g., implement a conversational AI). Engaging the visitor 50 may enable the AI model 140 implemented by the processor of the smart devices 102a-102n and/or the remove device 104 to analyze video of the visitor 50 (e.g., by having them face the lens to talk) and/or determine the behavior of the visitor 50.

The technology to identify and/or classify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 150 may determine that exterior lighting is needed and/or interior lighting is not needed. In another example, if a family is on vacation the system 150 may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart cameras 102a-102n may initiate storage of the video data (e.g., the video streams/feeds) in response to motion detection in the area of interest. The user device 106a (e.g., a smart phone) may be used to allow a user to set a motion threshold for each of the smart cameras 102a-102n. For example, a lower motion threshold may be more sensitive to motion. In another example, a higher motion threshold may be less sensitive to motion (e.g., reduce a number of false positives). The motion threshold may be adjustable.

In some embodiments, the smart cameras 102a-102n may initiate storage of the video data in response to detecting and/or locating a person (e.g., the visitor 50) and/or other type of object (e.g., a delivery vehicle) in the video data. In one example, the video processor of the smart cameras 102a-102n and/or the AI model 140 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented by the AI model 140 to improve detection and/or classification accuracy of visitors and/or objects. For example, the user may use the companion app 130 to provide a correct and/or incorrect label to a detection performed by the smart cameras 102a-102n. If the detection and/or classification is incorrect, the incorrect label may be used by the smart cameras 102a-102n to incorporate an incorrect result of the detection into the machine learning techniques of the AI model 140. In some embodiments, the machine learning techniques may be implemented in the cloud service 104 (e.g., the analysis is performed using cloud computing resources configured to scale available resources on demand to enable learning for the AI model 140). Video data and/or correct/incorrect labels may be uploaded and/or stored anonymously (e.g., without personal identification information) by the cloud service 104. The smart cameras 102a-102n may be configured to ignore (e.g., not respond to, not track and/or not send notifications in response to) small animals and/or shadows.

In some embodiments, the smart security cameras 102a-102n may be configured to send notifications to the user devices 106a-106n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., using the companion application 130 and/or the web-based interface 164). The user account may allow the user to configure preferences. The preferences may comprise the notification and/or greetings settings. The type of notifications sent by the smart cameras 102a-102n may be based on the notification settings. The smart cameras 102a-102n may implement the activation states and/or arm/disarm the security responses to limit a number of the notifications sent. Intelligently limiting the number of notifications sent may reduce a number of false alarms and/or reduce an amount of data transferred via the network 60 and/or the amount of data processed by the cloud service 104 (e.g., prevent QoS issues and/or dropped data).

The cloud service 104 and/or the database 166 may store portions of the video data from each of the smart cameras 102a-102n. For example, portions of the video data may be saved in response to the particular types of detections. The portions of video data may be video clips. The video clips may be encoded and/or compressed by the video processor of the smart devices 102a-102n and/or the cloud service 104 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the smart cameras 102a-102n (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user devices 106a-106n (e.g., the companion application 130, an executable program, the web-based interface 164, etc.). For example, the companion application 130 may be executable by a computing device such as the user devices 106a-106n. The user interface may allow one or more of the user devices 106a-106n to control various components of the smart cameras 102a-102n. For example, one or more user devices 106a-106n may be configured to access the user account. The control signals may be generated in response to the input from the user devices 106a-106n. For example, an icon may be provided on the user interface representing a light bulb. The user may activate and/or deactivate the light bulb by pressing (touching on a touchscreen, clicking, etc.) a control option using the companion app 130.

Other components such as security response components may be turned on and/or off from the user interface of the companion app 130. For example, one of the controls available in the companion app 130 may be provided to allow the user to control the speaker of one or more of the smart cameras 102a-102n. In one example, the speaker of the smart cameras 102a-102n may playback a pre-recorded audio message (e.g., the user may select from one or more pre-recorded audio messages on the user interface). In another example, the speaker of the smart cameras 102a-102n may sound an alarm (e.g., one or more alarm types may be selected from the user interface of the companion app 130).

In some embodiments, the smart cameras 102a-102n may be configured for two-way audio communications (e.g., an intercom). For example, the voice of a visitor may be received using a microphone of the smart cameras 102a-102n. A communication module implemented by the smart cameras 102a-102n may transmit the received audio to one or more of the user devices 106a-106n and/or the remote device 104. The user devices 106a-106n may playback the audio to the user. The user may speak via a microphone on the user devices 106a-106n. The user devices 106a-106n may transmit the audio to one or more of the smart cameras 102a-102n (e.g., the user may select which of the smart cameras 102a-102n to playback the audio using the companion application 130) via the communication module (e.g., a Wi-Fi connection) implemented by the smart devices 102a-102n. The speaker component of the smart devices 102a-102n may transmit and/or stream the received audio.

The smart cameras 102a-102n may provide various APIs (application programming interface) to connect with other devices (e.g., other home automation devices). For example, the APIs may allow various other devices to communicate with the smart cameras 102a-102n. In one example, the companion application 130 may be configured to receive/transmit data between the smart devices 102a-102n and/or other smart devices (e.g., home heating systems, interior lighting, etc.). For example, the smart cameras 102a-102n and/or other smart devices may provide a smart home security system. The smart cameras 102a-102n may generate control signals based on the communication with the various devices other devices. The types of APIs available may be varied according to the design criteria of a particular implementation.

A package deposit 170 is shown at the home 152a. The package deposit 170 may be implemented to allow the visitor 50 to deliver packages. The package deposit 170 may be implemented as a container, a bag, a delivery slot, a mailbox, etc. In an example, the package deposit 170 may be implemented as a large net with a zipper and a lock. A delivery person may be instructed by the smart security cameras 102a-102n to place a package inside the package deposit 170 and zip up and/or lock the package deposit 170. In some embodiments, the package deposit 170 may implement a hazardous waste storage (e.g., medical waste for a medical facility) and/or other secure information (e.g., confidential data such as attorney documents) and the package deposit 170 may be monitored to ensure proper disposal of materials in the package deposit 170 (e.g., the package deposit 170 may be implemented for package pick-up). The implementation of the package deposit 170 may be varied according to the design criteria of a particular implementation.

A wireless device 172 is shown on the package deposit 170. The wireless device 172 may be configured to transmit wireless signals to indicate a status of the package deposit 170. In an example, the wireless device 172 may send a notification to the smart cameras 102a-102n indicating that the package has been delivered. In another example, the wireless device 172 may be configured to send a notification to the smart security cameras 102a-102n indicating that the package deposit 170 has been tampered with. The smart cameras 102a-102n may forward the notification to one or more of the user devices 106a-106n. The type of notifications transmitted by the wireless device 172 may be varied according to the design criteria of a particular implementation.

The smart security cameras 102a-102n may be configured to adjust an activation state in response to a package being delivered and/or picked up (e.g., in response to the notification from the wireless device 172). A security zone is shown in the field of view 110a-110b (e.g., the field of view of the lens of the smart security floodlight 102n). The smart security camera 102n may monitor the security zone within the field of view 110a-110n near the package deposit 170. In an example, when the security zone 110a-110n is invaded (e.g., by a visitor such as a potential package thief) the smart camera 102n may be configured to perform a security response (e.g., activate an alarm, send an alert to a designated user, play the audio message 108, perform various security reactions, etc.). The security zone 110a-110n may be an area of interest below the smart security floodlight 102n. In some embodiments, the capture device may be configured to capture package information about a delivered package (e.g., a bar code, a tracking number, an identification of the delivery person, etc.).

Figure 3:
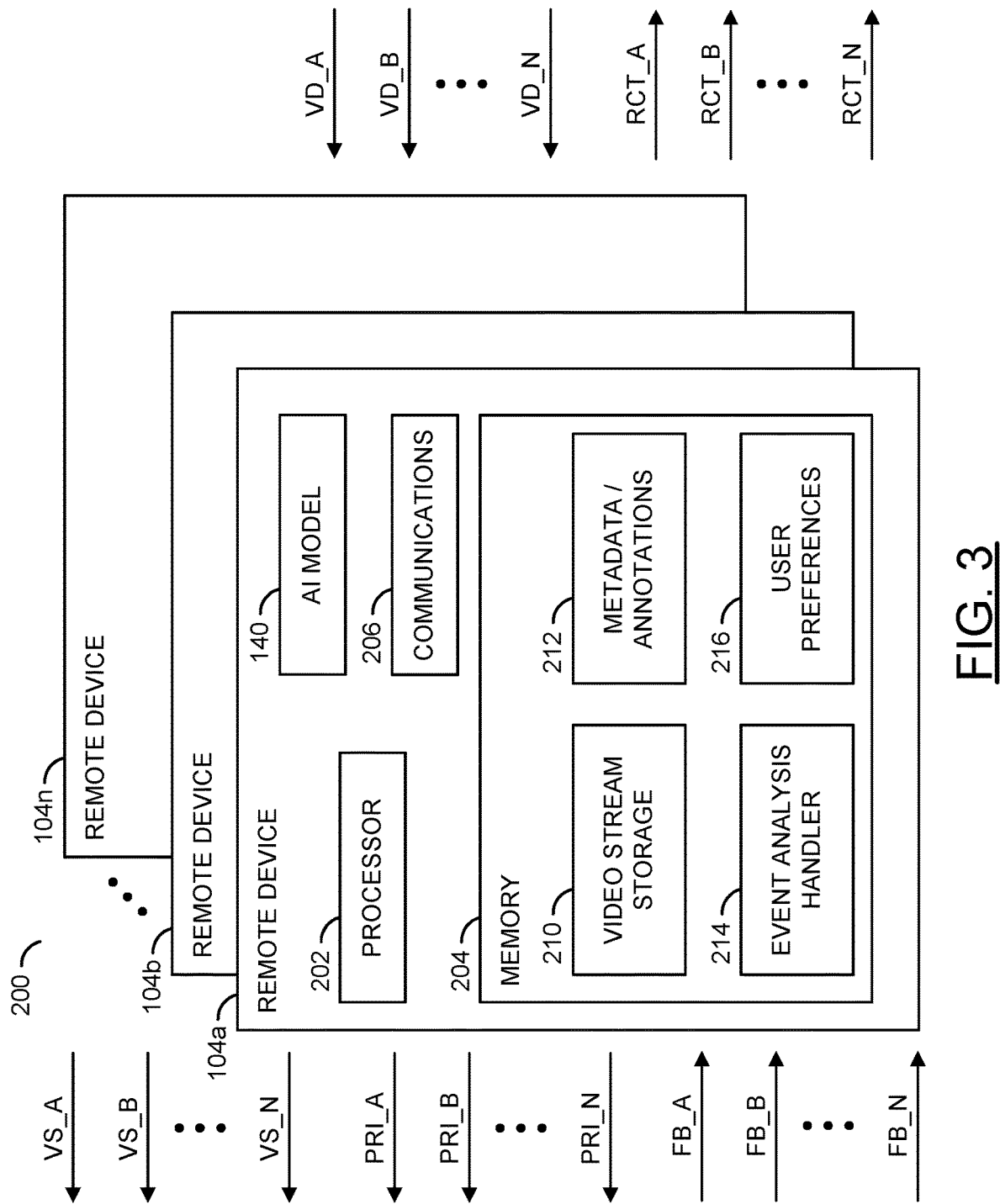
FIG. 3 is a block diagram illustrating a cloud computing system for intelligently analyzing and selecting video streams from multiple sources.

Referring to FIG. 3, a block diagram illustrating a cloud computing system for intelligently analyzing and selecting video streams from multiple sources is shown. A scalable computing system 200 is shown. The scalable computing system 200 may comprise the remote devices 104a-104n. The resources of the remote devices 104a-104n used by the scalable computing system 200 may be varied based on demand (e.g., demand for processing power, demand for storage, etc.). The remote devices 104a-104n may implement the distributed computing service 200 (e.g., cloud processing and/or storage) that may be provided as a service that scales according to demand. The number of remote devices 104a-104n implemented may be varied according to the design criteria of a particular implementation.

The scalable computing system 200 is shown receiving a number of signals (e.g., VD_A-VD_N) and a number of signals (e.g., FB_A-FB_N). The scalable computing device 200 is shown presenting a number of signals (e.g., RCT_A-RCT_N), a number of signals (e.g., VS_A-VS_N) and a number of signals (e.g., PRI_A-PRI_N). The signals VD_A-VD_N may comprise video data received from the smart devices 102a-102n. The signals FB_A-FB_N may comprise feedback and/or user requests received from the companion app 130. The signals RCT_A-RCT_N may comprise reaction instructions presented to the smart devices 102a-102n. The signals VS_A-VS_N may comprise video feeds presented to the companion app 130. The signals PRI_A-PRI_N may comprise priority signals presented to the companion app 130. The scalable computing system 200 may communicate other signals (not shown). The number, type and/or format of the signals communicated by the scalable computing system 200 may be varied according to the design criteria of a particular implementation.

Components of the remote device 104a are shown. The components of the remote device 104a may be representative of the components implemented by each of the remote devices 104a-104n. The remote device 104a may comprise the AI model 140, a block (or circuit) 202, a block (or circuit) 204 and/or a block (or circuit) 206. The circuit 202 may implement a processor (or processors). The circuit 204 may implement a memory. The circuit 206 may implement communications devices. Each of the remote devices 104a-104n may comprise other components (not shown). The number, type and/or arrangement of the components of the remote devices 104a-104n may be varied according to the design criteria of a particular implementation.

The processor 202 may be configured to execute computer readable instructions and/or communicate decisions to other components. The computer readable instructions may be stored in the memory 204. The processor 202 may be configured to perform analysis and/or computer vision operations on the video data received from the signals VD_A-VD_N. The processor 202 may comprise multiple processors and/or multiple processing cores operating in parallel.

The memory 204 provide storage for the video data VD_A-VD_N and/or user data. The memory 204 may be configured to store data (e.g., feature sets) used for performing the computer vision operations. The memory 204 may comprise random access memory, hard drives and/or solid state drives.

In some embodiments, the AI model 140 may be implemented by a combination of the processor 202 and the memory 204. In some embodiments, the AI model 140 may be implemented as a separate hardware component. The communications module 206 may implement various communications protocols to enable the scalable computing service 200 to communicate with the smart devices 102a-102n, the network 60 and/or the user devices 106a-106n.

The memory 204 is shown comprising a block (or circuit) 210, a block (or circuit) 212, a block (or circuit) 214 and/or a block (or circuit) 216. The circuit 210 may implement video stream storage. The circuit 212 may implement metadata (or annotations) storage. The circuit 214 may implement an event analysis handler. The circuit 216 may implement user preferences. The memory 204 may store other types of data (not shown). The types of data stored by the memory 204 may be varied according to the design criteria of a particular implementation.

The video stream storage 210 may be configured to store the video data VD_A-VD_N received from the smart devices 102a-102n. In some embodiments, the processor 202 may be configured to process and/or transcode the video data VD_A-VD_N. For example, video streams stored by the video stream storage 210 may be a different version of the video data than the video data VD_A-VD_N received. In one example the video streams stored by the video stream storage 210 may be compressed, edited, post-processed (e.g., color corrected, HDR, dewarped, stabilized, etc.), have a different framerate, have a different resolution, etc. In another example, the video stream storage 210 may store an exact copy of the video data VD_A-VD_N received.

The metadata storage 212 may comprise metadata and/or annotations for the video streams stored in the video stream storage 210. The metadata and/or annotations may comprise timestamps, events detected, characteristics of objects detected using computer vision analysis, transcripts of audio provided, etc. The metadata and/or annotations may be generated in response to analysis performed on the video data VD_A-VD_N by the AI model 140. Data stored in the metadata storage 212 may be used to determine which of the video streams to focus on the companion app 130. Data stored in the metadata storage 212 may be used to compare with feedback to enable the AI model to learn and/or improve detection of events over time. The data stored in the metadata storage 212 may be searchable to enable finding particular evidence (e.g., searching for a criminal suspect after a burglary). The data stored in the metadata storage 212 may comprise indications of an event and/or the characteristics detected that were used to determine that an event occurred (e.g., an identification of a person, the characteristics of the visitor 50 such as clothing worn and physical attributes, audio transcriptions of the two-way communication, how long the visitor 50 remained in the area, etc.).

The event analysis handler 214 may provide the computer readable instructions. In some embodiments, the event analysis handler 214 may be implemented by the artificial intelligence model 140. In some embodiments, decisions made by the event analysis handler 214 may be determined based on input from the artificial intelligence model 140. The event analysis handler 214 may be configured to select the video streams VS_A-VS_N to display on the companion app 130 using the priority signals PRI_A-PRI_N. The event analysis handler 214 may be further configured to select a reaction in response to events detected by the smart security devices 102a-102n. For example, the signals RCT_A-RCT_N may be generated in response to the decisions made by the event analysis handler 214.

The signals RCT_A-RCT_N may comprise control signals communicated to the smart security devices 102a-102n. The signals RCT_A-RCT_N may comprise instructions for the smart security devices 102a-102n to generate responses to the detected event on-site (e.g., flashing a strobe light, selecting which audio to play for the conversational AI, sounding an alarm, contacting the authorities, etc.). The signals RCT_A-RCT_N may provide an autonomous response to an event that may deter an intruder and/or interact with an intruder until a patrol car arrives to the location of the event.

The AI model 140 and/or the event analysis handler 214 may determine when to generate the signals PRI_A-PRI_N. The signals PRI_A-PRI_N may be priority signals communicated to the user devices 106a-106n running the companion app 130. The priority signals PRI_A-PRI_N may be configured to provide instructions for the selection of the video streams VS_A-VS_N to display on the companion app 130. For example, the event analysis handler 214 may intelligently select which of the video streams VS_A-VS_N should be displayed on the companion app 130 at any given time. The event analysis handler 214 may provide the priority signal(s) PRI_A-PRI_N to each user device 106a-106n running the companion app 130. The video stream(s) VS_A-VS_N selected by the priority signals PRI_A-PRI_N sent to each user device 106a-106n may be different or the same.

The user preferences 216 may provide authentication credentials and/or settings for each user of the companion app 130. In an example, the user preferences 216 may comprise preferred video stream display settings, which video streams are pinned, how often to swap video streams, etc. For example, the AI model 140 may be configured to determine which of the video streams VS_A-VS_N to display on the companion app 130 based on the analysis of the events determined using the event analysis handler 214 and the user settings stored in the user preferences 216.

The companion app 130 may generate the signals FB_A-FB_N in response to input by the operator of the user devices 106a-106n. The signals FB_A-FB_N may be feedback signals. The feedback signals FB_A-FB_N may provide the selections made by each user of the companion app 130. The feedback signals FB_A-FB_N may be used by the AI model 140 to learn what is of interest to the user. For example, the user may select one of the video streams VS_A-VS_N to view when a car is in the video frame. The feedback signals FB_A-FB_N may provide information (e.g., a timestamp and/or the video frames associated with the user selection) that may be used for analysis and incorporated in the artificial intelligence model 140 (e.g., to be used for future detection of events). For example, the processor 202 and/or the event analysis handler 214 may determine that the user selects a video stream when a car is detected, and the AI model 140 may eventually learn to provide the priority signals PRI_A-PRI_N for selecting video streams that correspond to the detection of a car. The feedback signals FB_A-FB_N may enable the intelligent selection implemented by the AI model 140 to learn from previous experience of what events are likely to be of interest to the users (e.g., specific to a particular user, specific to a group of users (e.g., all users that work security for a particular company) and/or to all users in general).

Each of the smart devices may provide the video data VD_A-VD_N) to the cloud service 200. The remote devices 104a-104n may intelligently select which of the video streams VS_A-VS_N to communicate to the companion app 130. In some embodiments, the video streams VS_A-VS_N output may be the same as the video data VD_A-VD_N received. In some embodiments, the video streams VS_A-VS_N may be an altered and/or edited version of the video data VD_A-VD_N. The AI model 140 may determine which of the video streams VS_A-VS_N that the companion app 130 should display and/or the arrangement of the video streams VS_A-VS_N.

The priority signals PRI_A-PRI_N may provide the instructions to the companion app 130 about the arrangement of the video streams VS_A-VS_N. In some embodiments, the remote devices 104a-104n may communicate all of the video streams VS_A-VS_N to the user devices 106a-106n and the signals PRI_A-PRI_N may provide the instructions about which of (e.g., a subset of) the video streams VS_A-VS_N to display and which of the video streams VS_A-VS_N to hide and/or de-emphasize. In some embodiments, the remote devices 104a-104n may select the subset of the video streams VS_A-VS_N to communicate to the user devices 106a-106n based on the data communicated in the priority signals PRI_A-PRI_N. For example, if the priority signals PRI_A-PRI_N indicate that a particular one of the video streams VS_A-VS_N should be hidden from display, then the remote devices 104a-104n may conserve bandwidth by not communicating (e.g., disable communication of) the particular video streams VS_A-VS_N until the priority signals PRI_A-PRI_N indicate that the particular one of the video streams VS_A-VS_N is to be displayed. If one of the video streams is not communicated to the user devices 106a-106n, the user may access the video stream storage 210 to select a particular video stream to view (e.g., a live view or a previously recorded video).

The processor 202 and/or the event analysis handler 214 (with instructions from the AI model 140) may be configured to perform computer vision operations and/or audio analysis on each of the video data VD_A-VD_N received from the smart security devices 102a-102n. The computer vision operations and/or the audio analysis may be used to detect events (e.g., an animal detected, a visitor detected, fire, a water leak, behavior of an intruder, a flood, broken windows, damage to property, etc.). The computer vision analysis and/or the audio analysis may determine a context of the event (e.g., time of day, words that have been spoken by a visitor, the type of clothing the visitor is wearing, how the visitor is behaving, etc.) to determine a context appropriate reaction (e.g., sound an alarm for a burglar, but not for a delivery person, contact authorities for a fire, open an entrance for an employee, etc.). The detection of the event may be used to select the video streams VS_A-VS_N and the priority signals PRI_A-PRI_N in order to select the arrangement of the video feeds to display on the companion app 130. The detection of the event may be used to select the reactions RCT_A-RCT_N to be performed by the smart devices 102a-102n.

Figure 4:
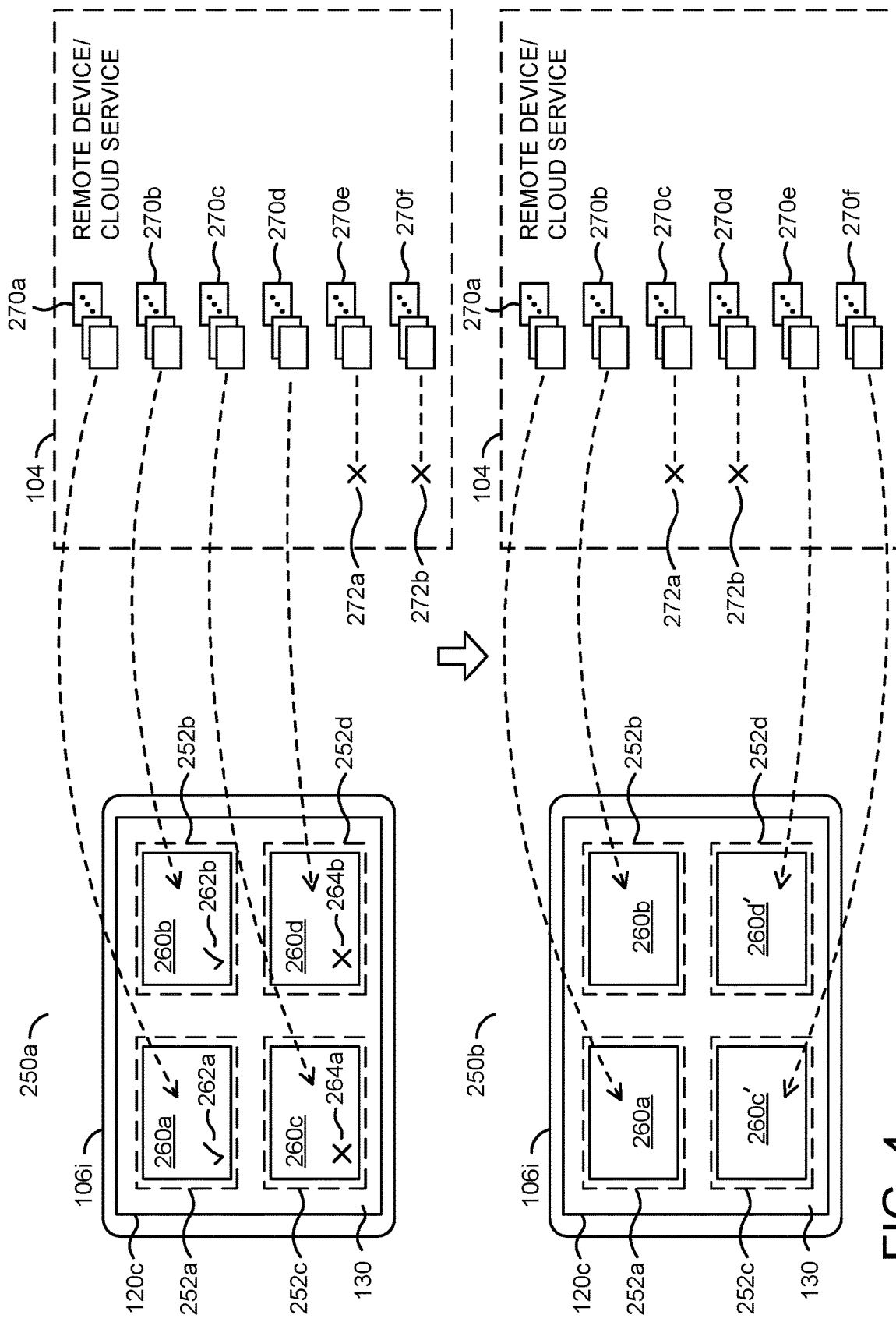
FIG. 4 is a diagram illustrating intelligently swapping video streams in and out of view on a mobile computing device.

Referring to FIG. 4, a diagram illustrating intelligently swapping video streams in and out of view on a mobile computing device is shown. Example scenarios 250a-250b are shown. The example scenarios 250a-250b may each illustrate the remote device 104 and the user devices 106i.

The user device 106*i* may be an illustrative example representative of any of the user devices 106*a*-106*n*. The example scenario 250*a* may illustrate the user device 106*i* and the remote device 104 at a time earlier than (before) the example scenario 250*b*. In some embodiments, the remote device 104 may provide the artificial intelligence model 140 for selecting which of the video streams VS_A-VS_N to display via the companion app 130.

In both the example scenarios 250*a*-250*b*, a tablet computing device is shown as the mobile device 106*i*. The I/O interface 120*c* of the mobile device 106*i* is shown as a touchscreen interface. The companion app 130 is shown displayed on the touchscreen interface 120*c* of the mobile device 106*i*. An arrangement 252*a*-252*d* is shown. The arrangement 252*a*-252*d* may comprise four video feeds 260*a*-260*d*. In the example scenarios 250*a*-250*b* the arrangement 252*a*-252*d* may comprise two video feeds on the top portion and two feeds on the bottom portion of the companion app 130. The arrangement 252*a*-252*d* of the video feeds 260*a*-260*d* may be varied according to the design criteria of a particular implementation.

In the example scenario 250*a*, the video feeds 260*a*-260*b* are shown in the arrangement locations 252*a*-252*b* (on the top of the companion app 130) and the video feeds 260*c*-260*d* are shown in the arrangement locations 252*c*-252*d* (on the bottom of the companion app 130). Check marks 262*a*-262*b* are shown on the respective video feeds 260*a*-260*b*. Xs 264*a*-264*b* are shown on the video feeds 260*c*-260*d*. The check marks 262*a*-262*b* and the Xs 264*a*-264*b* may represent the instructions received from the priority signals PRI_A-PRI_N. The signals PRI_A-PRI_N may be signals generated external to the companion app 130 (e.g., the signals PRI_A-PRI_N may be generated by the AI model 140 and presented by the remote devices 104*a*-104*n* to the user device 106*i*). The check marks 262*a*-262*b* may illustrate that the AI model 140 has determined that the corresponding video feeds 260*a*-260*b* may be kept on the display of the companion app 130. The Xs 264*a*-264*b* may illustrate that the AI model 140 has determined that the corresponding video feeds 260*c*-260*d* may be replaced on the display of the companion app 130. In one example, the AI model 140 may determine that the video feeds 260*c*-260*d* may be replaced in response to user input and/or requests (e.g., the user tapping on the video feeds 260*c*-260*d* to mark the arrangement locations 252*c*-252*d* for replacement, or the user tapping on the video feeds 260*a*-260*b* to mark the arrangement locations 252*a*-252*b* for pinning). In another example, the AI model 140 may determine that the video feeds 260*a*-260*b* comprise events and that other video streams comprise more interesting content (e.g., events) than the video feeds 260*c*-260*d*.

The remote device 104 is shown comprising six available video streams 270*a*-270*f*. The six available video streams 270*a*-270*f* may be the video streams VS_A-VS_N. The number of available video streams 270*a*-270*f* may be varied according to the design criteria of a particular implementation (e.g., how many smart devices 102*a*-102*n* are implemented to capture the video data VD_A-VD_N).

At the earlier time 250*a*, the remote device 104 may provide the four video streams 270*a*-270*d* (e.g., a subset of the video streams 270*a*-270*f*) to the companion app 130. The two video streams 270*e*-270*f* may not be streamed and/or the remote device 104 may provide thumbnails (e.g., not broadcast the full video stream to save bandwidth). In the example shown, the video streams 270*e*-270*f* are shown presented to the locations 272*a*-272*b*, which may represent the video stream storage 210. While only the video streams 270*e*-270*f* are shown presented to the video stream storage 210, the video streams 270*a*-270*d* that are being communicated may also be stored in the video stream storage 210.

The video streams 270*a*-270*d* may be selected by the AI model 140 for display on the companion app 130 for the arrangement 252*a*-252*d*. The subset of video streams 270*a*-270*d* may be presented to the mobile device 106*i*. The companion app 130 may be configured to receive and display the video streams 270*a*-270*d* as the video feeds 260*a*-260*d* in the arrangement 252*a*-252*d* based on the priority signals PRI_A-PRI_N. In the example shown, the video stream 270*a* may be presented at the arrangement location 252*a* as the video feed 260*a* in the top left corner of the companion app 130, the video stream 270*b* may be presented at the arrangement location 252*b* as the video feed 260*b* in the top right corner of the companion app 130, the video stream 270*c* may be presented at the arrangement location 252*c* as the video feed 260*c* in the bottom left corner of the companion app 130 and the video stream 270*d* may be presented at the arrangement location 252*d* as the video feed 260*d* in the bottom right corner of the companion app 130.

The AI model 140 may intelligently determine that the top portion video feeds 260*a*-260*b* should remain displayed (e.g., an event may be currently taking place in the video data VD_A-VD_N that corresponds to the video streams 270*a*-270*b*). The AI model 140 may intelligently determine that the bottom portion video feeds 260*c*-260*d* should be replaced (e.g., swapped out with other available video streams). The video feeds 260*c*-260*d* may be replaced at the later time 250*b* (e.g., after an event such as an object detection and/or user input has been detected).

At the later time example 250*b*, the remote device 104 may continue to provide the first two video streams 270*a*-270*b* and may swap the video streams 270*c*-270*d* for the video streams 270*e*-270*f* as the subset of video streams. The video streams 270*a*-270*b* are shown displayed on the companion app 130 at the arrangement locations 252*a*-252*b* as the video feeds 260*a*-260*b*. The video streams 270*c*-270*d* are shown in the locations 272*a*-272*b* (e.g., the video stream storage 210). The communication of the video streams 270*c*-270*d* may be stopped (e.g., the video streams may be discarded, communication may be terminated, only thumbnails may be communicated, etc.). The video streams 270*c*-270*d* may no longer be displayed on the companion app 130.

The video streams 270*e*-270*f* may be communicated to the user device 106*i* for display on the companion app 130. The video streams 270*e*-270*f* may be replacement video feeds 260*c*'-260*d*'. In the example shown, the video stream 270*e* may be displayed on the companion app 130 at the arrangement location 252*c* in the bottom left corner as the video feed 260*c*' and the video stream 270*f* may be displayed on the companion app 130 at the arrangement location 252*d* in the bottom right corner as the video feed 260*d*'. In one example, the AI model 140 may determine that the two video streams 270*e*-270*f* are currently showing an event that should be brought to the attention of the user (e.g., an event more important than any events that may be detected in the video streams 270*c*-270*d*).

In another example, the AI model 140 may swap out video streams based on an amount of time that has passed (e.g., once every minute). For example, the later example 250*b* may be one minute after the earlier example 250*a*. Continuing the example, after another minute has passed, the video feeds 260*a*-260*b* may be swapped with other video streams stored on the remote device 104 (e.g., the video streams 270a-270b may be swapped out with the video streams 270c-270d).

The AI model 140 and/or the video feed monitoring app 130 may intelligently swap in and out a subset of the video streams 270a-270f as the displayed video feeds 260a-260d. The video feed monitoring app 130 may display the video data VD_A-VD_N captured by relevant cameras. The relevant cameras may be the smart security devices 102a-102n that may be currently capturing the video data of the event. The video streams 270a-270f that comprise the event may be swapped into the displayed video feeds 260a-260d and the video streams 270a-270f that do not comprise the event may be swapped out of the displayed video feeds 260a-260d.

The intelligent selection of the displayed video feeds 260a-260d may enable one single operator to monitor many of the video streams 270a-270f simultaneously (e.g., far more than a person would be able to if monitoring all the available video feeds simultaneously). In one example, one person may monitor 300-1000 cameras simultaneously when the AI model 140 intelligently selects the video feeds 260a-260d to display. Since not all of the video streams 270a-270f are displayed at one time, the focus of the operator may be on the video feeds 260a-260d that are displayed. The intelligent selection of the subset of the video streams 270a-270f to display (e.g., displaying events such as the detection of an intruder), may enable a manageable amount of the video streams 270a-270f to be brought to the attention of the operator. The video feeds 270a-270f that do not correspond to events may be temporarily hidden from view and then brought into view as one of the video feeds 260a-260d when an event is detected (e.g., the operator may not have a need to monitor one of the video feeds 270a-270f when no event is detected).

Without the intelligent selection of the subset of the video feeds 270a-270f for the video feeds 260a-260d, there may need to be as many as 50 displays to show images from 500 cameras (e.g., a high hardware cost). Interlacing groups of cameras may reduce the number of displays (e.g., reduce hardware costs) but may be straining to the eyes of the operator. By intelligently selecting a subset of the video streams 270a-270f as the video feeds 260a-260d the number of displays may be reduced (e.g., one operator may use one of the user devices 106a-106n such as one tablet computing device). The attention of the operator may not be divided across as many video feeds, which may reduce the eye strain of the human operator. By intelligently selecting the subset of the video streams 270a-270f to display as the video feeds 260a-260d, the operator may not need to simultaneously view as many video streams at once, but may still be able to monitor the events that occur in a high number of video streams at once.

Figure 5:
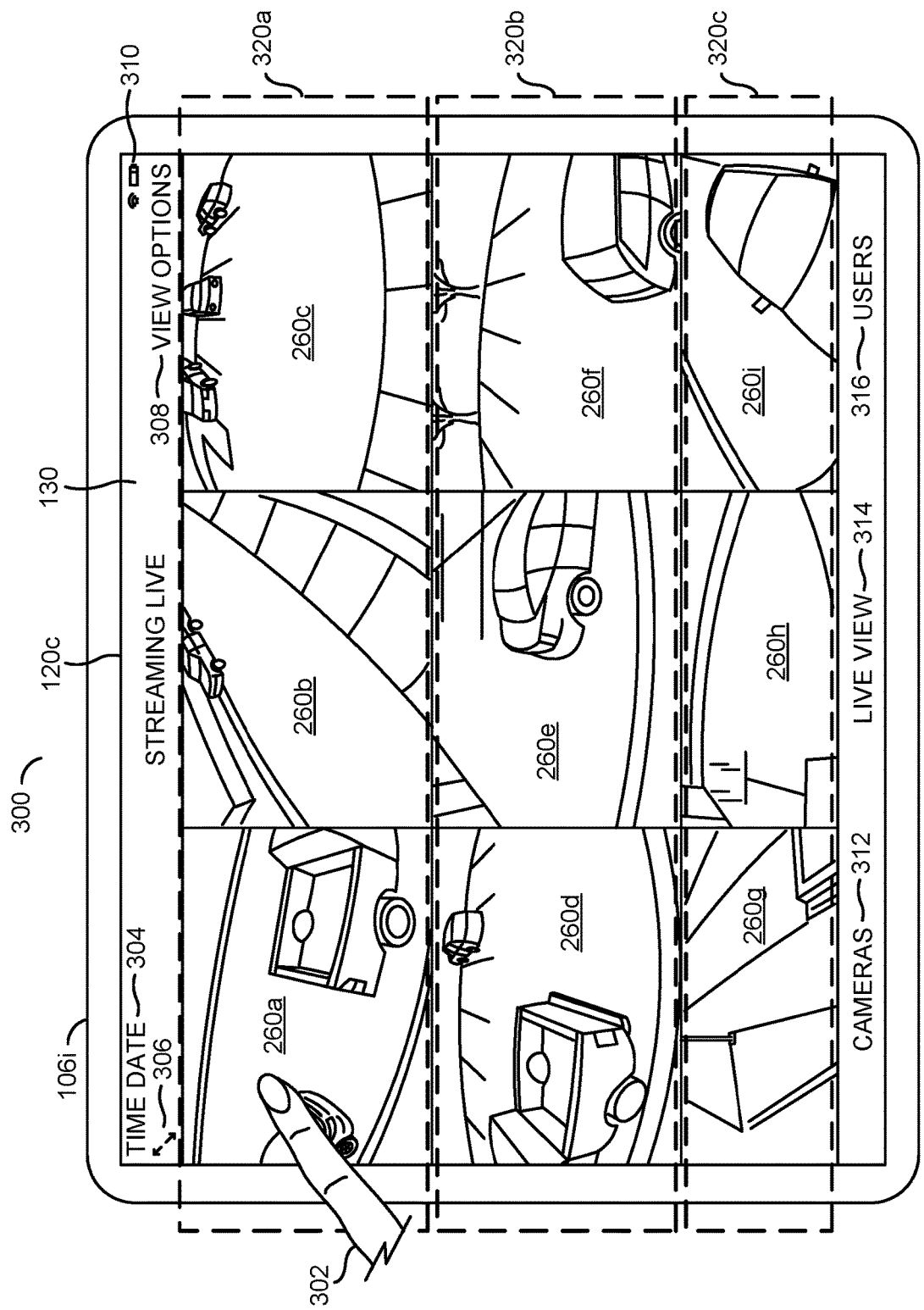
FIG. 5 is a diagram illustrating a companion application displaying intelligently selected video streams on a mobile computing device.

Referring to FIG. 5, a diagram illustrating a companion application displaying intelligently selected video streams on a mobile computing device is shown. An intelligently selected video streaming example 300 is shown. In the example 300, the mobile device 106i is shown as a representative example of any of the mobile devices 106a-106n. The mobile device 106i is shown as a tablet computing device. The I/O interface 120c of the mobile device 106i is shown as a touchscreen interface. The touchscreen interface 120c is shown displaying output for and receiving input (e.g., requests) for the companion app 130. A finger 302 is shown interacting with the companion app 130. The touchscreen interface 120c may receive the input from the finger 302 that may be interpreted as requests from the user by the companion app 130. The touchscreen interface 120c and/or the companion app 130 may update the display in response to the video streams received and/or the requests of the user 302.

The companion app 130 is shown displaying multiple of the video feeds 260a-260i simultaneously. The companion app 130 may be configured to enable the user 302 to access the multiple video feeds 260a-260i simultaneously. The companion app 130 may communicate with the smart security devices 102a-102n and/or the remote device 104.

The companion app 130 may comprise a time and date 304, a toggle button 306 and a view options button 308. The time and date 304 may display a timestamp of one or more of the video feeds 260a-260i. In the example 300, the video feeds 260a-260i may be a live feed and the time and date 304 may be the current time and date. The toggle button 306 may be a fullscreen toggle. The fullscreen toggle 306 may enable one of the video feeds 260a-260i to be displayed across the entirety of the touchscreen interface 120c. The view options 308 may enable a selection menu to enable the operator 302 to select various view options (e.g., select between different arrangements, select previous recordings, select thumbnail views, etc.).

Icons 310 are shown. The icons 310 may be operating system icons. The companion app 130 may integrate with the operating system run by the mobile device 106i.

The companion app 130 may comprise a cameras button 312, a live view button 314 and/or an users button 316. The cameras button 312 may enable the operator 302 to manually select which of the smart cameras 102a-102n to view video feeds from. The camera buttons 312 may enable the operator 302 to select various settings for each of the smart cameras 102a-102n (e.g., framerate, resolution, types of events to detect, responses to perform, enabling 2-way communication, controlling lights, etc.). The live view button 314 may enable the operator 302 to view live video feeds from one or more of the smart cameras 102a-102n. In the example 300, the companion app 130 may be displaying the live view. The live view button 314 may enable the operator 302 to toggle between a live view and watching previously recorded video streams (e.g., the video streams stored in the video stream storage 210). The users button 316 may enable the operator 302 to change user preferences. The user preferences that may be accessed by the users button 316 may enable the operator 302 to update settings that may be stored in the user preferences storage 216.

Arrangement rows 320a-320c are shown. The arrangement rows 320a-320c may be one example implementation of an arrangement of the subset of the video streams VS_A-VS_N that may be configured by the companion app 130. In the example shown, the top arrangement row 320a may comprise the video feeds 260a-260c, the middle arrangement row 320b may comprise the video feeds 260d-260f and the bottom arrangement row 320c may comprise the video feeds 260g-260i. In the example shown, the video feeds 260a-260i may display the video data captured by the smart security devices 102a-102n implemented in a parking lot (e.g., various cars and parking spaces may be shown).

The arrangement rows 320a-320c may display the video feeds 260a-260i as a 3×3 grid arrangement. Which of the video streams VS_A-VS_N are shown as the video feeds 260a-260i may be chosen by the AI model 140 as the most likely to warrant further attention by the operator 302. The video feeds 260a-260i may comprise timestamps allowing for the human operator 302 to judge a latency of the event, and respond accordingly. The arrangement rows 320a-320c may enable increasing levels of focus on a particular stream (e.g., taking up the entire screen space, allowing for all human attention to go into details of one event as it occurs).

In the example shown, the top arrangement row 320a of the video feeds 260a-260c may be intelligently selected based on events detected by the smart security devices 102a-102n and/or the AI model 140 (e.g., using computer vision analysis, motion detection, analysis of audio, etc.). For example, the video feeds 260a-260c in the arrangement row 320a may be displayed as larger than the video feeds 260g-260i in the bottom arrangement row 320c. The AI model 140 may perform the computer vision analysis on the video data VD_A-VD_N and determine that the video data VD_A-VD_N with the most urgent events (e.g., objects and/or behavior determined to be the most pressing issue) may be selected to be displayed as the video feeds 260a-260c in the top arrangement row 320a. In an example, the remote devices 104 may present the video streams VS_A-VS_N to the mobile device 106i and the priority signals PRI_A-PRI_N may indicate to the companion app 130 to arrange a subset of the video streams VS_A-VS_N (e.g., the three video streams VS_A-VS_C) as the video feeds 260a-260c in the top arrangement row 320a.

In the example shown, the middle arrangement row 320b of video feeds 260d-260f may be user selected video streams. For example, the companion app 130 may enable the operator 302 to manually select one or more video streams VS_A-VS_N for display in the middle arrangement row 320b. In another example, the companion app 130 may display one or more of the video streams VS_A-VS_N based on previously provided user preferences (e.g., the data stored in the user preferences 216). The user selected video feeds 260d-260f may remain in view on the companion app 130 regardless of objects detected by the AI model 140 (e.g., not swapped out when new video streams are intelligently selected). For example, the user may 'pin' some video streams to be permanently displayed in the middle arrangement row 320b.

In the example shown, the bottom arrangement row 320c of video feeds 260g-260i may be regularly rotated in and out of view. Rotating the video feeds 260g-260i in and out of view may enable the operator 302 to see all the available video streams over time (e.g., even when no event is detected). A subset of the video streams VS_A-VS_N may be rotated in and out at particular time intervals (e.g., every 30 seconds). In example, the video feeds 260g-260i may comprise the video streams VS_A-VS_C for one time interval and then in the next time interval, the video streams VS_A-VS_C may be swapped out (e.g., not displayed) and the video feeds 260g-260i may be replaced with the video streams VS_D-VS_F. In another example, if the video feed 260g comprises the video stream VS_A, and then the AI model 140 detects an event in the video stream VS_A, the video stream VS_A may be moved to the top arrangement row 320a (e.g., promoted to a more prominent location such as the video feed 260a) and the video feed 260g may be replaced with another one of the video streams VS_B-VS_N to prevent the video feed 260g duplicating the same video stream that may be already displayed in the video feed 260a. Generally, the video streams VS_A-VS_N that are being rotated in first may be the first of the currently displayed video streams that may be swapped out when the system intelligently selects one of the video streams due to an event detection (e.g., a first in first out arrangement).

The video feeds 260a-260c displayed may change over time. In one example, if the video feed 260a no longer displays an event that warrants the attention of the operator 302 (e.g., as determined by the AI model 140), the feed 260a may be swapped out for another one of the video streams VS_A-VS_N. When one of the video stream VS_A-VS_N that is not currently displayed by the companion app 130 comprises a detected event (e.g., the video streams VS_A-VS_N that are not currently displayed may still be analyzed by the AI model 140), the companion app 130 may be updated to display the video stream with the newly detected event. The new video stream may replace one of the video feeds 260a-260i currently displayed (e.g., a video stream that does not currently display an event).

In the example shown, the companion app 130 may display nine of the video streams (e.g., VS_A-VS_I). In one example, the AI model 140 may perform the computer vision analysis on each of the video streams VS_A-VS_N stored in the video stream storage 210. The AI model 140 may determine which of the video streams VS_A-VS_N comprise an event and/or determine which of the video streams VS_A-VS_N should be displayed prominently on the companion app 130 based on the user preferences 216. For example, the AI model 140 may detect events in the subset of the video streams VS_A-VS_I. The AI model 140 may further determine the arrangement to display the subset of the video streams VS_A-VS_I. To conserve bandwidth, the remote device 104 may only transmit the subset of the video streams VS_A-VS_I instead of all of the video streams VS_A-VS_N. The remote device 104 may further present the priority signals PRI_A-PRI_N to indicate the arrangement of the communicated subset of video streams VS_A-VS_I. For example, the priority signals PRI_A-PRI_N may provide data externally generated from the companion app 130 that may be readable by the companion app 130 to determine which of the subset of the video streams VS_A-VS_I should be displayed at which video feed 260a-260i. For example, the priority signals PRI_A-PRI_N may indicate that the video stream VS_A, the video stream VS_I and the video stream VS_D should be displayed in the top arrangement row 320a (e.g., the video streams with the most urgent events), and the video stream VS_B, the video stream VS_C and the video stream VS_F should be displayed in the bottom arrangement row 320c (e.g., the video streams with the least urgent events detected).

Figure 6:
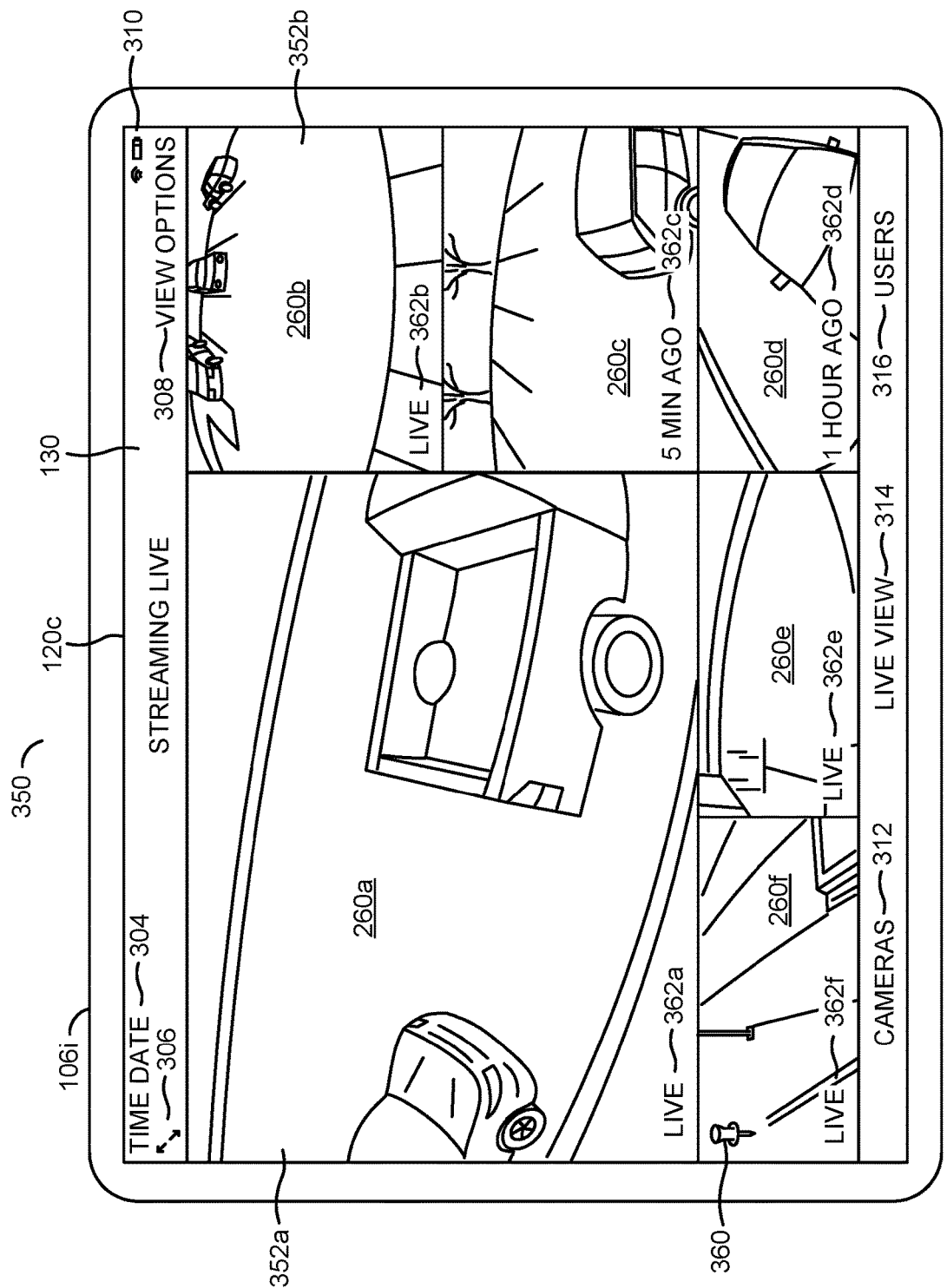
FIG. 6 is a diagram illustrating a companion application intelligently adjusting the arrangement of the video streams on a mobile computing device.

Referring to FIG. 6, a diagram illustrating a companion application intelligently adjusting the arrangement of the video streams on a mobile computing device is shown. An intelligently selected video streaming example 350 is shown. In the example 350, the mobile device 106i is shown as a representative example of any of the mobile devices 106a-106n. The mobile device 106i is shown as a tablet computing device. The I/O interface 120c of the mobile device 106i is shown as a touchscreen interface. The touchscreen interface 120c is shown displaying visual content for and receiving input requests for the companion app 130. The companion app 130 is shown displaying the time and date 304, the fullscreen toggle button 306, the view options button 308, the OS icons 310, the cameras button 312, the live view button 314 and the users button 316, which may operate as described in association with FIG. 5.

The companion app 130 is shown displaying multiple of the video feeds 260a-260f simultaneously. The companion app 130 may be configured to enable the user 302 to access the multiple video feeds 260a-260f simultaneously. The companion app 130 may communicate with the smart security devices 102a-102n and/or the remote device 104.

In the example 350, the companion app 130 may display the arrangement 352a-352b for the video feeds 260a-260f. The arrangement 352a-352b may comprise the prominent feed location 352a and the surrounding feed locations 352b.

The companion app 130 may dynamically adjust which of the video streams VS_A-VS_N are displayed as the video feeds 260a-260f and/or the arrangement locations 352a-352b of the video streams displayed in response to the priority signals PRI_A-PRI_N.

In the example shown, the arrangement location 352a may comprise the top left video feed 260a. The top left video feed 260a may be enlarged compared to the other video feeds 260b-260f displayed in the arrangement locations 352b. Enlarging the top left video feed 260a in the arrangement location 352a may enable the operator 302 to see more of the detail provided in the particular one of the video streams VS_A-VS_N compared to the amount of detail that may be visible in one of the arrangement locations 352b.

In one example, the top left video feed 260a may be enlarged in response to the touch input selection performed by the user 302 as shown in association with FIG. 5. In another example, which of the video streams VS_A-VS_N are shown larger in the prominent arrangement location 352a may be intelligently selected by the AI model 140. For example, one or more of the video stream VS_A-VS_N may be enlarged or reduced in size in response to the events detected (e.g., as indicated by the priority signals PRI_A-PRI_N). In some embodiments, one of the video streams VS_A-VS_N may be displayed fullscreen on the companion app 130 (e.g., in response to the user 302 selecting the fullscreen toggle button 306 and/or an intelligent selection by the AI model 140). For example, the video feed 260a in the prominent arrangement location 352a may be selected to provide a view of incidents as they are occurring (if any).

The video feeds 260b-260e may be displayed in the arrangement locations 352b. In the example shown, the arrangement locations 352b may form a backwards L shape around the prominent arrangement location 352a. The video feeds 260b-260e displayed in the arrangement locations 352b may be shown with less prominence (or focus) than the video feed 260a in the prominent arrangement location 352a to enable the operator 302 to focus mainly on the video feed 260a, while still enabling simultaneous monitoring of other video streams. For example, which of the subset of the video streams VS_A-VS_N may be displayed as the video feeds 260b-260f may be rotated among all the video data captured by the smart cameras 102a-102n to continually allow for easy monitoring of all available video streams. In another example, one or more of the video feeds 260b-260f may be selected in response to input requests by the operator 302.

In the example shown, a pin icon 360 is displayed on the bottom left video feed 260f. The pin icon 360 may indicate that the operator 302 has provided a preference to always display the particular video feed 260f. The companion app 130 may enable different users to pin some of the video streams VS_A-VS_N as worthy of permanent attention, and deprecate the priority of others. For example, the operator 302 may pin the video stream VS_K for display as the video feed 260f for constant monitoring. In the example shown, the pin icon 360 has been implemented on one of the video feeds 260b-260f in the arrangement locations 352b. Similarly, one of the video streams VS_A-VS_N may be pinned as the video feed 260a in the prominent arrangement location 352a.

Timestamps 362a-362f are shown on the respective video feeds 260a-260f. The companion app 130 may provide the timestamps 362a-362f for each of the video feeds 260a-260f and/or the current time and date. In the example shown, the timestamps 362a-362b and the timestamps 362e-362f may indicate that the video feeds 260a-260b and the video feeds 260e-260f are live (e.g., showing the video data currently captured by the smart devices 102a-102n). In the example shown, the timestamp 362c may indicate that the video feed 260c is from five minutes ago and the timestamp 362d may indicate that the video feed 260d is from one hour ago (e.g., old footage stored in the video stream storage 210).

The companion app 130 may provide a view options setting interface. For example, requests may be provided by interacting (e.g., tapping, clicking, long-press, etc.) with the view options icon 308 that may open a settings page on the companion app 130. The settings page may enable the operator 302 to select preferences, pin video streams, select how long each video stream is displayed before being swapped out with another video stream, etc.

Figure 7:
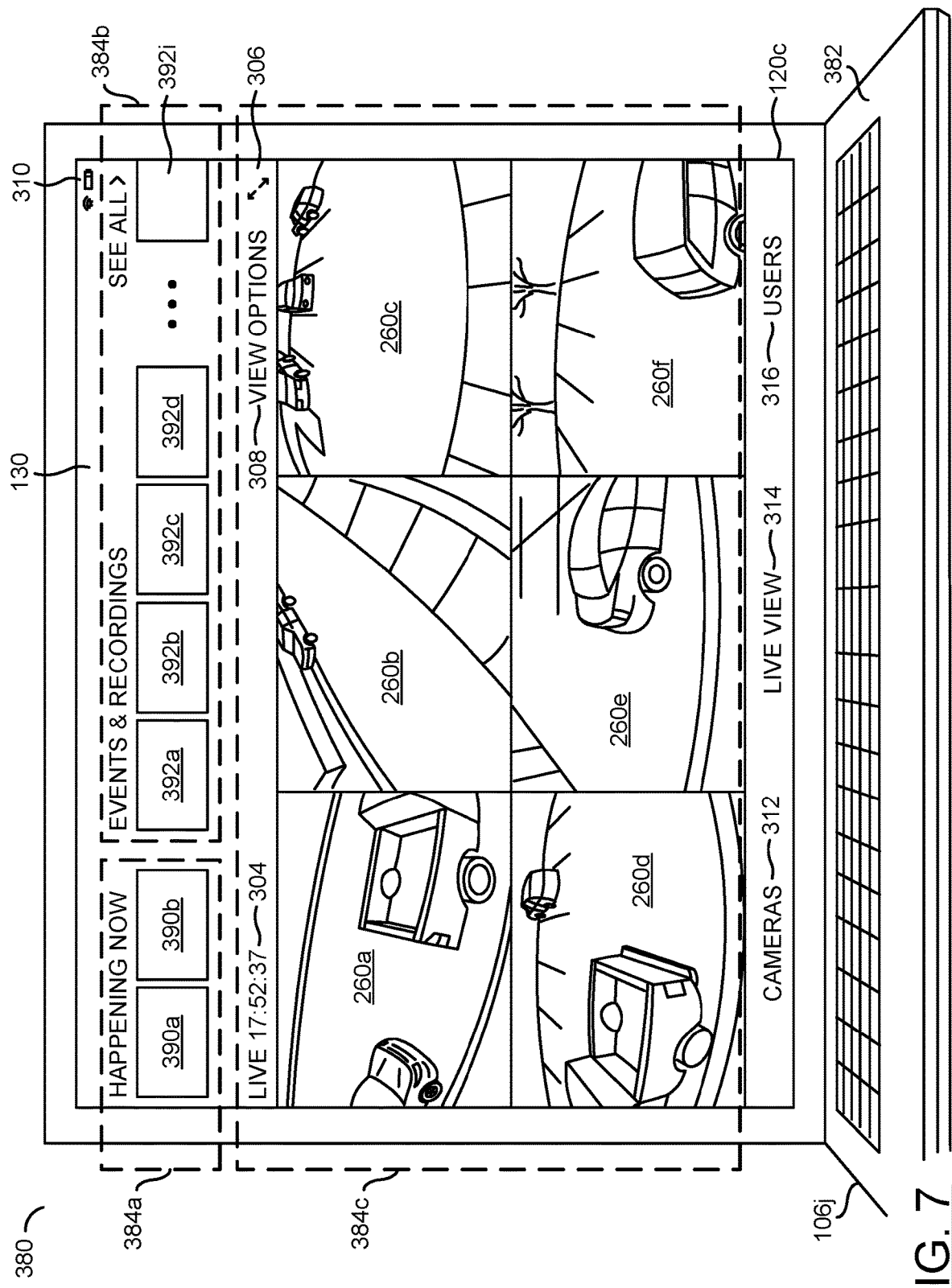
FIG. 7 is a diagram illustrating a companion application displaying video feeds of intelligently selected video streams and thumbnail views of other video streams.

Referring to FIG. 7, a diagram illustrating a companion application displaying video feeds of intelligently selected video streams and thumbnail views of other video streams is shown. An intelligently selected video streaming example 380 is shown. In the example 380, the mobile device 106j is shown as a representative example of any of the mobile devices 106a-106n. The mobile device 106j is shown as a laptop and/or netbook computing device. The I/O interface 120c of the mobile device 106j is shown as a monitor. The I/O interface 120c may comprise a keyboard and/or touchpad configured to receive input requests from the operator 302. The monitor interface 120c is shown displaying and/or updating visual content for the companion app 130. The companion app 130 is shown displaying the time and date 304, the fullscreen toggle button 306, the view options button 308, the OS icons 310, the cameras button 312, the live view button 314 and the users button 316, which may operate as described in association with FIG. 5.

The companion app 130 is shown displaying multiple of the video feeds 260a-260f simultaneously. The companion app 130 may be configured to enable the user 302 to access the multiple video feeds 260a-260f simultaneously. The companion app 130 may communicate with the smart security devices 102a-102n and/or the remote device 104.

In the example 380, the companion app 130 may display the arrangement 384a-384c for the video feeds 260a-260f and/or other representations of the stored video streams 210. The arrangement 384a-384c may comprise a live thumbnail location 384a, the prior recordings locations 384b and a live video feed location 384c. The companion app 130 may dynamically adjust which of the video streams VS_A-VS_N are displayed as the video feeds 260a-260f and/or the live thumbnail location 384a in response to the priority signals PRI_A-PRI_N.

The live thumbnail arrangement location 384a may comprise thumbnail feeds 390a-390b. Each of the thumbnail feeds 390a-390b may comprise thumbnail versions one of the video streams VS_A-VS_N. The thumbnails may be still images captured from the video streams VS_A-VS_N (e.g., images captured less frequently than the frame rate of the video stream). The operator 302 may manually select which of the video streams VS_A-VS_N to display as one of the video feeds 260a-260f in the live video feed location 384c by interacting with the thumbnail feeds 390a-390b. For example, if the thumbnail feed 390a comprises a thumbnail view of the video stream VS_K and the operator 302 selects the thumbnail feed 390a, the remote device 104 may communicate the full video stream VS_K and one of the priority signals PRI_A-PRI_N to enable the companion app 130 to re-arrange the video feeds 260a-260f to display the video stream VS_K in the live video feed location 384c. The thumbnail feeds 390a-390b may comprise low-resolution and low-framerate versions (e.g., lower than the video feeds 260a-260f) of the video streams VS_A-VS_N configured to provide the human operator 302 an overview and/or preview of the video data captured by the smart devices 102a-102n in real-time. In one example, the companion app 130 may provide a list of cameras (e.g., a list of the smart devices 102a-102n that are currently capturing video data). Interacting with the cameras icon 312 may provide the thumbnail feeds 390a-390b of each available video stream.

The prior recordings locations 384b may comprise the event thumbnails 392a-392i. The event thumbnails 392a-392i may comprise thumbnail versions of the video streams stored in the video stream storage 210. The thumbnails may be still images captured from the video streams stored in the video stream storage 210 (e.g., images captured less frequently than the frame rate of the video stream). The operator 302 may manually select which of the video streams to display as one of the video feeds 260a-260f in the live video feed location 384c by interacting with the thumbnail feeds 392a-392i.

The event thumbnails 392a-392i may comprise the video data VD_A-VD_N and/or clips (e.g., a portion) of the video data VD_A-VD_N. The AI model 140 may perform the computer vision analysis on the video data VD_A-VD_N to detect events. The event thumbnails 392a-392i may enable the operator 302 to review previously detected events (e.g., non-live events). In one example, the event thumbnails 329a-392i may be added after the event is shown live as one of the video feeds 260a-260f in the live video feed location 384c. For example, the AI model 140 may present one of the signals PRI_A-PRI_N to promote one of the video streams VS_A-VS_N to the video feeds 260a-260f in response to detecting an event. While the event is detected, the operator 302 may view a live stream of the event as one of the video feeds 260a-260f. After the AI model 140 determines that the event has ended, the one of the video streams VS_A-VS_N that had the event may be demoted from the live video feed location 384c and one of the video feeds 260a-260f may be swapped out with a different one of the video streams VS_A-VS_N. After the event has ended, the AI model 140 may send the priority signals PRI_A-PRI_N to update the event thumbnails 392a-392i to show a thumbnail view of the event that just ended. A recording of the event may be accessed by the operator 302 with a request by selecting the corresponding one of the event thumbnails 392a-392i.

The video feeds 260a-260f in the live video feed location 384c may provide a prominent view of one or more of the video streams VS_A-VS_N that have been selected by the AI model 140 (e.g., in response to an event, in response to a timing pattern, in response to user preferences, a combination of events, timing pattern and preferences, etc.). The thumbnail feeds 390a-390b in the live thumbnail arrangement location 384a may provide a quick view (e.g., a preview) or one or more of the video streams VS_A-VS_N that have been determined by the AI model 140 to not comprise events as urgent as the events detected in the video streams VS_A-VS_N selected for the video feeds 260a-260f (or based on user preferences and/or user input). The thumbnail feeds 390a-390b may enable the operator 302 to have a quick view (or a general idea) of what is occurring in other of the video streams VS_A-VS_N that may not comprise events while still having primary focus on the video feeds 260a-260f. The event thumbnails 392a-392i in the prior recording locations 384b may comprise previously recorded video data that may be reviewed by the operator 302 on demand. The AI model 140 may be configured to determine which of the event thumbnails 392a-392i to display based on the events detected using computer vision analysis, based on previous user input (e.g., learned preferences of the operator 302) and/or the user preferences 216.

Figure 8:
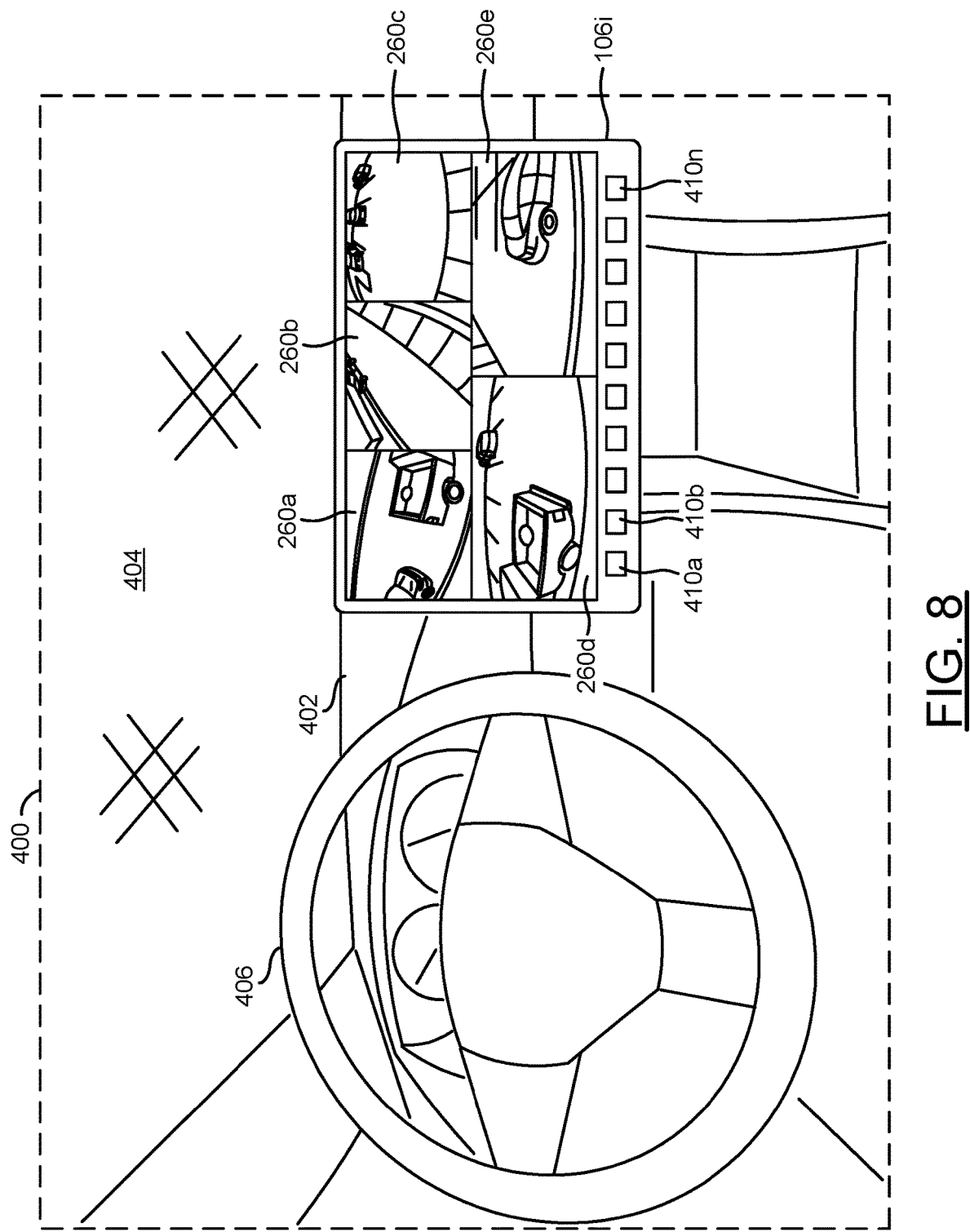
FIG. 8 is a diagram illustrating a mobile computing device displaying intelligently selected video streams implemented in a patrol vehicle.

Referring to FIG. 8, a diagram illustrating a mobile computing device displaying intelligently selected video streams implemented in a patrol vehicle is shown. An example view 400 is shown. The view 400 may comprise a view of a vehicle interior 402. In one example, the vehicle interior 402 may be an interior of a patrol vehicle (e.g., a security vehicle). The vehicle interior 402 may comprise a windshield 404, a steering wheel 406. The user device 106i may be implemented within the vehicle interior 402.

The user device 106i may be a representative example of any of the user devices 106a-106n. In the example shown, the user device 106i may be a tablet computing device. In some embodiments, a patrol vehicle (e.g., a police officer) may use a laptop (or netbook) computer within the vehicle interior 402. The user device 106i may be configured to connect wirelessly to the network 60. In an example, the communications module 120d implemented by the user device 106i may be configured to communicate with the network 60 using a 4G/5G cellular connection. In another example, the communications module 120d implemented by the user device 106i may be configured to communicate with the network 60 using a Wi-Fi connection. In yet another example, the communication module 120d implemented by the user device 106i may connect to various automobile systems (e.g., CarPlay) to enable continued vigilance and operations while driving. The user device 106i is shown comprising controls 410a-410n. The controls 410a-410n may be part of the I/O device 120c. The controls 410a-410n may be configured to receive requests from the operator 302.

The user device 106i mounted to the vehicle interior 402 is shown implementing the companion app 130. The companion app 130 is shown displaying the video feeds 260a-260e. The AI model 140 may be configured to select which of the video streams VS_A-VS_N to display as the video feeds 260a-260e. Selecting particular video streams of interest (e.g., based on detected events) may enable the driver (e.g., a security guard or security personnel patrolling a neighborhood while driving) to quickly monitor the video feeds 260a-260e without distracting the driver (e.g., the operator 302) from paying attention to the road. For example, with a quick glance (e.g., similar to checking a side view mirror), the operator 302 may see any events detected in the video feeds 260a-260e. If an event is detected that warrants further attention, the operator 302 may pull over to responsibly focus on the video feeds 260a-260e.

In some embodiments, the companion app 130 may be used by security guards or security personnel on patrol. In some embodiments, the companion app 130 may be configured to only display the video feeds 260a-260f when the patrol vehicle is not moving. For example, when the companion app 130 may receive the priority signals PRI_A-PRI_N (e.g., to update the arrangement of the video feeds 260a-260e), instead of displaying the video feeds 260a-260e while the operator 302 is driving, a notification may be performed (e.g., audio or visual such as a change in color or a flash). The operator 302 may pull over in the vehicle to view the video feeds 260a-260e of the event detected by the AI model 140.

In some embodiments, the patrol car driver 302 may receive real-time updates of detected events. The smart security devices 102a-102n may perform the reactions to the event for immediate on-site responses to events. In one example, the reactions performed in response to the events may be selected by the AI model 140 and the signals RCT_A-RCT_N may be generated to provide the instructions for the reaction to perform. The security personnel may respond to the event in the patrol car, if needed (e.g., if the reactions performed by the smart security devices 102a-102n do not resolve the event detected). By providing real-time notifications of events, the security personnel may respond quickly to events.

The companion app 130 may provide updates on whether a status of the event has changed in response to the reactions performed by the smart security devices 102a-102n. For example, if the smart security device 102i plays an alarm in response to an event detected by the AI model 140 and the intruder leaves, the security personnel may be called off from reporting to the site (e.g., there is no event anymore to respond to). Video of the event, the response and what happened after the response may be selected using one of the event thumbnails 392a-392i shown in association with FIG. 7.

For example, the operator 302 may receive a notification of an event. The AI model 140 may display the event as one of the video feeds 260a-260n. The AI model 140 may continue to perform the computer vision operations on the video data VD_A-VD_N to determine which response that the smart security devices 102a-102n that detected the event should perform. The AI model 140 may select the signals RCT_A-RCT_N to indicate the reactions that the smart security devices 102a-102n should perform. The AI model 140 may perform the computer vision operations on the video data VD_A-VD_N captured during and after the reaction has been performed to determine a result of the reactions performed. The AI model 140 may generate a notification to the operator 302 in order to indicate the result of the reactions performed. The AI model 140 may update the video feeds 260a-260n depending on whether the event is ongoing or whether the event has been resolved. If the event has resolved, the AI model 140 may update the event thumbnails 392a-392i to enable the operator 302 to select the video of the event to review the event, the reactions performed and the result (e.g., at a time when the operator 302 has stopped driving).

The operator 302 may have an option using the companion app 130 to provide the feedback FB_A-FB_N to indicate whether the reaction selected was appropriate. For example, while the reaction of an alarm selected by the AI model 140 may have successfully stopped the intruder, the operator 302 may review the event and see that if the alarm had been selected sooner some property damage may have been avoided. The AI model 140 may receive the feedback, integrate the feedback into the AI model 140 to learn to respond to similar events in the future.

Figure 9:
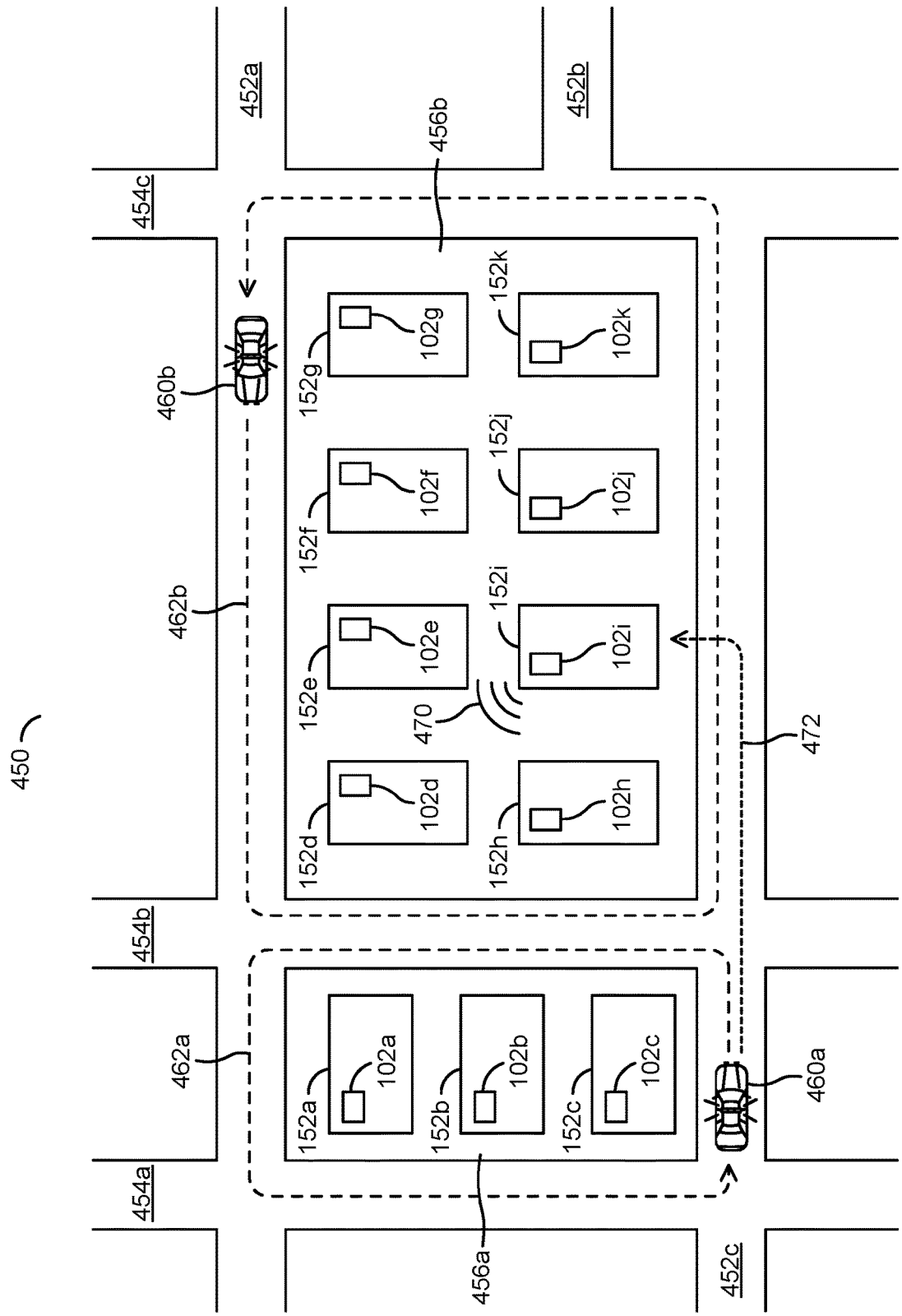
FIG. 9 is a diagram illustrating patrol vehicles responding to an alert generated by a smart security device.

Referring to FIG. 9, a diagram illustrating patrol vehicles responding to an alert generated by a smart security device is shown. A scenario 450 is shown. The scenario 450 may comprise an overhead map view representing a neighborhood.

The scenario 450 may comprise a number of horizontally oriented streets 452a-452c and a number of vertically oriented streets 454a-454c. The streets 452a-452c and the streets 454a-454c may be arranged to form a general grid pattern around blocks 456a-456b. The block 456a may be between the streets 454a-454b and the streets 452a-452c. The block 456b may be between the streets 454b-454c and the streets 452a-452c.

The block 456a may comprise three properties 152a-152c. The block 456b may comprise eight properties 152d-152k. Each of the properties 152a-152k is shown comprising a respective one of the smart security devices 102a-102k. In an example, the blocks 456a-456b may comprise a neighborhood of the houses 152a-152k. In some embodiments, not all of the properties 152a-152k may implement one of the smart devices 102a-102k. In some embodiments, one or more of the properties 152a-152k may implement more than one of the smart devices 102a-102n (e.g., monitoring a front entrance and a back entrance). The arrangement of the smart devices 102a-102k in the neighborhood of houses 152a-152k may be varied according to the design criteria of a particular implementation.

Patrol vehicles 460a-460b are shown. In the example shown, the patrol car 460a may be driving along the street 452c near the block 456a and close to the home 152c. In the example shown, the patrol car 460b may be driving along the street 452a near the block 456b and close to the home 152g. Each of the patrol cars 460a-460b may implement one of the user devices 106a-106n. For example, the user devices 106a-106n may mounted within the vehicle interior 402 and displaying the companion app 130 as shown in association with FIG. 8.

A patrol path 462a is shown for the patrol vehicle 460a is shown. The patrol path 462a may navigate around the block 456a. For example, the patrol vehicle 460a may generally monitor the properties 152a-152c on the block 456a. A patrol path 462b is shown for the patrol vehicle 460b is shown. The patrol path 462b may navigate around the block 456b. For example, the patrol vehicle 460b may generally monitor the properties 152d-152k on the block 456b.

The patrol vehicles 460a-460b may represent a live presence reaction that may be selected by the AI model 140. When the AI model 140 detects an event in the video data VD_A-VD_N, the AI model 140 may select various reactions. The reactions may comprise controlling functions of the smart devices 102a-102n (e.g., 2-way communication, talking down an intruder with automated audio playback, sounding an alarm, etc.). One of the reactions may be to deploy a live presence. The AI model 140 may send a notification to the companion app 130 in the patrol vehicles 460a-460b to travel to one of the properties 152a-152k as one of the reactions. Generally, a live presence may be a last resort response (e.g., an intruder has not left in response to being talked down, or an alarm). In some embodiments, the patrol vehicles 460a-460b may already be near the location of a potential event (e.g., doing hourly patrols of a neighborhood). In some embodiments, the patrol vehicles 460a-460b may remain at a base of operations (e.g., a police station) until the AI model 140 sends a notification. The smart device 102i is shown generating an alarm 470 (e.g., in response to a detected event). For example, the smart security device 102i may have captured video data of an event at the property 152i. The smart security device 102i may automatically perform reactions to the event and/or in response to the signals RCT_A-RCT_N to perform a reaction selected by the AI model 140. The reactions may have escalated (e.g., a detected intruder has not left), and the AI model 140 may have selected the alarm 470 and sent a notification to the live security personnel in the area. For example, the companion app 130 executed by the user devices 106a-106n in the patrol vehicles 460a-460b may each receive a notification of the event and/or a video stream of the event in response to the signals PRI_A-PRI_N.

The AI model 140 may be configured to calculate the most appropriate one of the patrol vehicles 460a-460b to go to the site and inform of the status of the selected intervention to all other patrol units. In an example, the AI model 140 may determine the nearest available mobile unit to reach the site of the incident in order to reduce response time and/or avoid duplicating responses from multiple mobile units. The AI model 140 may send the priority signals PRI_A-PRI_N and the video streams VS_A-VS_N to display the event on the companion app 130 to all mobile units, to enable non-responding patrol vehicles to continue their regularly scheduled patrols while tracking the progress of the selected intervening unit. For example, in response to the priority signals PRI_A-PRI_N the companion app 130 may display suggestions for prioritizing the patrol routes 462a-462b of the patrol vehicles 460a-460b.

In the example shown, a selected patrol path 472 is shown. The selected patrol path 472 may be from the patrol vehicle 460a to the property 152i. For example, the AI model 140 may determine that the patrol vehicle 460a is closer to the event 470 than the patrol vehicle 460b. In the example shown, even though the property 152i is not on the regular patrol path 462a for patrol vehicle 460a, the AI model 140 may determine that the patrol vehicle 460a may be able to respond to the event 470 faster than the patrol vehicle 460b. The selected patrol path 472 may indicate a fastest legal route from a current location of the patrol vehicle 460a to the property 152i with the detected event 470.

In some embodiments, the companion app 130 may be configured to provide a notification to the drivers of the patrol cars 460a-460b to indicate which patrol car should go on-site to the event 470. The priority signals PRI_A-PRI_N may provide information on whether the driver should go to the event 470 (e.g., go to the event 470 as the first live response, go to the event 470 as a backup response, continue on with a regular patrol while monitoring the event using the video feeds 260a-260n, etc.). Decisions about which patrol car should go on-site to the event 470 may be determined based on, the current location of the patrol car (e.g., the companion app 130 may access geolocation information from the user devices 106a-106n), the location of the event (e.g., the property 152i), the user of the patrol car and/or companion app 130 (e.g., the user settings 216 may comprise credentials of the user such as years of experience, types of training the user has taken, etc.). For example, if the computer vision operations performed to detect the event determines than an intruder detected with a firearm is at the property 152i, and one user in the patrol vehicle 460b has firearms training, then the user with firearms training may be selected to attend the event on-site (e.g., even though the patrol vehicle 460b is farther away than the patrol vehicle 460a, because the operator 302 in the patrol vehicle 460a does not have firearms training and the operator 302 in the patrol vehicle 460b does have firearms training, the patrol vehicle 460b may be selected to respond to the event 470). In another example, the patrol vehicle 460a may be selected if the operator 302 in the patrol vehicle 460a has training for dealing with people with mental illness if the intruder is detected (e.g., using facial recognition) as a person that has a history of mental illness. The factors balanced by the AI model 140 for selecting which of the patrol vehicles 460a-460b to select to respond to the event 470 may be varied according to the design criteria of a particular implementation.

The patrol vehicles 460a-460b are shown as representative examples of a live reaction selected by the AI model 140. Generally, the AI model 140 may be configured to monitor and/or track a location of any type of live, mobile unit equipped with the user devices 106a-106n implementing the video feed monitoring app 130. For example, the video feed monitoring app 130 may be configured to communicate a location of the user devices 106a-106n, which may be used to precisely locate the user devices 106a-106n (e.g., using GPS/GNSS coordinates, using triangulation from cellular towers, etc.). The location of the live unit may be used to determine where the live units are with respect to the smart security devices 102a-102n (e.g., a location on a map).

In one example, the live, mobile units may be the patrol vehicles 460a-460b as shown in association with FIGS. 8-9 (e.g., a patrol vehicle with the user device 106i mounted to the vehicle interior 402). In another example, the live, mobile units may be a person on patrol (e.g., a security guard or security personnel on foot patrol carrying one of the user devices 106a-106n such as a smartphone). In yet another example, the live, mobile units may be a person at a command center (e.g., a security guard or security personnel that is generally stationary at one of the user device 106a-106n such as a desktop computer until receiving the notification to move to the location of the detected event and may carry the smartphone 106b when moving around). In the scenario 450, the patrol vehicles 460a-460b may monitor the streets of a neighborhood. In some embodiments, a patrol guard may monitor a small office, a business, a home, etc. The types of mobile patrol units and/or the environments where the smart security devices 102a-102n are installed may be varied according to the design criteria of a particular implementation.

Figure 10:
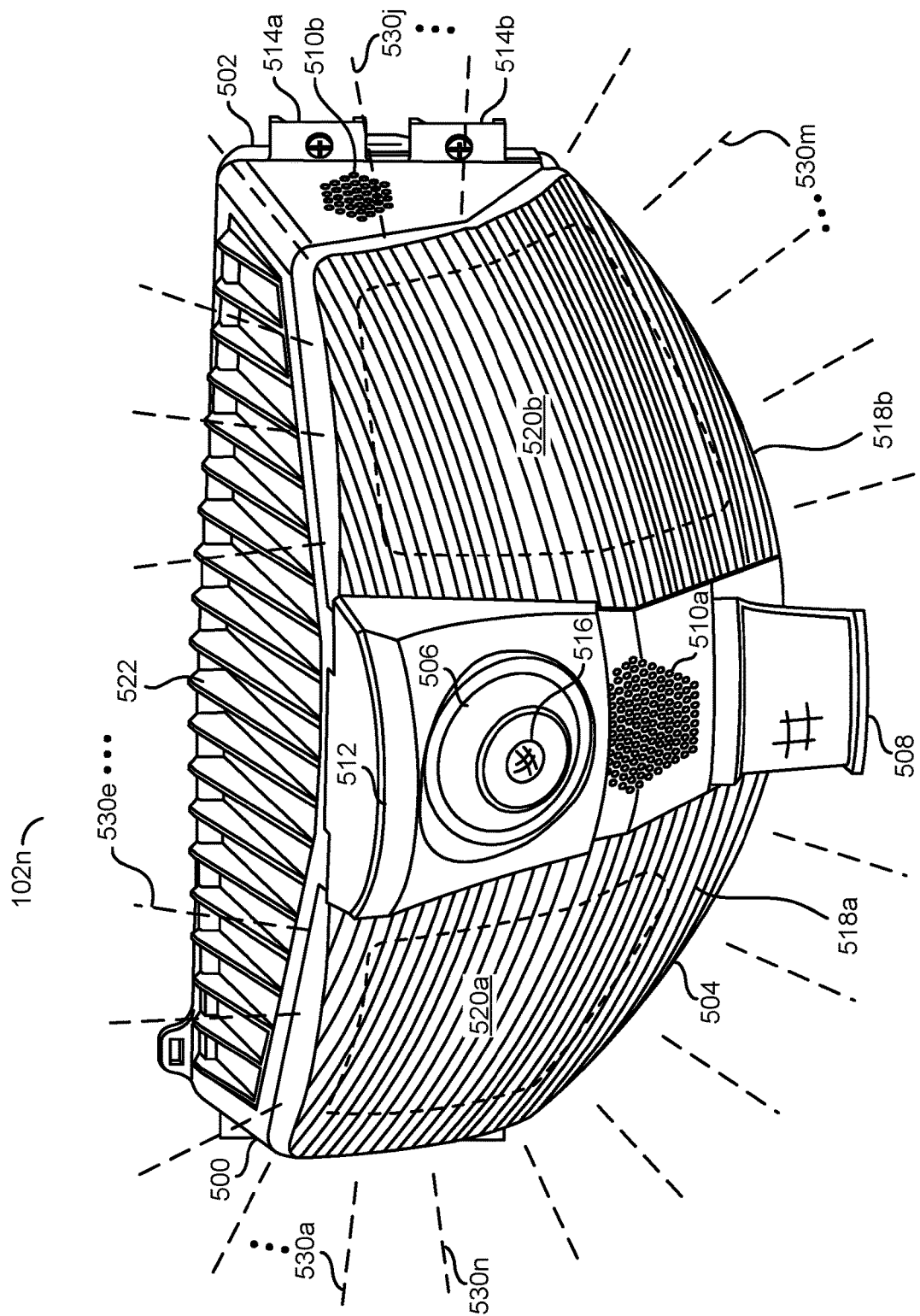
FIG. 10 is a diagram illustrating an example embodiment of a smart security floodlight.

Referring to FIG. 10, a diagram illustrating an example embodiment of a smart security floodlight is shown. The smart security floodlight 102n is shown as a representative example of the various smart security devices 102a-102n described in association with FIG. 1. The smart security floodlight 102n may be configured to capture video and/or provide illumination. The smart security floodlight 102n may be configured to implement a preventative and deterring security measure. The security floodlight 102n may be configured to implement intelligent deterrence. The security floodlight 102n may implement one or more deterrent responses (e.g., reactions). The deterrent responses may prevent crimes before damage is done. In an example, the deterrent responses may comprise sound and/or light. In some embodiments, the deterrent measures may be performed by the smart security floodlight 102n intelligently in response to analyzing video data captured (e.g., by the smart security floodlight 102n and/or by the AI model 140). In some embodiments, the deterrent measures may be performed by the smart security floodlight 102n in response to communication from the companion app 130. The smart security floodlight 102n may be configured to capture the video data (e.g., one of the video data streams VD_A-VD_N) and communicate the video data VD_A-VD_N to the remote device 104.

The smart security floodlight 102n may comprise a housing 500, a back panel 502 and/or a front face panel 504. The housing 500 may be configured to provide an enclosure and/or protection for various components of the smart security floodlight 102n. The components within the housing 500 may be configured to implement the security features of the smart security floodlight 102n. The housing/body 500 may be designed to be vandal proof/resistant. The back panel 502 may be configured to provide an enclosure and/or protection for external wiring and/or a power supply for the smart security floodlight 102n. The back panel 502 may be configured to enable the smart security floodlight 102n to be mounted (e.g., attached to a wall of a premises). The front face panel 504 may be configured to provide protection to lights implemented by the smart security floodlight 102n. The lights may be covered by the front face panel 504. The front face panel 504 may be configured to diffuse the lighting emitted by the smart security floodlight 102n and/or provide a decorative cover for the smart security floodlight 102n. In an example, the front face panel 504 may be replaceable (e.g., swappable) to enable an end user to select various aesthetic designs for the smart security floodlight 102n. The front face panel 504 may be curved LED panel cover that may be clipped on to the smart security floodlight 102n.

In some embodiments, the front face panel 504 may extend from top to bottom and along the sides of the smart security floodlight 102n. The front face panel 504 may be an LED panel. Implementing the front face panel 504 as a frosted LED panel may provide a wide angle of coverage for general illumination. In one example, the LED panel 504 may be a one-piece curved panel to cover the front and sides of the smart security floodlight 102n. In some embodiments, the front face LED panel 504 may extend to the mounting location (e.g., extend along the bottom close to the wall) to provide all-around illumination to limit the amount of dark spots. The front face panel 504 may comprise one or more LED panel covers. For example, the LED panel covers may comprise frosted and/or colored glass/plastic to provide frontal illumination. In some embodiments, one or more of the panels of the front face panel 504 may be an IR window.

The smart security floodlight 102n may comprise a capture device 506, a light (not shown), multiple speakers (not shown), a communication device (not shown), a processor (not shown) and/or passive infrared (PIR) sensor 508. The capture device 506 may be configured as a high resolution camera (e.g., a camera capable of capturing 4K and/or 8K video frames). The light may be configured to provide general illumination and/or a focused spotlight. The speakers may be configured to output audio. The communication device may be configured to communicate with the remote device 104 and/or the user devices 106a-106n. The processor may be configured generate the video data and/or perform video analysis of the video frames captured by the capture device 506 and/or generate control signals for the speakers and/or lights. The PIR sensor 508 may be configured to detect motion.

The capture device 506 is shown attached to the front of the smart security floodlight 102n. The capture device 506 may be configured to capture video data of an area below a level of the smart security floodlight 102n. In an example, the smart security floodlight 102n may be mounted to a wall from at a high location (e.g., higher than six feet to be above people), and the capture device 506 may be directed to capture the ground below the smart security floodlight 102n. In the example shown, the capture device 506 may be implemented as a spherical shape that partially protrudes from the front of the smart security floodlight 102n. The partial protrusion of the capture device 506 may enable some electronics of the capture device 506 to be within the housing 500 (e.g., for protection and/or to enable connection to other internal components of the smart security floodlight 102n, such as the processor). The partial protrusion of the capture device 506 may enable the capture device 506 to move (e.g., pan and tilt) to monitor a wide field of view of the area below the smart security floodlight 102n.

The PIR sensor 508 is shown extending down from the bottom of the front of the smart security floodlight 102n. The PIR sensor 508 is shown attached to the bottom of the smart security floodlight 102n without having a neck connector (e.g., a connection that may provide a hook for a rope that could be used to pull off the PIR sensor 508). Implementing the PIR sensor 508 without a neck may enable the PIR sensor 508 to resist vandalism (e.g., no anchor point for a rope). The PIR sensor 508 may extend from the bottom of the smart security floodlight 102n to capture a wide area (e.g., greater than 180 degree field of view). In some embodiments, the PIR sensor 508 may enable IR for night vision. The PIR sensor 508 may be implemented in a permanently fixed location. The PIR sensor 508 may comprise four separate sensors arranged to capture multiple angles to eliminate blind spots. The PIR sensor 508 may be configured to capture an area of interest without adjustment (e.g., the angle of the PIR sensor 508 may not be moved).

Speaker grilles 510a-510b are shown on the housing 500. The speaker grilles 510a-510b may provide openings to enable the speakers within the housing 500 to emit audio output. The smart security floodlight 102n may further comprise a microphone (not shown). The speaker grilles 510a-510b may enable the microphone implemented within the housing 500 to receive audio input. A combination of the speaker and microphone may enable the smart security floodlight 102n to output audio to playback messages and accept input audio. The security floodlight may further comprise a microphone and/or a speaker (e.g., enable two-way communication).

The housing 500 may comprise a lens hood (or duck visor) 512. The lens hood 512 may provide glare protection for the capture device 506. For example, stray light and/or incidental light may result in glare and/or washed out areas in video frames captured using the capture device 506. The lens hood 512 may prevent and/or partially block stray light and/or incidental light, which may prevent undesired effects in the captured video data. In one example, the lens hood 512 may have a length (e.g., extending from the housing 500) of approximately 67 mm, a base width (e.g., connected along the housing 500) of approximately 100 mm and/or a front width (e.g., over the capture device 506) of approximately 54 mm.

The lens hood 512 may enable sun glare protection for the capture device 506. In some embodiments, the lens hood 512 may provide housing for antennae. For example, antennae for Wi-Fi and/or Bluetooth may be implemented within the lens hood 512. Implementing antennae within the lens hood 512 may enable the housing 500 to implement heat dissipating materials that may interfere with wireless communication.

Hinges 514a-514b are shown on a side of the smart security floodlight 102n. The hinges 514a-514b may connect the back panel 502 to the housing 500. In some embodiments, the hinges 514a-514b may provide support for mounting the smart security floodlight 102n to a wall. The hinges 514a-514b may enable the back panel 502 to be opened to enable access to the wiring and/or power supply of the smart security floodlight 102n. For example, even after the smart security floodlight 102n is secured to a wall, the hinges 514a-514b may enable the back panel 502 to be opened.

A lens 516 is shown on the capture device 506. The lens 516 may receive light to enable the capture device 506 to capture images that may be used to generate video data. A position of the lens 516 may be movable to enable the capture device 506 to adjust a location of the field of view captured. The lens hood 512 may prevent the stray light and/or incident light from entering the lens 516 to prevent glare.

The lens 516 may comprise a wide angle lens. The wide angle lens 516 may enable the security floodlight 102n to capture a wide angle field of view (e.g., generate wide angle video frame). In some embodiments, the video frames generated from the light captured may have a barrel effect (e.g., a bulge distortion) caused by the wide angle lens 516. The processor implemented by the smart security floodlight 102n may be configured to correct (e.g., dewarp) the barrel distortion effect. The front of the housing 500 may have an LED cover 518a-518b. The LED cover 518a-518b may comprise a left portion 518a and right portion 518b. The LED cover 518a-518b may have an upper portion and a lower portion. The capture device 506 may be at the middle of the upper portion of the LED cover 518a-518b. Generally, the upper portion of the LED cover 518a-518b may be slightly angled downwards (e.g., to provide the downwards field of view for the capture device 506). On the left side LED cover 518a, the upper portion may be angled slightly outwards to the left. On the right side LED cover 518b, the upper portion may be angled slightly outwards to the right. The PIR sensor 508 may be at the middle of the lower portion of the LED cover 518a-518b. Generally, the lower portion of the LED cover 518a-518b may be angled downwards at a greater angle than the upper portion of the LED cover 518a-518b. On the left side LED cover 518a, the lower portion may be angled slightly outwards to the left. On the right side LED cover 518b, the lower portion may be angled slightly outwards to the right.

Light panels 520a-520b are shown underneath the LED cover 518a-518b. In the example shown, the smart security floodlight 102n may comprise two light panels 520a-520b. In some embodiments, four light panels 520a-520d may be implemented (e.g., two implemented underneath the left LED cover portion 518a and two implemented underneath the right LED cover portion 518b). For example, the light panel 520a may be located adjacent to the capture device 506 on one side. The light panel 520a may be generally directed straight outwards from the smart security floodlight 102n and angled towards one side (e.g., angled to direct light to the right side of the smart security floodlight 102n). The light panel 520b may be located adjacent to the capture device 506 on an opposite side of the light panel 520a. The light panel 520b may be generally directed straight outwards from the smart security floodlight 102n and angled towards one side (e.g., angled to direct light to the left side of the smart security floodlight 102n). For example, the outwards and slightly downwards angle of the sides of the upper portion of the LED cover 518a-518b may direct the light panels 520a-520b to the left and to the right of the smart security floodlight 102n and out in front of the smart security floodlight 102n.

In embodiments with four light panels (e.g., light panels 520a-520d), the light panels 520c-520d may be located on the lower portion underneath the LED covers 518a-518b. The light panel 520c may be located below the light panel 520a and generally directed on a downwards angle. The light panel 520d may be located below the light panel 520b and generally directed on a downwards angle. For example, the outwards and downwards angle of the sides of the lower portion of the LED covers 518a-518b may direct the light panels 520c-520d to the left and to the right of the smart security floodlight 102n and below the smart security floodlight 102n.

A heatsink 522 is shown on the top of the smart security floodlight 102n. The heatsink 522 may comprise metallic fins. The metallic fins of the heatsink 522 may be configured to dissipate heat. For example, the light panels 520a-520b and/or other components of the smart security floodlight 102n may generate heat and the heatsink 522 may ensure a safe operating temperature for the smart security floodlight 102n. In an example, the heatsink 522 may be bare aluminum configured to reflect sunlight during the daytime and dissipate heat from a heatsink internal to the housing 500 when the light panels 520a-520b are powered on. In an example, by implementing the heatsink 522, the smart security floodlight 102n may operate at approximately 28 degrees Celsius above ambient temperature after 30 minutes of continuous operation.

Dotted lines 530a-530n are shown. The dotted lines 530a-530n may represent the light emitted by the light panels 520a-520b. The light 530a-530n generated by the light panels 520a-520b may be configured to illuminate an area below a level of the smart security floodlight 102n. The light 530a-530n generated by the light panels 520a-520b may be configured to illuminate an area in front of the smart security floodlight 102n. The light 530a-530n generated by the light panels 520a-520b may be configured to provide lighting to enable the lens 516 to receive light to enable the capture device 506 to generate pixel data that may be used to generate the video frames.

The light panels 520a-520b may comprise LED lighting elements. The light panels 520a-520b may be configured to generate white light. In an example, the smart security floodlight 102n may be configured to control a brightness of the white light (e.g., perform dimming and/or increasing an intensity of the white light). In another example, the smart security floodlight 102n may be configured to control a temperature of the white light (e.g., softer 'natural' white lighting to 'cool' white lighting). In an example, the white light generated by the light panels 520a-520b may be tunable from 3 k to 5 k Kelvin color temperature and generate up to 10000 lumens. The light panels 520a-520b may be configured to generate colored lights. In an example, the light panels 520a-520d may be configured to emit blue colored light and red colored light. In an example, the red and blue colored light may be approximately 920 lumens (e.g., brighter than 1000 lumens in red and blue light may be dangerously bright). For example, the flashing red and blue light may be similar to police lights. The intensity, hue, temperature and/or other characteristics of the light emitted by the light panels 520a-520b may be varied according to the design criteria of a particular implementation.

In some embodiments, each of the light panels 520a-520b may be configured to emit the white, red and blue colored lighting. In some embodiments, the tunable white light may be generated by all of the panels 520a-520b. In some embodiments, the red and blue colored lights may be generated by only the two light panels 520a-520b on the upper portion of the smart security floodlight 102n. For example, implementing the bottom light panels 520c-520d as white light may provide illumination while switching the top panels 520a-520b from white light to the red and blue light may provide a warning and/or deterrent effect. The arrangement of the light panels 520a-520d may be varied according to the design criteria of a particular implementation.

The LED panels 520a-520d may be configured to operate in various modes of operation. In one example, one mode of operation of the light panels 520a-520d may illuminate an area near the smart security floodlight 102n. For example, the light panels 520a-520d may each emit white light for illumination. In another example, one mode of operation of the light panels 520a-520d may focus a high intensity light beam on a target. For example, the smart security floodlight 102n may comprise a mechanism for adjusting the direction of the light panels 520a-520d. Video analysis may be implemented to detect an object (e.g., identify a target such as an intruder). The light panels 520a-520d may be directed to follow the movement of the target based on the location of the target detected by analyzing the video frames. In yet another example, one mode of operation of the light panels 520*a*-520*d* may strobe colored light. For example, the light panels 520*a*-520*b* (e.g., the panels on the upper portion of the LED cover 518*a*-518*b*) may generate the red and blue light with a strobe effect. In another example, the white light may provide a strobe effect. For example, the strobe effect of the light 530*a*-530*n* along with other deterrent measures (e.g., a siren) may be 99% effective at deterring intruders (e.g., causing potential intruders to leave before damage/ theft occurs). The patterns of lighting, the lighting effect and/or the number of modes of operation of the light panels 520*a*-520*d* may be varied according to the design criteria of a particular implementation.

Figure 11:
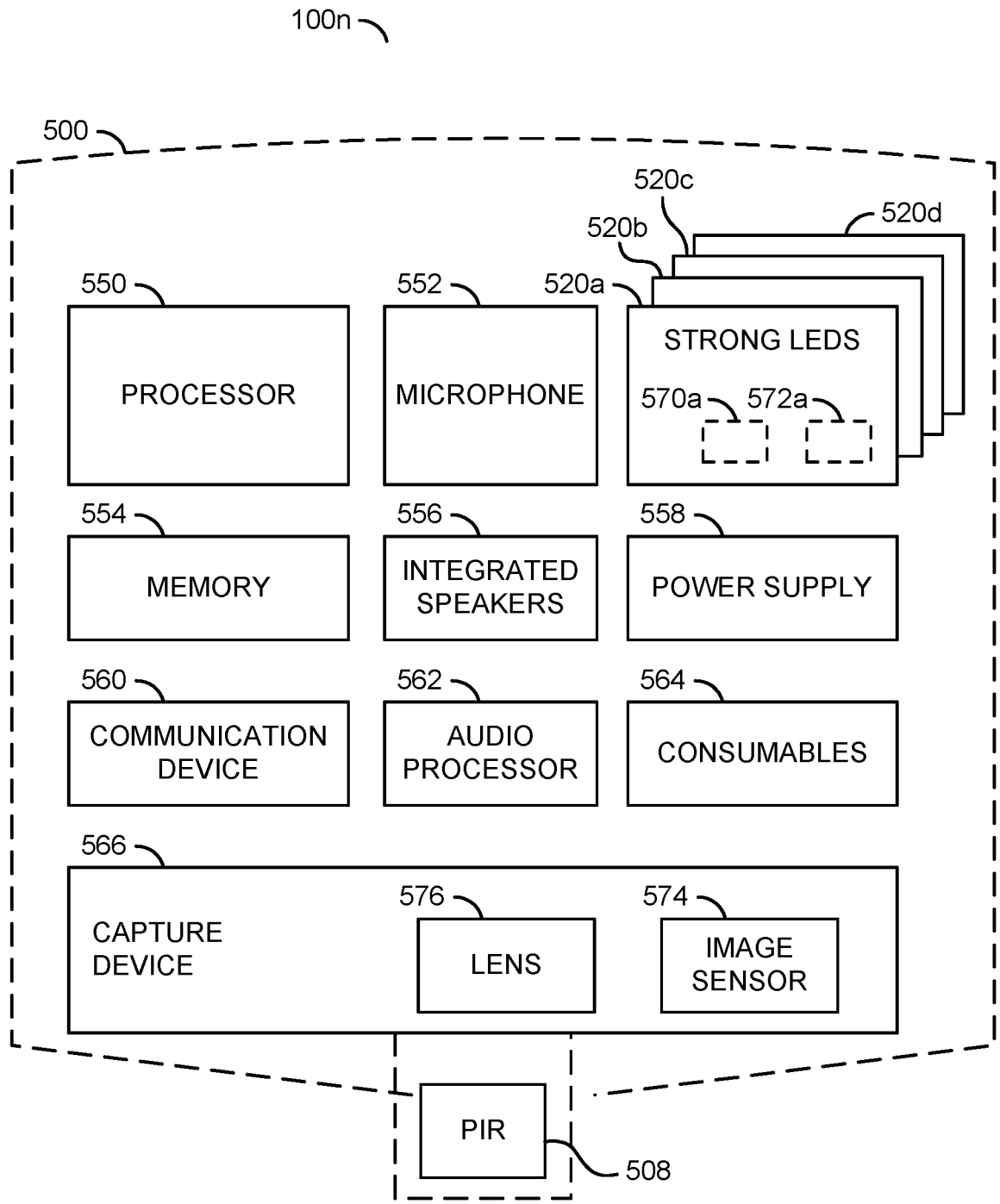
FIG. 11 is a block diagram illustrating components of the security floodlight.

Referring to FIG. 11, a block diagram illustrating components of the security floodlight is shown. The housing 500 of the smart security floodlight 102*n* is shown. The housing 500 may be hollow to provide a protective and/or decorative enclosure for the components of the smart security floodlight 102*n*. The components of the smart security floodlight 102*n* may be contained within or partially contained within the housing 500. The housing 500 may have a limited amount of internal space. To provide functionality, the components of the smart security floodlight 102*n* may need to fit within the size and/or heat dissipation constraints of the hollow housing 500.

The housing 500 may comprise the capture device 506, the PIR sensor 508, the LED panels 520*a*-520*d*, a block (or circuit) 550, a block (or circuit) 552, a block (or circuit) 554, a block (or circuit) 556, a block (or circuit) 558, a block (or circuit) 560, a block (or circuit) 562 and/or a block (or circuit) 564. The circuit 550 may implement the processor. In an example, the processor 550 may be a video processor. The circuit 552 may implement the microphone. The circuit 554 may implement a memory. The circuit 556 may implement the integrated speakers. The circuit 558 may implement the power supply. The circuit 560 may implement the communication device. The circuit 562 may implement an audio processor. The circuit 564 may implement a consumable actuator. The smart security floodlight 102*n* may implement other components (not shown). The number, type and/or arrangement of the components of the smart security floodlight 102*n* may be varied according to the design criteria of a particular implementation.

The video processor 550 may be configured to generate video data (e.g., one of the video data streams VD_A-VD_N) in response to pixel data received from the capture device 506. The video processor 550 may be configured to generate high resolution video frames. The video processor 550 may be configured to perform the video operations (e.g., digital panning, zooming and tilting (e.g., PZT), digital cropping, video analysis, object detection, behavior detection, object location tracking over a sequence of video frames, etc.). The video analysis performed by the video processor 550 may be configured to detect and/or recognize objects. The video analysis performed by the processor 550 may track movement of an object temporally over a sequence of video frames.

The video processor 550 may be configured to encode and/or decode video frames into various formats (e.g., video formats and/or still image formats). The video processor 550 may be configured to compress and/or stream video data. The video processor 550 may be configured to re-size images and/or video frames for a fixed resolution (e.g., a fixed resolution used by a neural network).

In some embodiments, the video processor 550 may implement a neural network (e.g., the AI model 140). The neural network may be configured to analyze the video data in real time. The video analysis performed by the neural network may detect, recognize and/or classify objects. For example, the objects may comprise people (e.g., a visitor), animals, inanimate objects (e.g., a delivered package), etc. The video analysis may be configured to learn patterns, recognize objects and/or recognize faces. The processor 550 may be configured to de-warp the video captured (e.g., correct distortions caused by the lens 516).

The processor 550 may be configured to read information from the components of the smart security floodlight 102*n*, write information to the components of the smart security floodlight 102*n* and/or execute computer readable instructions. In one example, the processor 550 may be a video processor. The processor 550 may be configured to perform video processing operations to generate video frames. The processor 550 may be configured to select still images from the video frames to upload to a remote device (e.g., distributed servers). The processing capability of the processor 550 may be limited due to size constraints, power constraints, cost constraints, etc.

The processor 550 may be configured to detect one or more triggering events. The triggering events may occur when a particular input is determined to be above some pre-determined threshold value. The processor 550 may analyze input detected by one or more of the components of the smart security floodlight 102*n* to determine whether the detected input is above the pre-determined threshold. In one example, the triggering event may be when the processor 550 determines that the input from the PIR sensor 508 is above a threshold for motion. In another example, the triggering event may be when the processor 550 determines that the incoming audio detected by the microphone 552 is above a particular audio level and/or matches a particular frequency pattern. In an example, when the processor 550 determines that a triggering event has occurred, the processor 550 may adjust the mode of operation of the light panels 520*a*-520*d* (e.g., strobe the red/blue lights, track a movement of an identified object with a high intensity light beam, increase the brightness of the white light, etc.). The type of input and/or the threshold value for the particular type of input that results in a triggering event may be varied according to the design criteria of a particular implementation.

In one example, the processor 550 may be configured to analyze the video frames for a particular amount of motion and/or a change in the amount of light to detect a triggering event (e.g., an amount of motion above a threshold amount of motion). In another example, the processor 550 may implement the neural network artificial intelligence model 140 to determine whether the video frame has captured a particular type of object (e.g., a person, an animal, a vehicle, a package, etc.) to detect the triggering event. In an example, the processor 550 may implement a relatively simple neural network module that may be a modified and/or compressed version of a neural network module implemented by a cloud computing service. The compressed simple neural network module implemented by the processor 550 may have a reduced size and/or complexity to enable execution on the processor 550 and/or within the power and/or heat constraints of the smart security floodlight 102*n*.

The microphone 552 may receive audio signals (e.g., input audio). Audio signals detected by the microphone 552 may be used by the processor 550 to generate various control signals (e.g., a triggering event). In one example, audio signals generated by the visitor may be received by the microphone 552 to generate a control signal for the components of the smart security light 102*n* used to control the light panels 520a-520d, control a door (e.g., opening, closing, and/or locking a door) and/or generate audio from the integrated speakers 556. Audio signals detected by the microphone 552 may be used as an audio password. For example, voice recognition may be used to generate a password. The audio password may be needed to allow the smart security floodlight 102n to generate various control signals. In one example, the microphone 552 may capture the audio input and present the audio input to the communication device 560 for streaming to a smartphone, a remote server and/or a call center. In another example, the microphone 552 may capture the audio input and present the audio input to the audio processing component 562 for encoding (e.g., to be stored by the storage component 554).

The memory (or storage component) 554 may be configured to provide electronic storage for the captured video frames, audio files for playback, computer readable instructions, firmware, etc. The memory 554 may store computer readable data (e.g., images, audio, video, sensor readings and/or other data). In one example, the storage component 554 may be a non-volatile storage medium. In another example, the storage component 554 may be a combination of non-volatile and volatile memory. Data stored in the memory 554 may be compared to various signals from sensor modules implemented by smart security floodlight 102n. In one example, the data stored in the memory 554 may be a password. The processor 550 may compare the password with signals from the sensor modules. The comparison may determine whether a triggering event has occurred. The storage component 554 may store audio data (e.g., the pre-recorded audio for playback, the received audio), video data (e.g., the video streams, still images), computer readable instructions and/or other data.

The integrated speakers 556 may generate audio signals. The integrated speakers 556 may be configured to playback audio. The integrated speakers 556 may comprise multiple speakers that may be located near the speaker grilles 510a-510c shown in association with FIG. 10. The integrated speakers 556 may be implemented as more than one speaker. In one embodiment, the integrated speakers 556 may be configured to generate a loud volume sound (e.g., over 110 dB at approximately 10 feet). However, the particular volume generated may be varied to meet the design criteria of a particular implementation.

The power supply (or power adapter) 558 may receive electrical power from the premises. Electrical power from the premises may be presented via the back panel 502. The power adapter 558 may convert the electrical power (e.g., from AC to DC). The converted electrical power may provide a power supply to the various components within the housing 500. The power adapter 558 may perform voltage regulation. In one example, the power adapter 558 may be implemented as a 5V power adapter.

In one example, the power storage component 558 may be a battery (e.g., rechargeable) configured to supply power to the components of the smart security floodlight 102n. In another example, the power storage and/or adapter component 558 may be configured to convert an AC power supply to DC power usable by the components of the smart security floodlight 102n.

The communication device 560 may be configured to implement wireless communication. The communication device 560 may be configured to implement one or more wireless communications protocols (e.g., Wi-Fi, Bluetooth, ZigBee, ZWave, etc.). The communication device 560 may be configured to receive instructions from a remote (Internet) source. The communication device 560 may be configured to connect to a local network and/or a wide area network (e.g., the network 60). In some embodiments, the communication device 560 may be configured to implement one or more types of communications protocols. For example, the communication device 560 may support a Wi-Fi connection and/or a Bluetooth connection. In some embodiments, the communication device 560 may be distributed as multiple circuits (e.g., a processing chip for each communications protocol). Other types of communications protocols may be implemented according to the design criteria of a particular implementation. In some embodiments, the communication device 560 may implement the Bluetooth connection to connect to a remote device (e.g., a smartphone) to provide an interface for configuring the smart security floodlight 102n (e.g., to allow the user to input local network settings).

The communication device 560 may receive and/or transmit data signals. The communication device 560 may register electromagnetic signals, acoustic signals, and/or other signals. The communication device 560 may provide control signals (e.g., to turn on the LED panels 520a-520d, create sound from one or more of the integrated speakers 556, send alerts to users, send other wireless signals, etc.).

In some embodiments, the communication device 560 may implement the Wi-Fi connection to connect to the cloud service 104 via the internet 60. The communication device 560 may enable a stream of the video data VD_A-VD_N and/or images generated by the processor 550 to the cloud service 104. In one example, the communication device 560 may find an available server and upload the video stream and/or images VD_A-VD_N to the available server. In another example, the communication device 560 may implement an upload queue and the available server may pull the data from the upload queue. The communication device 560 may be configured to receive the signals RCT_A-RCT_N from the remote device 104 as instructions to perform the various security feature reactions selected by the AI model 140.

The communication device 560 may enable the smart security floodlight 102n to communicate with other security floodlights to form a network of security floodlights. The network may provide multi-camera co-ordination (e.g., to cover a large area such as in a car dealer lot, buildings with electrical panels, retail malls, churches, schools, etc.) to create an effective deterrent. In some embodiments, the security floodlight may communicate with UAV drones to track intruders.

In some embodiment, the audio processing component 562 may be a separate processor from the video processor 550. In some embodiments, the audio processing component 562 may be implemented as a component, submodule and/or chiplet of the video processor 550. The audio processor 562 may be configured to encode, decode and/or play back audio. In an example, the audio processing component 562 may be configured to play back pre-recorded audio stored in the storage component 554 (e.g., pre-recorded greetings, alarms, music, etc.). In another example, the audio processing component 554 may be configured to play back audio received from a smartphone and/or from a remote call center in real-time.

In some embodiments, the audio processing component 562 may be configured to stream audio signals from a smartphone, and/or other devices within range of the smart security floodlight 102n. The communication module 560 (e.g., a Wi-Fi antenna) may be configured to communicate with the smartphone, and/or other devices to send and/or receive audio signals. In some embodiments, the communication module 560 may comprise a connection port that may be configured to communicate with various devices to send and/or receive audio signals (e.g., via USB). The audio signals may be stored in the memory 554. In one example, the integrated speakers 556 may generate audio signals to attract outdoor wildlife and/or chase away undesired wildlife. The smart security floodlight 102n may capture images of the wildlife. Images may be stored in the memory 554. An alert may be sent to the user via the companion application 130.

The consumable actuator 564 may be configured to release some type of consumable (e.g., pepper spray, tear gas, a foul smelling substance, etc.). Generally, the consumable may be re-fillable. Releasing the consumable may be one type of deterrent implemented by the smart security floodlight 102n. For example, the foul smelling substance may be released to encourage a loiterer to leave the area. In one example, the consumable actuator 564 may implement a spray for a liquid substance. The type of consumable actuator 564 implemented may be varied according to the design criteria of a particular implementation.

The light panels 520a-520d may comprise respective blocks (or circuits) 570a-570d and/or blocks (or circuits) 572a-572d. The circuits 570a-570d may each implement a LED controller for a respective one of the light panels 520a-520d. The circuits 572a-572d may each implement a pan/tilt (PZ) actuator for a respective one of the light panels 520a-520d. The light panels 520a-520d may comprise other components (not shown). The type and/or arrangement of the components of the light panels 520a-520d may be varied according to the design criteria of a particular implementation.

The LED controllers 570a-570d may each be configured to adjust a timing, color, brightness, etc. of the LEDs 520a-520d. For example, the LED controllers 570a-570d may adjust the color of the LEDs 520a-520d from a white light to red, white and blue (e.g., to provide a deterrence that is similar to a police light). The LED controllers 570a-570d may adjust the LEDs 520a-520d to operate as a strobe light. In an example, control signals generated by the processor 550 may provide instructions for the LED controllers 570a-570d. The LED controllers 570a-570d may be configured to select the mode of operation of the light panels 520a-520d.

The PT actuators 572a-572d may be configured to provide pan and/or tilt adjustments to the LEDs 520a-520d. The PT actuators 572a-572d may be controlled by the LED controllers 570a-570d. The PT actuators 572a-572d may enable the LEDs 520a-520d to provide general illumination. The PT actuators 572a-572d may enable the LEDs 520a-520d to move in order to provide a focused light beam (e.g., place a spotlight on a target location). In one example, the LED panels 520a-520d may be reflected from a focusing mirror controlled by 2 step motors. In another example, a powerful light beam may be directed on an object of interest. In yet another example, a small group of LED elements may be selected from a large array of LED elements in the light panels 520a-520d to aim and focus on the object of interest. The PT actuators 572a-572d may be configured to enable the light panels 520a-520d to be adjusted based on the mode of operation of the light panels 520a-520d.

The capture device 506 is shown comprising the lens 516 and/or a block (or circuit) 574. The circuit 574 may implement an image sensor. The capture device 506 may comprise other components (not shown). In an example, the capture device 506 may comprise a frame buffer and/or other logic. The number, type and/or arrangement of the components of the capture device 506 may be varied according to the design criteria of a particular implementation.

The video processor 550 may generate video frames (e.g., one or more video streams) in response to the pixel data received from the image sensor 574. The image sensor 574 may implement video and/or image capture devices. The image sensor 574 may be configured to receive the light that enters the capture device 506 through the lens 516. In an example, the image sensor 574 may be rectangular with a 16:9 aspect ratio.

The image sensor 574 may be configured to receive incoming light within a truncated rectangular pyramid field of view (e.g., truncated as a result of the glare reduction implemented by the lens hood 512). The image sensor 574 may be configured to convert received light into computer readable data (e.g., raw data and/or pixels that may be processed by the processor 550 to generate video frames). The image sensor 574 may be implemented to enable video data to be recorded.

The lens 516 shape and/or location may correspond with the image sensor 574. The lens 516 may be configured to focus incoming light onto the image sensor 574. The lens 516 may be a wide-angle lens. In an example, the lens 516, the image sensor 574 and/or other circuits may implement the capture device 506. The processor 550 may be configured to generate video frames by performing image signal processing in response to captured pixels transmitted from the image sensor 574. In some embodiments, the image sensor 574 may be configured to generate the video frames (e.g., perform image signal processing) from the captured pixels and present the video frames to the processor 550.

The image sensor 574 may enable the capture of video data using the processor 550. For example, the processor 550 may be configured to generate 720p HD, 1080p, 4 k and/or 8 k video data from the pixel data captured by the image sensor 574. The image data (e.g., pixels) may be used to generate high-resolution video frames along with audio data. The quality of the video frames may be varied according to the design criteria of a particular implementation. Generally, the quality (e.g., resolution, level of detail, color, etc.) of the video frames is enough to support object detection (e.g., facial recognition, motion detection, object identification, tagging, etc.).

In some embodiments, the video processor 550 may be configured to generate time-lapse videos at maximum resolution that may be stored locally in the memory 554 for transmission when there may be more bandwidth available (e.g., night transmission). The video processor 550 may be configured to provide instructions to the LED controllers 570a-570d and/or the PT actuators 572a-572d to focus the spotlight generated by one or more of the modes of operation of the light panels 520a-520d. The video processor 550 may provide artificial intelligent controls to move the LED panels 520a-520d (e.g., instructions to the PT actuators 572a-572d) and/or control the LED panels 520a-520d (e.g., instructions to the LED controllers 570a-570d to adjust brightness, frequency, color, etc.). The video processor 550 may select which audio to output through the speakers 556 (e.g., the 508 dB commercial siren, the conversational AI audio to engage intruders until help arrives, etc.).

In some embodiments, the communication device 560 may be configured to scan for devices in the area of interest. The communication device 560 may detect mobile devices carried by the intruder. For example, mobile devices may transmit a MAC address that may be captured by the communication device 560. Based on the MAC address, the smart security floodlight 102n may be configured to generate a personalized voice down message. The personalized voice down message may comprise information determined based on the MAC address (e.g., the type of device, a network carrier used by the device, a name associated with the device, etc.). For example, the personalized voice message may be "We have detected your smartphone. We know that you are using a Samsung Galaxy S10e and are connected to a Verizon network".

The smart security floodlight 102n may further comprise various sensor modules (e.g., environmental sensors). In an example, the smart security floodlight 102n may comprise an electromagnetic field sensor, an acoustic field sensor, a voice recognition sensor, a facial recognition sensor, a gesture sensor, a weather sensor and/or other sensors. One or more of the sensor modules, or a combination of the sensors modules, may be implemented internally (e.g., within the housing 500) or, alternatively, may be implemented externally (e.g., as a separate sensing device coupled to the smart security floodlight 102n). Input received by the sensor modules may be used to generate control signals and/or detect triggering events.

In some embodiments, the smart security floodlight 102n may store the captured video frames (e.g., in the memory 554). In some embodiments, the video frames may be uploaded to storage servers (e.g., a remote device). Generally, the storage servers and/or the memory 554 may have a limited storage capacity. In some embodiments, the smart security floodlight 102n may analyze the captured video frames (e.g., using the processor 550) and/or data from the IR sensor 508 to perform a particular type of detection (e.g., based on a triggering event). For example, the smart security floodlight 102n may detect objects, motion and/or visitors within 3 meters (e.g., 10 feet). Still images generated from the captured video frames may be uploaded to distributed servers. The neural network AI model 140 implemented by the distributed servers 104 may determine whether objects are present in the images uploaded. Based on the feedback from the distributed servers, the smart security floodlight 102n may initiate storage of the video data in storage servers in response to the particular type of detection.

The processor 550 and/or the AI model 140 may implement machine learning techniques to improve detection accuracy of visitors and/or objects. For example, the user may be able to provide a correct and/or incorrect label to a detection performed by the processor 550. If the detection is incorrect, the incorrect label may be used by the smart security floodlight 102n to incorporate an incorrect result of the detection into the machine learning techniques. In some embodiments, the machine learning techniques may be implemented in the cloud service 104 (e.g., the analysis is performed using cloud computing resources) based on feedback about whether objects of interest were actually present. Video data and/or correct/incorrect labels may be uploaded and/or stored anonymously (e.g., without personal identification information). The smart security floodlight 102n may be configured to ignore (e.g., not respond to, not track and/or not send notifications in response to) small animals and/or shadows.

The components within and/or partially within the housing 500 may provide the functionality of the smart security floodlight 102n. In some embodiments, the components may implement the functionality for a smart security camera. In one example, the integrated speaker 556 and the audio processing device 562 may be configured to generate audio for communicating to a visitor and the microphone 552 may be configured to receive audio (e.g., to enable 2-way communication).

In some embodiments, the processor 550 and/or the audio processor 562 may be configured to perform audio analytics. The microphone 554 may capture audio input. In an example, the audio input may be a response from a visitor. The processor 550 and/or the audio processor 562 may extract words and/or sounds from the audio input to determine the content of the audio input. The audio analytics may be configured to parse the content of the audio input to determine a meaning of and/or understand the audio input. In some embodiments, the audio analytics may transcribe the content of the audio input to provide training data for machine learning. Using the audio analytics to understand the audio input may enable the processor 550 to determine the context and/or generate an appropriate reaction.

The smart security floodlight 102n may be configured to deter potential intruders. In some embodiments, the security features of the smart security floodlight 102n selected as a reaction to the detected intruder may be selected by the AI model 140 (e.g., communicated via the signals RCT_A-RCT_N). In an example, an effectiveness measurement of deterrence of intruders may be determined based on a metric of detecting that the potential intruder(s) has left a field-of-view of the capture device 506 within approximately 60 seconds and the intruders are not detected afterwards. One example deterrent method implemented by the smart security floodlight 102n may be the processor 550 providing a control signal to the LED controllers 570a-570d to cause the light panels 520a-520d to provide a very bright red/blue colored strobe effect along with the integrated speaker 504 generating sound of a police siren wailing at 110 dB.

In an example, the image sensor 574 may be configured to provide data for the processor 550 to generate 4 k resolution video frames. The processor 550 may be configured to generate 4 k resolution video frames at approximately 15 frames per second for recording (e.g., storing in the memory 554). The processor 550 may be also configured to generate lower resolution video frames simultaneously (e.g., video frames at 720P resolution for streaming via the communication device 560). The processor 550 may be configured to provide digital pan/tilt/zoom features. In an example, the processor 550 may provide a 32X digital zoom to enable generating 480P lower resolution video frames from the high resolution 4 k video frames.

The integrated speakers 556 may be implemented as multiple speakers. In an example, the integrated speakers 556 may comprise a center, left and right speaker (e.g., generally corresponding with the location of the speaker grills 510a-510b shown in association with FIG. 10). Each of the integrated speakers 556 may implement a 6 W speaker. The integrated speakers 556 may operate in conjunction with the microphone 554 and the communication device 560 to provide full duplex audio communication. The communication device 560 may provide an Ethernet connection, Wi-Fi communication (e.g., longer range wireless) and/or Bluetooth communication (e.g., shorter range wireless).

The processor 550 may be configured to generate control signals in response to video operations and/or analysis performed on the video data. In some embodiments, the control signals generated may be configured to generate audio from the speakers, control and/or adjust the lights and/or mechanically control the capture device 506 to pan, tilt and/or zoom the lens 516.

Video operations performed by the processor 550 may be configured to enable a digital pan, zoom and/or tilt (PZT) in real-time. The digital PZT may enable particular areas (e.g., areas that may be determined to be troubling areas) to be examined closely. The video operations may further comprise object detection. Objects may be identified in the video frames. For example, one object that may be detected is an intruder. The intruders may be tracked over a sequence of video frames to determine behavior and/or a location of the intruder. The high resolution video frames captured by the camera may be stored locally and/or transmitted wirelessly. To enable transmission of the video data wirelessly (e.g., over a Wi-Fi connection) the smart security floodlight 102n may be configured to perform video operations to crop portions of the high resolution video frames into one or more lower resolution video frames.

In some embodiments, the processor 550 may perform the computer vision analysis to detect events locally and upload the results of the computer vision analysis to the remote device 104 (e.g., as metadata along with the video data VD_A-VD_N). In some embodiments, the processor 550 may generate and/or encode the video data VD_A-VD_N and transmit the video data VD_A-VD_N to the remote device without performing analysis. For example, the AI model 104 may perform the video analysis on the video data VD_A-VD_N generated by the processor 550. In some embodiments, the computer vision analysis performed by the processor 550 may be an initial threshold analysis (e.g., to flag any potential events at a basic level) and the AI model 140 in the remote device 104 may perform a more detailed computer vision analysis only on the video data that has been flagged by the processor 550. For example, the processor 550 may determine whether an object detected is a person and the AI model 140 may perform more detailed facial recognition analysis on the detected person to identify the person. Whether the computer vision operations are performed by the AI model 140 in the remote device 104 or by the processor 550 may be varied according to the design criteria of a particular implementation. Details of the components and/or functionality of the smart security floodlight 102n may be described in association with U.S. application Ser. No. 16/850,924, filed on Apr. 16, 2020, appropriate portions of which are hereby incorporated by reference.

Figure 12:
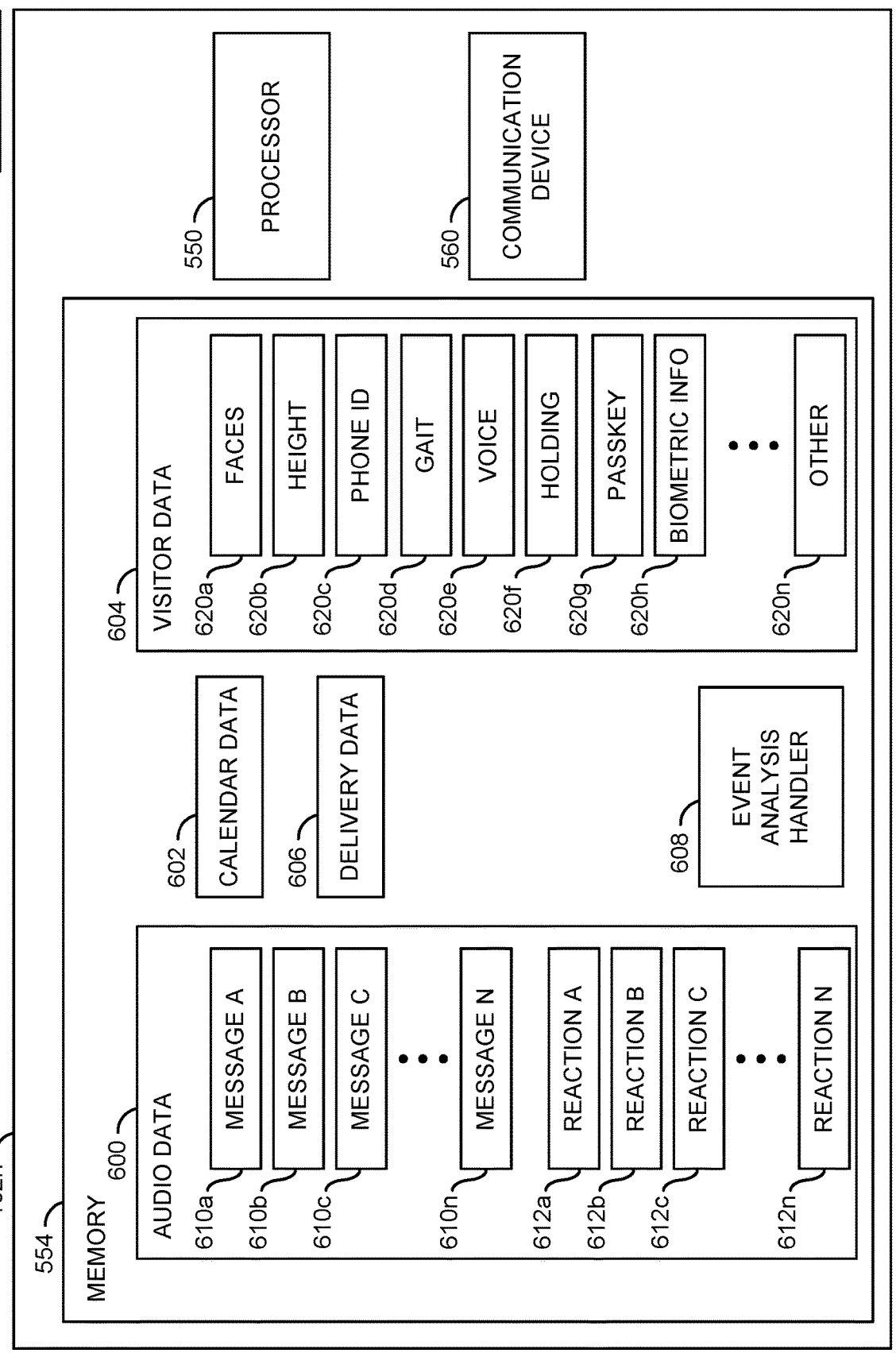
FIG. 12 is a block diagram illustrating data storage of a smart security floodlight.

Referring to FIG. 12, a block diagram illustrating data storage of a smart security floodlight is shown. A block diagram of some of the components of the smart device 102n is shown. The processor 550, the wireless communication device 560 and/or the memory 554 are shown in the block diagram of the smart device 102n. The block diagram of the smart device 102n may be a representative example of storage for the smart devices 102a-102n.

The memory 554 may comprise a block (or circuit) 600, a block (or circuit) 602, a block (or circuit) 604, a block (or circuit) 606 and/or a block (or circuit) 608. The block 600 may implement audio data storage. The block 602 may implement calendar data storage. The block 604 may implement visitor data storage. The block 606 may implement delivery data storage. The block 608 may implement an event analysis handler. The memory 554 may comprise other components (not shown). While the blocks 600-608 are shown as discrete blocks, the various functionality of the blocks 600-608 and/or other components of the memory 554 may share resources, components, logic blocks and/or circuitry. In some embodiments, one or more of the data stored by the blocks 600-608 may be stored by the remote device 104, or stored by both the remote device 104 and the smart devices 102a-102n. The number and/or arrangement of the components of the memory 554 may be varied according to the design criteria of a particular implementation.

The audio data 600 may store audio files. The audio data 600 may comprise blocks (or circuits) 610a-610n and/or blocks (or circuits) 612a-612n. The blocks 610a-610n may comprise a number of audio message options. For example, the audio message options 610a-610n may be the set of available audio messages (e.g., greetings) that may be selected by the processor 550 and/or in response to the signals RCT_A-RCT_N. One or more of the audio message options 610a-610n may be played back by the speaker 556 as an output audio message (e.g., a greeting reaction). The blocks 612a-612n may comprise a number of audio reaction options. For example, the reaction options 612a-612n may be the set of available audio reactions (e.g., for enabling the conversational AI) that may be selected by the processor 550 and/or the signals RCT_A-RCT_N. One or more of the reaction options 612a-612n may be played back by the speaker 556.

In the example shown, only the audio message options 610a-610n and the reaction options 612a-612n are shown in the audio data 600. However, the audio data 600 may comprise other types of audio files (e.g., alarms, other dialog options, instructions, animal noises, music, etc.). The audio files 610a-610n and/or 612a-612n may be stored in a compressed and/or encoded format. For example, the audio message options 610a-610n and/or the reaction options 612a-612n may be pre-recorded audio files (e.g., .mp3, .wav, .flac, etc.). In some embodiments, the audio data 600 may be received from the cloud service 104 with the signals RCT_A-RCT_N as pre-recorded audio files (e.g., different voice options such as male/female, accents, language, etc.). In some embodiments, the property owner may record and store audio as the audio files 610a-610n and/or 612a-612n (e.g., customizable dialog options).

The calendar data 602 may comprise a schedule of settings for selecting the audio message options 610a-610n. The calendar data 602 may further comprise scheduled events that may be associated with the audio message options 610a-610n. The calendar data 602 may be configured to import calendar information intelligently from other scheduling services (e.g., Outlook, Google calendar, iCloud, etc.). The calendar data 602 may comprise settings for selecting the audio message options 610a-610n and/or the reaction options 612a-612n at multiple granular levels (e.g., time ranges) based on a time of day and/or a schedule of a property owner (e.g., at work, on vacation, sleeping, hosting a party, etc.). In an example, the scheduled settings in the calendar data 602 may comprise monthly settings, weekly settings, daily settings, hourly settings, etc. The calendar data 602 may comprise default settings and/or additional settings that may over-ride the default settings.

The visitor data 604 may comprise whitelists and/or blacklists (e.g., allow lists and/or deny lists) of visitors. The visitor data 604 may comprise characteristics of detected visitors (e.g., size, height, weight, face recognition, clothing worn, etc.). The visitor data 604 may comprise feature maps of the characteristics of the visitors. The feature maps of the characteristics of visitors stored in the visitor data 604 may be used by the processor 550 and/or the AI model 104 to compare to the feature maps of characteristics of the current visitor 50 detected using the computer vision analysis. By comparing the information analyzed from the video frames of the current visitor 50 to the stored visitor data 604, the processor 550 and/or the AI model 104 may determine whether the visitor 50 is known (e.g., a recognized face, a delivery person, a known person such as a family member or friend, a blacklisted person, etc.) or unknown (e.g., a stranger, a person that has not been detected by the smart device 102n before, etc.).

The visitor data 604 may be used together with the calendar data 602 in order to select an appropriate one of the audio message options 610a-610n to playback as the output audio by the speakers 556. In one example, a different one of the set of audio message options 610a-610n may be selected when an unknown visitor is detected when the calendar data 602 indicates that the property owner is on vacation than the greeting selected when the calendar data 602 indicates that the property owner is at home. For example, if the visitor data 604 indicates that the visitor 50 is unknown and the calendar data 602 indicates that the property owner is on vacation, the audio message selected may tell the visitor to leave (e.g., "Please leave or the authorities will be contacted"). However, if the visitor data 604 indicates that the visitor 50 is unknown and the calendar data 602 indicates that the property owner is at home, the audio message 670a selected may tell the visitor 50 to wait (e.g., "Hi, please wait until I come to the door"). In another example, if the visitor data 604 matches the visitor 50 (e.g., a friend is detected) when the calendar data 602 indicates that the property owner is sleeping, one of the audio message options 610a-610n may be selected (e.g., "Hi, please come back another time"), compared to when the same friend is detected when the property owner is not home (e.g., "Hi, we should be back in 5 minutes if you don't mind waiting").

The delivery data 606 may comprise information about expected package deliveries. For example, the user 302 may manually enter package deliveries that are expected. In some embodiments, the delivery data 606 may comprise an API configured to communicate with and/or receive data from delivery tracking services (e.g., USPS, UPS, FedEx, DHL, etc.) to receive updates on shipments. In some embodiments, the delivery data 606 may be used to populate settings for selecting the audio message options 610a-610n in the calendar data 602. For example, the calendar data 602 may be updated according to a scheduled delivery (or during an expected delivery time window). The delivery data 606 may over-ride the schedule in the calendar data 602. For example, when the delivery data 606 indicates that a package may be delivered, the smart cameras 102a-102n may operate in the alert/armed state and the output reaction selected using the signals RCT_A-RCT_N may indicate that the visitor 50 should stay away from the delivered package (e.g., "Please leave or the authorities will be contacted", "Do not touch the package, your photograph has been taken and will be sent to the authorities", etc.).

The delivery data 606 may be used with the video analysis to detect when a package is being delivered. For example, if the calendar data 602 indicates that the user 302 is at work and the visitor 50 is detected, the output reaction selected may politely ask the visitor 50 to return later (e.g., "We're not home right now, please stop by another time"). However, if the delivery data 606 indicates that a package may be delivered, the smart camera 102n may perform the video analysis to detect the visitor 50 as a delivery person and an instruction for package delivery may override the default greeting selection. For example, the delivery data 606 may indicate which delivery is expected and the set of audio message options 610a-610n may have different instructions for the delivery person (e.g., if the delivery data 606 indicates the delivery is a less valuable package, then the output reaction selected may be "Please leave the package behind the bush so it is hidden from view", if the delivery data 606 indicates the delivery is a more valuable package, then the output reaction selected may be "The garage door is open, please leave the package in the garage", etc.).

The event analysis handler 608 may be configured to intelligently select the output audio message and/or the reactions from the available audio message options 610a-610n and/or reaction options 612a-612n based on the available information (e.g., the calendar data 602, detected visitors and the visitor data 604, expected packages from the delivery data 606, video analysis, audio analysis, responses from a visitor, etc.). The event analysis handler 608 may have a similar implementation as the event analysis handler 214 of the remote devices 104a-104n described in association with FIG. 3. The event analysis handler 608 may be configured to aggregate various sources of information (e.g., perform sensor fusion) in order to select one or more audio message options 610a-610n and/or reaction options 612a-612n as the output audio message and/or the reactions that may be appropriate for the detected scenario. In some embodiments, the event analysis handler 608 may implement artificial intelligence based on historical information in order to predict schedules and/or events as well as associating appropriate greetings for the predictions. In an example, the event analysis handler 608 may comprise computer readable instructions that may be executed by the processor 550.

The processor 550 may be configured to access the computer readable instructions in the event analysis handler 608 and/or receive the signals RCT_A-RCT_N in order to determine which control signals to generate in response to the sensor input detected. The event analysis handler 608 and/or the signals RCT_A-RCT_N may comprise numerous parameters that instruct the processor 550 how to react to various input (e.g., a threshold indicating an amount of motion to detect before performing a reaction, which reaction to perform in response to the motion detected, how much weight to apply to various characteristics of the visitor 50 detected using the video analysis, which of the available audio message options 610a-610n to select, etc.).

The visitor data 604 may comprise blocks (or circuits) 620a-620n. The blocks 620a-620n may comprise characteristic storage of the detected visitors. The stored characteristics 620a-620n may comprise passive characteristics and/or active characteristics. The passive characteristics may comprise the detection of the characteristics that are performed on the visitor 50 without a specific action by the visitor 50. In an example, the video analysis used for facial recognition may be a passive authentication characteristic. The active characteristics may comprise the characteristics that are detected in response to an action by the visitor 50. In an example, the smart device 102n may ask the visitor 50 for a passphrase and the active characteristic stored may be the audio analysis of the passphrase. The types of passive and/or active detection performed may be varied according to the design criteria of a particular implementation.

The stored characteristic 620a may correspond to faces (e.g., 2D face detection and/or 3D face detection detecting based on analyzing video frames of the visitor 50 approaching the smart devices 102a-102n). The stored characteristic 620b may correspond to a visitor height (e.g., an estimate of the height may be determined by triangulation using at least 2 cameras). The stored characteristic 620c may be a phone ID (e.g., determined based on using a Bluetooth MAC address from a smartphone carried by the visitor 50 that may be detected by the communication device 560). The stored values 620d may correspond to a gait of the visitor 50 (e.g., performing video analysis on how the visitor 50 walks when approaching the smart devices 102a-102n, performing audio analysis on the sound of the footsteps approaching the smart devices 102a-102n, etc.). The stored characteristics 620a-620d may correspond to passive detection.

The stored characteristic 620e may correspond to a voice of the visitor 50 (e.g., detecting using the microphone 552, the smart devices 102a-102n may use artificial intelligence to start a conversation with the visitor 50 and may analyze the voice format). The stored characteristic 620f may correspond to any items or objects held by the visitor 50 (e.g., a crowbar, a package, food, etc.). Objects held by the visitor 50 may be determined using the computer vision analysis. The stored characteristic 620e may correspond to active detection and the stored characteristic 620f may correspond to a passive detection.

The stored characteristics 620g may correspond to a passkey (e.g., show barcode/QR code from a package, a RFID wallet card, a code displayed on a phone app screen, etc.). The stored characteristics 620h may correspond to biometric information of the visitor 50 (e.g., measuring a body part such as a palm, or finger size when the visitor 50 is asked to hold up a hand to the camera, measuring a quick wave while walking in, etc.).

Other types of stored characteristics 620n may be implemented. In one example, the smart devices 102a-102n may detect vehicle sounds (e.g., diesel engine from a UPS/FedEx delivery vehicle, a car door slam, etc.). In another example, the smart devices 102a-102n may analyze the seashell effect volume estimate. In yet another example, the smart device 102a-102n may request an automated challenge response (e.g., spoken letters/numbers/phrases, analyzing a reply to a challenge phrase based on a known code cipher (e.g., respond with the 6th letter of 1st word, 3rd letter of 2nd word, 2nd letter of 3rd word, etc.). In still another example, the smart devices 102a-102n may make a Bluetooth or Wi-Fi direct connection to the app 130 and initiate the app 130 to playback a sound in response to a sound emitted from the speaker 556 and/or initiate the app 130 to modulate a brightness from a phone screen (e.g., or cause the camera flash LED to illuminate, which could work at long distances).

In some embodiments, the audio data 600 may comprise a library of conversation messages. For example, the audio message options 610a-610n and/or the audio reaction options 612a-612n may comprise speech audio that may be used to converse with the visitor 50. The processor 550 may select a particular one of the audio message options 610a-610n and/or the audio reaction options 612a-612n to playback based on the analysis of the audio and the video captured by the smart device 102n. Using the library of conversation messages, a conversation with the visitor 50 may be created.

In one example, the processor 550 (or the AI model 140 implemented by the remote device 104) may select from a limited set of messages. For example, a conversation with the visitor 50 in a particular setting may have limited options (e.g., explaining the business hours, telling a loiterer to leave, welcoming a guest, providing basic instructions, etc.). Selecting a single one of the audio message options 610a-610n and/or a single one of the audio reaction options 612a-612n may be sufficient to communicate with the visitor 50. In some embodiments, the processor 550 (or the remote device 104) may compose (e.g., procedurally generate) the message and/or the reactions using the audio message options 610a-610n and/or the audio reaction options 612a-612n to develop more complex sentence structures. The types of messages and/or reactions (e.g., selection from a library or procedurally generated) may be varied according to the design criteria of a particular implementation.

Figure 13:
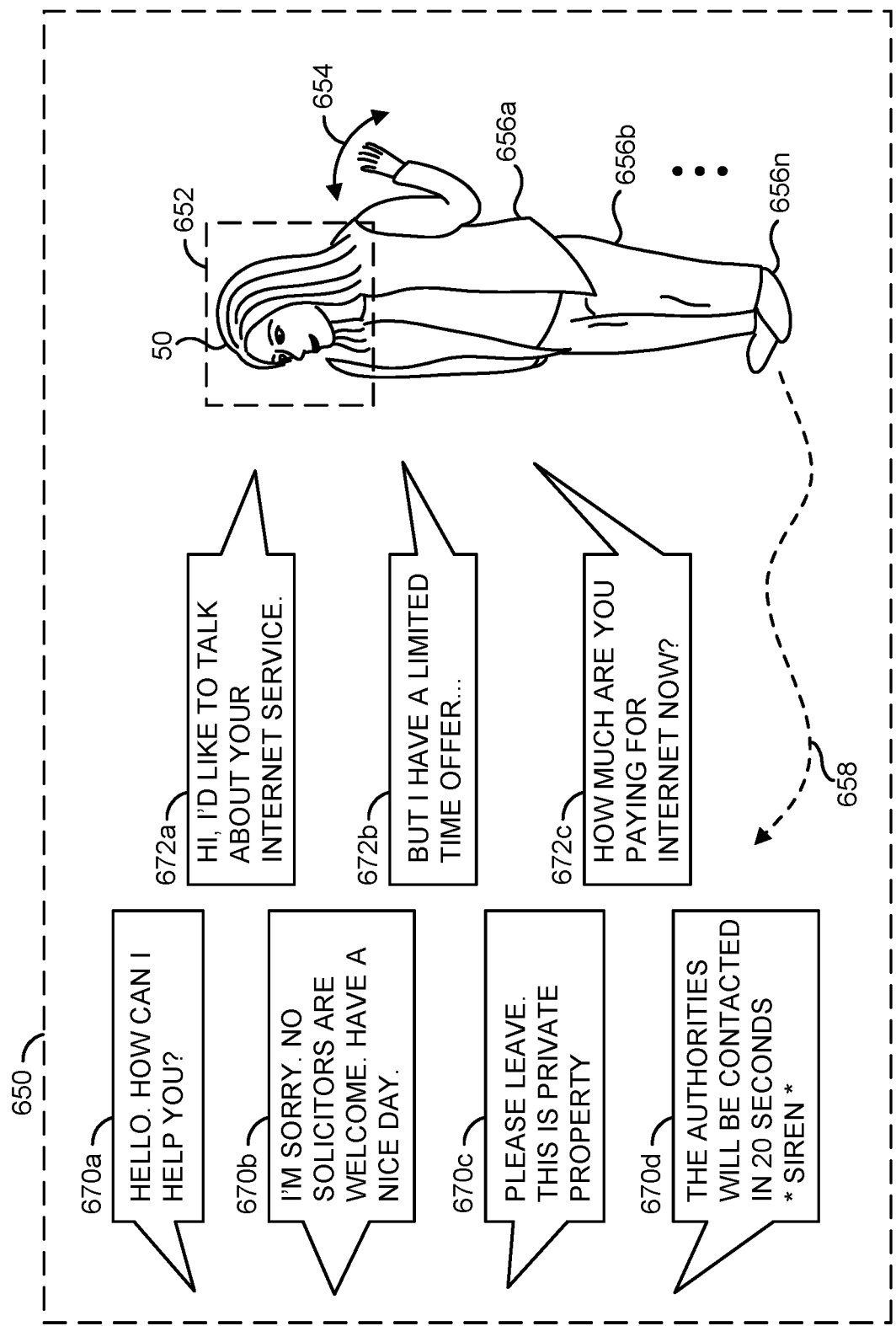
FIG. 13 is a diagram illustrating performing computer vision to detect an object and track the movement of an object.

Referring to FIG. 13, a diagram illustrating performing computer vision to detect an object and track the movement of an object is shown. An example video frame 650 is shown. The example video frame 650 may be an example video frame captured by one of the smart security devices 102a-102n (e.g., a video frame from the video data VD_A-VD_N). The example video frame 650 may be generated by the processor 550 from pixel data captured by the capture device 506 comprising the lens 516 and the image sensor 574. In an example, the video frame 650 may be shown as part of a video stream communicated to the remote device 104 and/or the user devices 106a-106n (e.g., displayed as one of the video feeds 260a-260n).

The example video frame 650 may comprise the area captured by the field of view of the lens 516. The example video frame 650 may be an example of the high resolution video frame and/or the low resolution video frame generated by the processor 550. In some embodiments, the example video frame 650 may be an example of a video frame stitched together from video frames captured by more than one of the smart security cameras 102na-102nn.

The example video frame 650 may comprise a view of the visitor 50. A dotted box 652 is shown. The dotted box 652 may represent computer vision analysis performed by the processor 550 and/or the AI model 140 on the example video frame 650. The dotted box 652 is shown around the face of the visitor 50. However, the computer vision analysis (or computer vision operations) may be performed on all portions of the visitor 50 (e.g., face, body, feet, clothing, gestures, etc.).

A curved double-ended arrow 654 is shown. The arrow 654 may represent the movement of the hand of the visitor 50. The arrow 654 may represent gesture analysis performed as part of the computer vision analysis of the example video frame 650. While one example video frame 650 is shown, the computer vision analysis may be performed on a sequence of video frames (e.g., to capture gestures, track the location of the visitor 50 over time, determine the behavior of the visitor 50, etc.). The gesture analysis 654 may comprise tracking movement patterns of various body parts (e.g., hands, feet, head, fingers, etc.) to determine behavior and/or non-verbal communication. In the example shown, the gesture 654 detected may be the visitor 50 waving. The computer vision analysis may determine that the visitor 50 is making a friendly introduction.

In another example, the gesture detected may be the visitor 50 nodding his/her head. The nodding gesture may indicate a 'yes' response. Similarly, detecting a shaking head gesture may be detected as a 'no' response. The types of gestures detected and/or the inferences made in response to the detected gestures may be varied according to the design criteria of a particular implementation.

Characteristics 656a-656n of the visitor 50 are shown. The characteristics 656a-656n may be determined by the processor 550 in response to the computer vision analysis 652 performed on the example video frame 650. The characteristics 656a-656n may comprise descriptive and/or identifying attributes of the visitor 50. In the example shown, the characteristic 656a may represent a shirt worn (e.g., style of clothing (e.g., a jacket worn over a shirt), a color of the clothing, etc.). In the example shown, the characteristic 656b may represent pants worn (e.g., the color of the pants, whether pants or shorts are worn, brand of pants worn, etc.). The characteristics 656a-656n may comprise physical characteristics about the visitor 50. In an example, the characteristics 656a-656n may comprise a height, estimated weight, body type, hair color, skin color, gait, etc. The types of characteristics 656a-656n detected may be varied according to the design criteria of a particular implementation.

In some embodiments, the computer vision analysis of the example video frame 650 (and a sequence of video frames that includes video frame generated prior to and after the video frame 650) may be performed by the processor 550 and/or the AI model 140. The AI model 140 and/or the processor 550 may perform the computer vision analysis to generate results of the computer vision analysis (e.g., the object detection 652, the gesture detection 654, the detection of the characteristics 656a-656n, etc.) and use the results to make decisions. In some embodiments, the example video frame 650 (and a sequence of video frames that include video frames generated prior to and after the video frame 650) may be generated by the processor 550 and uploaded by the communications module 560 to the remote server 104. The remote server 104 may perform the computer vision analysis to generate the results of the computer vision analysis. The remote server 104 may communicate the signals RCT_A-RCT_N as instructions to perform one or more reactions in response to the computer vision analysis to the smart security floodlight 102n. The processor 550 may perform various security features in response to the signals RCT_A-RCT_N.

A dotted line 658 is shown. The dotted line 658 may represent the movement of the visitor 50 over time. For example, the AI model 140 and/or the processor 550 may perform the computer vision analysis on the sequence of video frames that include the video frame 650 and video frames captured before and after the video frame 650. The AI model 140 and/or the processor 550 may determine a location of the visitor 50 in each video frame. Based on the location of the target in each video frame, the AI model 140 and/or the processor 550 may determine the location of the visitor 50. For example, the AI model 140 and/or the processor 550 may be configured to translate the location of the visitor 50 in the video frame 650 to a real-world location in the area near the smart security floodlight 102n.

In some embodiments, the smart security floodlight 102n may be configured to track the visitor 50 using a high intensity light beam. The smart security floodlight 102n may adjust the location of the high intensity light beam in response to the target movement 658. For example, the smart security floodlight 102n may comprise an actuator that may be controlled by the processor 550 (e.g., the PT actuators 572a-572d) to direct and/or focus the light beam on a particular location (e.g., on the visitor 50). In one example, the high intensity light beam may be directed to track the visitor 50 based on the target movement 658 (e.g., the location of the intruder in the area of interest). In another example, the high intensity light beam may be aimed to target a face of the visitor 50 (e.g., to blind and/or disorient the intruder, similar to police tactics). In some embodiments, the tracking 658 of the visitor 50 using the high intensity light beam may be performed automatically by the smart security floodlight 102n based on detecting the location of the intruder in response to computer vision operations performed on the video data. In some embodiments, the tracking of the intruder using the high intensity light may be performed manually (e.g., by remote control of the direction of the high intensity light by a person at the monitoring service 160).

Speech bubbles 670a-670c are shown. Response speech bubbles 672a-672c from the visitor 50 are shown. The speech bubbles 670a-670d may represent reactions, deterrents and/or preventative measures generated by the smart security floodlight 102n. In an example, the speech bubbles 670a-670d may represent audio messages presented by the integrated speakers 556. In one example, the speech bubbles 670a-670d may be audio messages selected in response to the signals RCT_A-RCT_N received from the remote device 104. The audio messages 670a-670d and the responses 672a-672c may be represented visually on the example video frame 650 as a representative example. However, the audio messages 670a-670d (e.g., reactions) and the responses 672a-672c may be audio only and not actually be visible in the video frame 650. In some embodiments, the processor 550 and/or the remote device 104 may be configured to transcribe (e.g., perform speech-to-text operations on) the audio messages 670a-670d and the responses 672a-672c in order to display the audio messages 670a-670d and the responses 672a-672c as text on the video frame 650 and/or attach the audio messages 670a-670d and the responses 672a-672c as metadata with the video frame 650. While four audio 670a-670d are shown, the processor 550 may generate any number of audio messages (e.g., 670a-670n) to provide the conversational AI.

The processor 550 may analyze the results of the computer vision analysis 652 to select the audio messages 670a-670n. In the example shown, the processor 550 may determine that the visitor 50 is a friendly visitor. For example, the visitor 50 is shown waving (e.g., based on the gesture 654). In response to the non-threatening visitor 50, the audio message 670a may be output by the speaker 556. In the example shown, the audio message 670a may be a friendly introduction (e.g., "Hello, how can I help you?"). The audio message 670a may be selected in response to the determinations made about the visitor 50. In another example, if the visitor 50 appeared to be a burglar (e.g., wearing a ski mask, attempting to hide from the smart security floodlight 102n, checking multiple entrances, etc.), then the audio message 670a may be selected to deter the visitor 50 (e.g., "Please leave or the police will be called").

The smart security floodlight 102n and/or the AI model 140 may monitor the response(s) 672a-672n of the visitor 50 to the audio messages 670a-670d. The response may be monitored to determine the reaction to perform. The response is shown as the audio response 672a (e.g., audio analysis). However, analysis of the response of the visitor 50 may further comprise continued computer vision analysis (e.g., the object detection 652, determining the behavior of the visitor 50, the characteristics 656a-656n, etc.), the PIR sensors 508, analysis of wireless signals, etc. Generally, criteria used to generate the signals RCT_A-RCT_N to select additional audio messages 670a-670d and/or other deterrence methods (e.g., changing the mode of operation of the light panels 520a-520d, activating the consumables 564, etc.) may be selected similar to the criteria used to select the initial audio message 670a.

In the example shown, the response 672a may be a vocal response by the visitor 50 (e.g., "Hi. I'd like to talk about your internet service"). The processor 550 (or the remote server 104 using the AI model 140) may analyze the audio to determine the context of the response 672a. The AI model 140 may determine that the speech response 672a corresponds to a solicitor. Other evidence may be analyzed (e.g., a name tag may be detected, a company logo, a clip board or electronic device, etc.). In the example shown, the AI model 140 may classify the visitor 50 as a solicitor. Based on the classification, the AI model 140 may determine the appropriate reaction and then generate the signals RCT_A-RCT_N to communicate the reaction to perform. Preferences for the reactions may be defined using the companion app 130 and/or learned by the AI model 140 over time in response to the feedback signals FB_A-FB_N. In an example, an end user may want to talk to solicitors and the reaction may be to inform the visitor 50 to wait and the smart security floodlight 102n may notify the user (e.g., the property owner) to answer the door via the companion app 130 on the user devices 106a-106n. In another example, the user 302 may set the preference to not be bothered by solicitors.

In the example shown, the reaction 670b may be a message that informs the visitor 50 to leave. Since the visitor 50 has been detected as non-threatening, the smart security floodlight 102n may perform a polite reaction initially. In the example shown, the reaction 670b may be an audio message (e.g., a polite request such as "I'm sorry. No solicitors welcome. Have a nice day.").

The smart security floodlight 102n and/or the AI model 140 may monitor the response of the visitor 50 to the reaction 670b. For example, if the visitor 50 complies with the reaction 670b (e.g., leaves the area) then no further reactions may be performed. In the example shown, the visitor 50 may provide an additional response 672b. The additional response 672b may be a continued sales pitch (e.g., "But I have a limited time offer").

The AI model 140 and/or the processor 550 may analyze the response 672b (e.g., using video analysis and/or audio analysis). The AI model 140 may determine to escalate the next reaction. For example, the initial reaction 670b may have been a polite reaction, the escalated reaction 670c may be more direct (or stern). In the example shown, the escalated reaction 670c may be an order (e.g., a stern request such as "Please leave. This is private property."). For example, the smart security floodlight 102n may be less polite by interrupting the response 672b.

The smart security floodlight 102n may monitor the response of the visitor 50 to the reaction 670c. For example, if the visitor 50 complies with the reaction 670c (e.g., leaves the area) then no further reactions may be performed. In the example shown, the visitor 50 may provide an additional response 672c. The additional response 672c may be to ignore the reaction 670c and keep continuing the sales pitch (e.g., "How much are you paying for internet now?").

The AI model 140 and/or the processor 550 may analyze the response 672c (e.g., using video analysis and/or audio analysis). The AI model 140 may determine to escalate the next reaction. For example, the escalated reaction 670c may have been less polite than the audio message 670b, so the next escalated reaction 670d may be a warning. In the example shown, the escalated reaction 670d may be a warning with an alarm (e.g., a statement that the authorities 162 have been, or may be, contacted such as, "The authorities will be contacted in 20 seconds" along with a siren sound).

The smart security floodlight 102n and/or the AI model 140 may monitor the response of the visitor 50 to the reaction 670d. For example, if the visitor 50 complies with the reaction 670d (e.g., leaves the area) then no further reactions may be performed. Additional responses may be performed by the visitor 50 and additional reactions (e.g., additional audio messages) may be performed by the smart security floodlight 102n based on the particular circumstances. In an example, other reactions may comprise adjusting the modes of operation of the light panels 520a-520d, activating the consumables 564, contacting the monitoring service 160 for intervention by a live agent (e.g., one of the patrol vehicles 460a-460b being sent to the location of the event) and/or contacting the authorities 162.

In some embodiments, the conversational AI may be configured to provide a verbal description of the visitor 50 (e.g., to make sure that the visitor 50 knows they have been seen). The verbal description may be provided as one of the audio messages 670a-670n. The verbal description may be generated based on the detected characteristics 656a-656n (e.g., "Please be aware you are trespassing and your presence has been noted. We have reported to the police a 6 foot man wearing green jacket and gray pants.").

The conversational AI may continue to monitor the behavior of the visitor 50 and/or the context of the scenario. Continually monitoring the behavior of the visitor 50 (e.g., providing the audio messages 670a-670n and/or other deterrent measures and then monitoring how the visitor 50 responds) may enable the smart security floodlight 102n to determine an effectiveness of the reactions (e.g., whether the visitor 50 has left the area and has not returned).

The audio reactions 670a-670n may be an example of one of the security features that may be performed by the smart security device 102a-102n in response to the detection of an event. The detection of the visitor 50 shown may be one example of the detection of an event. In one example, the detection of the event may be made based on computer vision operations when the visitor 50 is in the field of view of the camera. For example, the AI model 140 may perform the computer vision operations 652, detect the gestures 654, the characteristics 656a-656n and/or the movement 658 of the visitor 50 to determine the event and/or generate the metadata 212 corresponding to the event. In an example, the metadata 212 may comprise information about the event such as a female of height 6 foot, 8 inches, wearing a jacket and long pants that remained in the video for two minutes and did not move around. The type of metadata 212 stored about the event may be varied according to the design criteria of a particular implementation.

In some embodiments, the detection of the event may be made based on a PIR detection (e.g., the 360 degree PIR sensor 508). In some embodiments, the detection of the event may be made based on the conversational AI. For example, the smart security device 102n may detect the intruder and the audio reactions 670a-670n may actively engage the intruder using the conversational AI to determine a context and/or behavior of the intruder 50. The AI model 140 may then classify the intruder 50 as an undesired person (e.g., a trespasser)) based on the analysis of the audio reactions 670a-670n and the responses 672a-672n by the intruder 50. When the event is detected, the video feeds 260a-260n on the companion app 130 may be updated. For example, the video feed 260a may be updated to display the video frame 650 (and subsequent video frames) in response to the AI model 140 detecting the visitor 50 (e.g., the event). The types of events detected, and the method of detecting the events may be varied according to the design criteria of a particular implementation.

Figure 14:
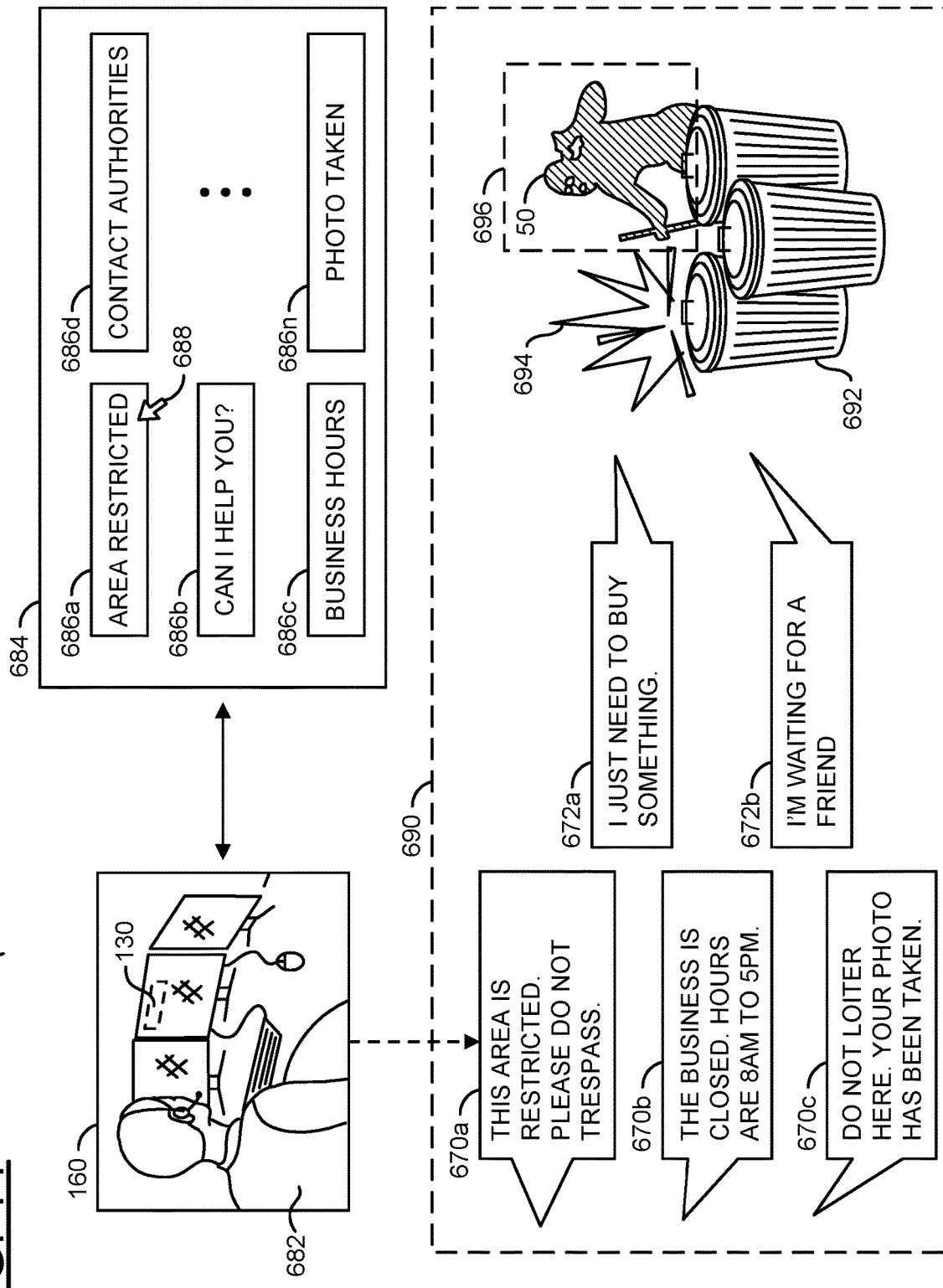
FIG. 14 is a diagram illustrating active engagement and third party service engagement of a visitor.

Referring to FIG. 14, a diagram illustrating active engagement and third party service engagement of a visitor is shown. An example scenario 680 is shown. The example scenario 680 may comprise the third party services 160 selecting reactions for the smart devices 102a-102n. A security guard or security personnel (or receptionist) 682 is shown at the third party services 160. The security guard or security personnel 682 may use the companion app 130 to monitor the video feeds 260a-260n from a location remote from the location of the smart security devices 102a-102n (e.g., remote from the detected events). In the example shown, the security guard or security personnel 682 may be the user 302 of the companion app 130. In one example, the security guard or security personnel 682 may be at a remote location from the smart security devices 102a-102n (e.g., in a different city, in a different country, on a different property, etc.). In another example, the security guard or security personnel 682 may be on the same property as the smart security devices 102a-102n (e.g., an attendant in a lobby of an apartment building that uses the smart security devices 102a-102n to monitor the property of the apartment building).

The third party services 160 may select reactions for the smart devices 102a-102n using an interface 684. In an example, the interface 684 may enable the security guard or security personnel 682 to select the reactions and communicate the reactions to the remote device 104 (e.g., via the signals FB_A-FB_N). The remote device 104 may forward the reactions selected to the smart security devices 102a-102n using the signals RCT_A-RCT_N. For example, the interface 684 may enable remote manual control of the reactions as an alternate option to the AI model 140 selecting the reactions.

The interface 684 may comprise a list buttons 686a-686n. The list of buttons 686a-686n may enable the receptionist 682 to select one or more of the available audio message reactions 670a-670n. For example, the interface 684 may implement a soundboard that enables the receptionist 682 to select the audio played back by the smart devices 102a-102n.

A mouse pointer 688 is shown on the interface 684. For example, the receptionist 682 may use the mouse pointer 688 to interact with one of the buttons 686a-686n. The buttons 686a-686n are shown having basic descriptive messages. In an example, the button 686a may correspond to one of the audio message reactions 670a-670n that provides audio indicating that the area is restricted. In another example, the button 686c may correspond to one of the audio message reactions 670a-670n that provides audio to indicate the business hours for the particular property.

The description of the buttons 686a-686n may be generic to provide a common interface for the third party services 160 regardless of the particular property where the smart devices 102a-102n are located. The audio played by the particular one of the smart devices 102a-102n may be customized. For example, the receptionist 682 may select the business hours 686c without having to know the detailed business schedule of a particular business. In response to the selection of the business hours 686c, the smart devices 102a-102n may playback the audio associated with the business hours (e.g., one business may have business hours of 8 am-4 pm, while another business may have hours of 9 am-5 pm). The interface 684 may enable the third party services 160 to have a common interface for selecting context-appropriate reactions without needing to know the exact details of the reaction, in order to provide faster responses (e.g., without needing to look up details for a particular business such as the business hours).

An example video frame 690 is shown. The example video frame 690 may be an example video frame captured by one of the smart devices 102a-102n (e.g., the smart security floodlight 102n). In an example, the video frame 690 may be shown as part of the video feeds 260a-260n on the companion app 130 and/or the video data VD_A-VD_N communicated to the remote devices 104a-104n.

The example video frame 690 may comprise a view of the visitor 50. The computer vision analysis 696 is shown being performed on the visitor 50. The computer vision analysis 696 may also be performed on inanimate objects 692. For example, the AI model 140 and/or the video processor 550 may detect and/or classify the visitor 50 as a burglar (e.g., wearing a ski mask, attempting to hide in the shadows, hiding behind the objects 692, etc.). In another example, the AI model 140 and/or the video processor 550 may detect and/or classify the objects 692 as garbage cans. A shape 694 is shown to represent a sound. For example, the sound 694 may be the burglar 50 bumping into the garbage cans 692. The audio processor 562 may analyze the sound 694 to determine the behavior and/or characteristics of the visitor 50. The analysis of the video and/or the audio may be used to determine the characteristics 656a-656n of the visitor 50.

The audio message 670a from the smart device 102n is shown. The audio message 670a may be selected by the AI model 140 and/or the processor 550 in response to the video analysis and/or audio analysis used to classify the visitor 50 and/or in response to the reaction selected by the receptionist 682. The smart security floodlight 102n may play the audio message 670a to attempt to deter the visitor 50. In the example shown, the audio message 670a selected may be "This area is restricted. Please leave".

The smart device 102n may detect the response 672a from the visitor 50. In the example shown, the response 672a may be "I just need to buy something". The smart device 102n may contact the third party services 160. The smart device 102n may provide a recording of the response 672a to the third party services 160. In some embodiments, if the third party services 160 are unavailable or take a long time to connect to the smart device 102n, the smart device 102n may continue the active engagement with the visitor 50 (e.g., generate the reactions 670a-670n) based on the signals RCT_A-RCT_N from the AI model 140 until the third party services 160 connects.

Connecting to the third party services 160 may be optional and/or depend on settings of the user 302. Generally, switching between the processor 550 (or remote device 104) selecting the reactions 670a-670n and the third party services 160 selecting the reactions 670a-670n may be seamless and/or be unknown to the visitor 50. For example, the third party services 160 may be able to imitate the conversational AI of the AI model 140 and the conversational AI of the AI model 140 may imitate human responses that would be selected by the third party services 160. For example, the smart devices 102a-102n may perform the conversational AI to provide an automated doorman service. If the third party services 160 are contacted, then the smart devices 102a-102n may operate in a different mode where the off-site agent 382 selects the reactions 670a-670n. The off-site agent 160 may enhance the capabilities of the automated doorman service. In one example, the off-site agent 160 may enhance the automated doorman service by enabling a person to speak to the visitor 50 remotely (e.g., provide more complex human interaction than the conversational AI is capable of providing). In another example, off-site agent 682 may enhance the automated doorman service by receiving instructions uploaded by the user 302. The user 302 may upload specific instructions for the off-site agent 682 via the companion app 130. For example, when a package is expected, the user 302 may upload instructions to allow the off-site agent 682 to sign for the package remotely, and make sure that the delivery person hides the package from view.

When the third party services 160 connects to the smart device 102n, the third party services 160 may receive the recording of the response 672a from the visitor 50. The third party services 160 may use the interface 684 to select the response 670a. In the example shown, the receptionist 682 may select the button 686c to playback the business hours.

The response 670a is shown as "The business is closed. Hours are between 8 am and 5 pm.". The smart device 102n may continue to stream the video and/or audio data VD_A-VD_N to the third party services 160 and/or the remote device 104.

The smart device 102n may stream audio of the response 672b of the visitor 50 (e.g., "I'm waiting for a friend") to the third party services 160. For example, the receptionist 682 may decide that the visitor 50 looks suspicious (e.g., wearing a ski mask) and is providing inconsistent answers (e.g., wants to buy something and then says waiting for a friend). The receptionist 682 may select the button 686n that may cause the smart device 102n to generate audio that states that the photo of the visitor 50 has been taken (e.g., "Do not loiter here. Your photo has been taken").

The reactions 670a-670n selected by the receptionist 682 may be uploaded to the cloud service 104. The cloud service 104 may use the reactions 670a-670n, and the audio and video captured by the smart device 102n to train an artificial intelligence model 140. The artificial intelligence model 140 may be used by the smart devices 102a-102n (or the remote device 104) to actively engage with the visitor 50 (e.g., implement conversational AI) by communicating the signals RCT_A-RCT_N.

In addition to raising alerts and/or manual reactions selected by the receptionist 682, when the AI model 140 detects possible incidents, the signals RCT_A-RCT_N may be communicated to automatically play a series of customized warning messages of increasing severity. For example, the reactions may comprise security features such as increasing loudness of warning messages, sirens, flashing strobe lights, etc. Generally, automated responses may be selected first, before the receptionist 682 intervenes.

As the detected event continues (e.g., the visitor 50 does not leave the area in the video frame 690 in response to the automated responses), the AI model 140 may decide the next reaction should be real-time communication. The real-time communication may be between the receptionist 682 and the visitor 50. The real-time communication with the visitor 50 may streaming audio from the receptionist 682 (or the audio selected using the buttons 686a-686n) via the speaker 556, and receiving the audio responses 672a-672b using the microphone 552. The real-time communication may enable continual engagement until a patrol reaches the site of the event (e.g., one of the patrol vehicles 460a-460b).

Enabling the receptionist 682 to have manual control over various security features of the smart security floodlight 102n may enable the third party services 160 to be located anywhere. For example, the live audio reactions 670a-670c may enable monitoring from the patrol cars 460a-460b, from a centralized location (e.g., a call center, from a command center, etc.) and/or by a property owner from anywhere (e.g., from home, from a small office, while on vacation, etc.). The location of the receptionist 682 may be varied according to the design criteria of a particular implementation. Details of the reactions that may be performed and/or the live interventions that may be performed may be described in association with U.S. application Ser. No. 16/792,642, filed on Feb. 17, 2020, appropriate portions of which are hereby incorporated by reference.

Figure 15:
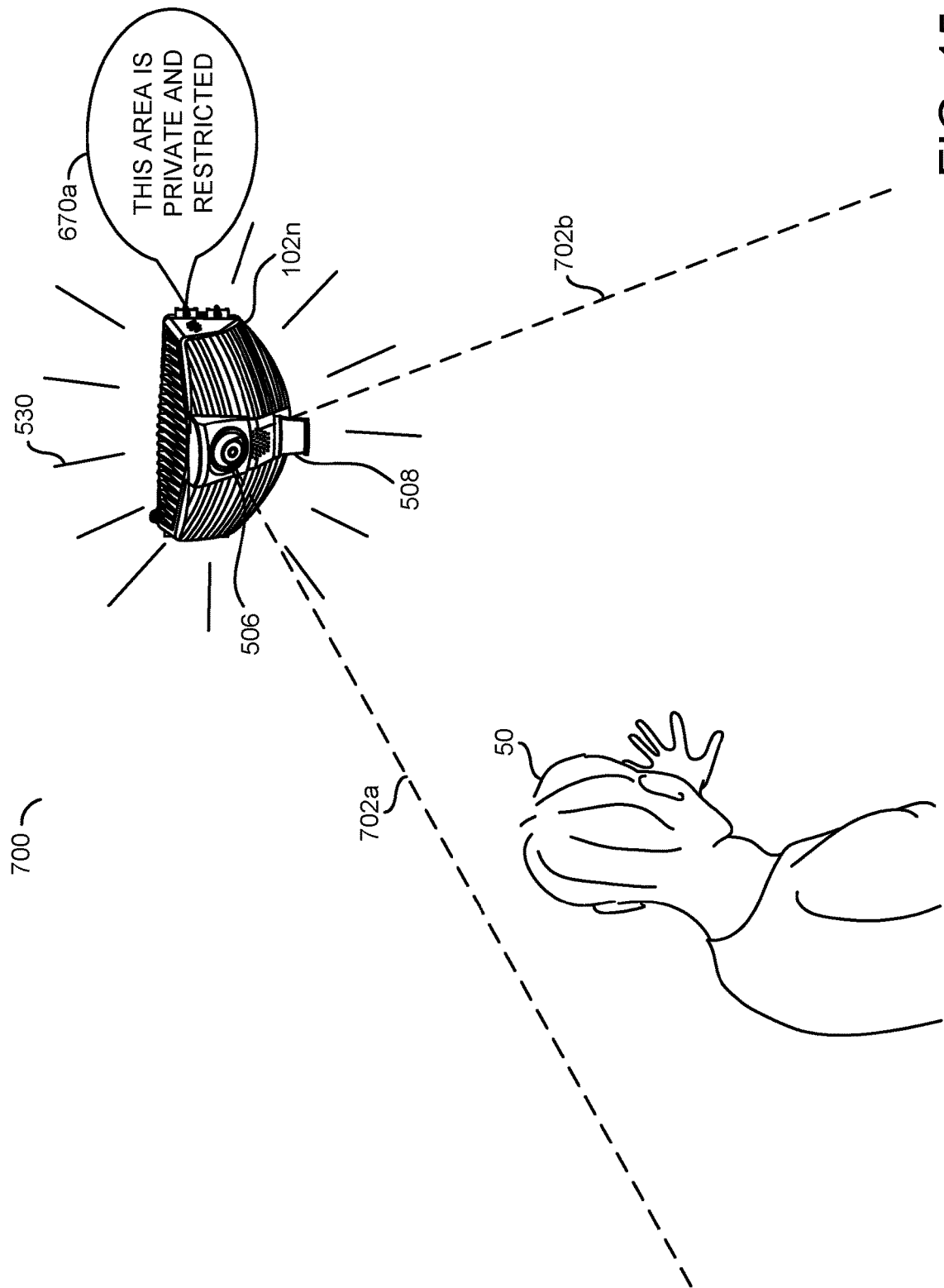
FIG. 15 is a diagram illustrating a high intensity light response to detecting an intruder in an area of interest.

Referring to FIG. 15, a diagram illustrating a high intensity light response to detecting an intruder in an area of interest is shown. An example scenario 700 is shown. In the example scenario 700, the smart security floodlight 102n may be operating the light panels 520a-520d in the mode of operation that generates the colored light strobing effect. Lines 530 are shown. The lines 530 may represent the strobing colored lights configured to shine at the visitor 50 and/or provide a general indication that some type of event has been detected. The light 530 is generally shown from the perspective of the visitor 50.

The smart security floodlight 102n may implement the moveable camera module 506. The movable camera module 506 may enable a field of view 702a-702b of the lens 516 to be adjusted. Adjusting the field of view 702a-702b of the capture device 506 may change the area of interest. In one example, the camera module 506 may be configured to be moved manually (e.g., adjusted by hand to be pointed at a particular area of interest). In another example, the camera module 506 may be configured to be moved automatically (e.g., pan, tilt and zoom according to a pre-defined pattern to cover different areas of interest). In yet another example, the camera module 506 may be configured to be moved remotely (e.g., pre-approved personnel such as the receptionist 682 may provide controls from a remote location that cause the camera module 506 to pan, tilt and zoom).

The smart security floodlight 102n may implement the PIR sensor 508. The PIR sensor 508 is shown at the bottom of the apparatus. The PIR sensor 508 may be stationary. The PIR sensor 508 may be configured to detect motion in a 360 degree range. For example, the PIR sensor 508 may monitor a larger area of interest than the field of view 702a-702b of the camera module 506. In an example, the PIR sensor 508 may be configured to detect intruders based on motion detection in blind spots of the camera module 506.

The smart security floodlight 102n may comprise the integrated speakers 556. The integrated speakers 556 may be configured to playback pre-recorded audio and/or playback streamed audio input. In one example, security personnel 682 may talk into one of the user devices 106a-106n that implements the companion app 130 for the smart security floodlight 102n. The companion app 130 may stream the audio of the security personnel to the smart security floodlight 102n. The smart security floodlight 102n may playback the audio from the security personnel 682 using the integrated speakers 556. In another example, the smart security floodlight 102n may store pre-recorded audio files in the memory 554. The AI model 140 may intelligently select one or more of the pre-recorded audio files for playback and communicate the selection using the signals RCT_A-RCT_N.

The audio reaction 670a may be generated by the integrated speakers 556. For example, in response to detecting an intruder (e.g., the visitor 50), an audio file may be selected to playback by the processor 550 and/or the AI model 140 and a voice recording may be played by the speakers 556. In the example shown, the audio 670a may comprise a voice recording of "This area is private and restricted". The pre-recorded audio files may comprise audio other than pre-recorded speech. For example, the integrated speakers 556 may playback an alarm sound. The audio processor 562 may be configured to generate other sounds (e.g., alarms, distorted voices of the streamed audio from the security personnel, dogs barking, police sirens, etc.).

The smart security floodlight 102n may generate the high intensity light 530. The high intensity light 530 may be configured to flash to provide a strobe effect. In one example, the high intensity light 530 may output at 1000 lumens in various colors. The high intensity light 530 may be configured to surprise, scare and/or disorient the visitor 50. For example, the visitor 50 is shown attempting to cover his face and/or shield his eyes in response to the bright/strobing light. In one example, the high intensity light 530 may be a white light. In another example, the high intensity light 530 may be a red light. In yet another example, the high intensity light 530 may be a blue light. For example, the strobe effect may comprise alternating between red and blue light similar to police lights. The strobing lights 530 may provide a preventative and/or deterring effect by scaring and/or disorienting the visitor 50 and/or by alerting others (e.g., the flashing lights may provide a beacon effect).

Figure 16:
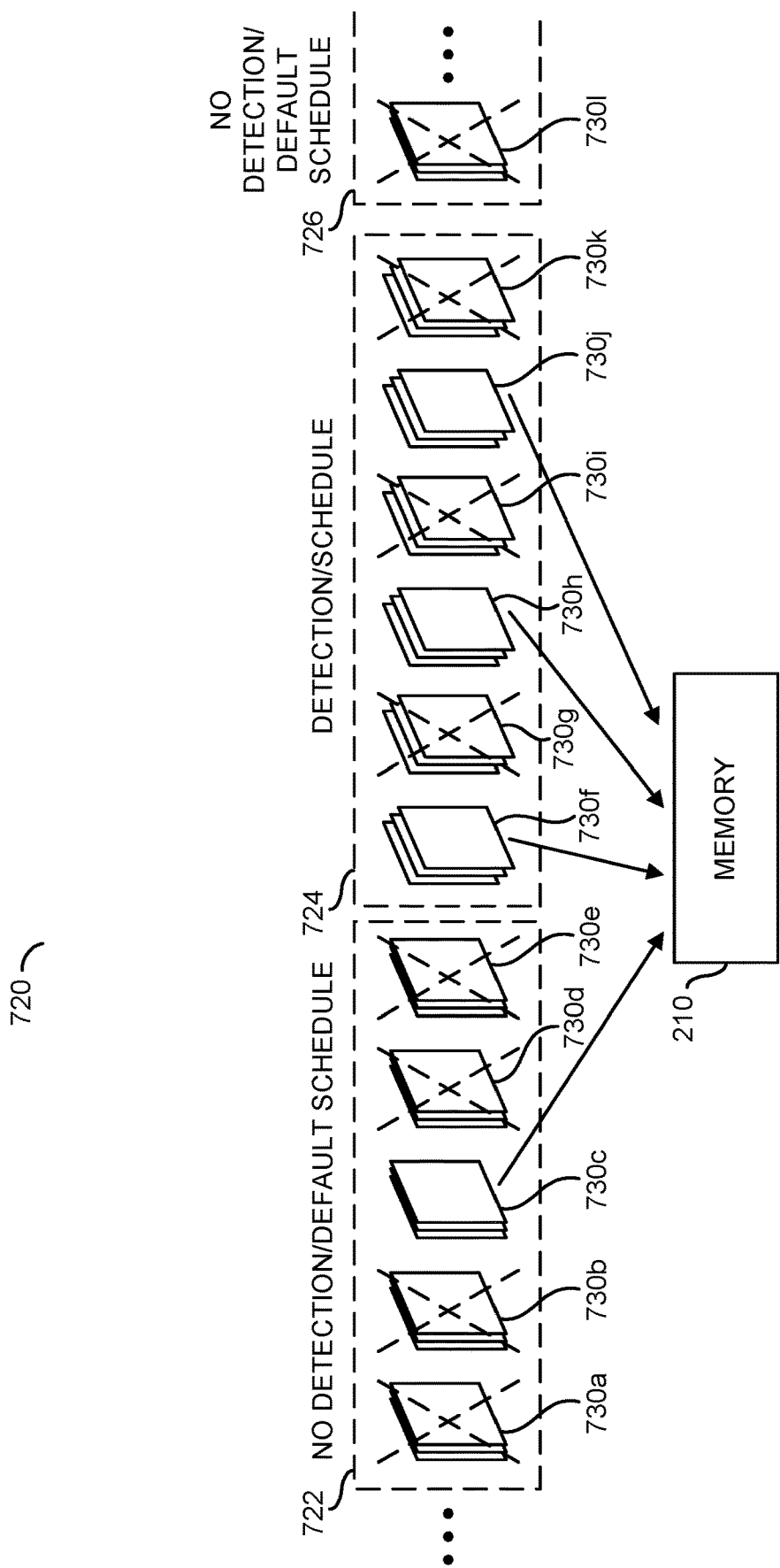
FIG. 16 is a diagram illustrating a smart time-lapse feature of the security floodlight.

Referring to FIG. 16, a diagram illustrating a smart time-lapse feature of the security floodlight is shown. A representation 720 of captured video frames for a time-lapse video is shown. Blocks of time 722-726 are shown. The block of time 722 may represent a time (e.g., a range of hours, a range of days, a range of minutes, etc.) that the processor 550 is configured to operate with no detection and/or according to a default schedule for communicating video frames. The block of time 724 may represent a time that the processor 550 is configured to operate with detection and/or according to a schedule for communicating video frames. Similar to the block of time 722, the block of time 726 may represent a time that the processor 550 is configured to operate with no detection and/or according to a default schedule for communicating video frames. The memory 210 may store various schedules for selecting modes of operation of the processor 550. For example, the AI model 140 may be configured to select schedules for performing various types of deterrence methods, schedules for generating time lapse videos, schedules for detecting loiterers, etc.

Sequences of video frames 730a-730l are shown. The sequences of video frames 730a-730l may be video frames generated by the processor 550. The sequence of video frames 730a-730l may comprise the video data VD_A-VD_N that may be communicated to the remote devices 104a-104n and stored by the video stream storage 210. In the example shown, the video frames 730a-730e may be in the block of time 722. The video frames 730a-730e may be captured by the camera 506 during a default operating schedule (or a time when no object has been detected by the video analysis performed by the AI model 140 and/or the processor 550). In the example shown, the video frames 730f-730k may be in the block of time 724. The video frames 730f-730k may be captured by the camera 506 during a time when the recording schedule has changed and/or when an object (e.g., the visitor 50) has been detected by the AI model 140 and/or the processor 550. The video frames 730l may be in the block of time 726, in which the smart security floodlight 102n may operate similar to the operation in the block of time 722.

Time-lapse videos may be a popular feature for security devices. For example, time-lapse videos are popular in the construction (e.g., to show how a structure has been built over time) and/or for weather reports. In another example, the time-lapse videos may be displayed as the thumbnail feeds 390a-390b.

The smart security floodlight 102n may be configured to generate a time-lapse video at maximum resolution (e.g., using the high resolution video frames similar to the high resolution video frame 650). The high resolution video frames may be stored locally in the memory 554. Since the time-lapse video comprises a small sample of the total amount of video frames captured, the high resolution video frames may be transmitted to the remote device 104 (e.g., at night during when data transmission is generally lower). The time-lapse video may be useful in security video to find suspicious activities not captured by short video, such as intruders casing a property at daytime, and then returning to intrude at nighttime. For example, the time-lapse video may be uploaded to the video stream storage 210 in real-time.

For example, for a time-lapse video one video frame from a group of video frames may be stored at particular time intervals (e.g., one video frame is stored at a frame rate of one video frame per minute, one video frame per hour, one video frame per day, etc.). For example, when an object is detected (or a schedule for uploading video frames changes), the frame rate for storing the video frames may be increased. For example, when an interesting object is detected, more video frames may be stored by the memory 210. After the object is no longer detected (or the schedule changes again), another frame rate may be selected (e.g., back to default, in the example shown).

To reduce the amount of data to be transmitted and/or stored, the video processor 550 may be configured to capture the time-lapse video data at varying rates. For example, frame rate selection may be adjusted on a schedule (e.g., hourly based on user knowledge of expected activities such as higher frame rates during business hours when more people will be at the property and lower frame rates when the business is closed) and/or in response to the signals RCT_A-RCT_N. The video processor 550 may further enable resolution selection, up to the highest available. In some embodiments, the object detection implemented by the AI model 140 and/or the video processor 550 may be configured to remove uninteresting video frames (e.g., no objects detected) and/or alter the frame rate for the time-lapse video.

For example, without object detection a time-lapse video may be 1 frame per minute for 24 hours (e.g., 24×60=34,560 frames) with a playback at 15 fps in 38 minutes for one day of video. The intelligent time-lapse implemented by the smart security floodlight 102n may adjust the rate of video frame storage based on object/motion detection. For example, when there is nothing detected 1 frame per 5 minutes of video may be stored, then when something interesting is detected 1 frame per 0.5 seconds may be stored. For 24 hours of coverage the intelligent time-lapse video may be about 8 minutes playback (e.g., with nothing detected) to approximately 20 minutes of playback with about 90 minutes of motion content.

In some embodiments, the intelligent time-lapse video may adjust the frame rate based on a schedule. Each scheduled time slot for the intelligent time-lapse video may specify a video frame rate (e.g., the rate that the frames are being stored). In one example, the time slots may be hourly. For example, from 1am to 2 am the frame rate may be 1 frame per minute. Then from 2 am to 3 am the frame rate may be 1 frame per every five minutes. The scheduled frame rate and/or the time slot for the scheduled frame rate may be varied according to the design criteria of a particular implementation. The scheduled frame rates may be combined with the object detection (e.g., detecting an object during one of the time slots may alter the frame rate temporarily).

In the example shown, during the time block 722 when the processor 550 is using the default schedule (or no object has been detected), then fewer video frames may be stored by the memory 210. In the example shown, the group of video frames 730c are stored, but the video frames 730a-730b and the video frames 730d-730e are not stored. The schedule may change for the time block 724. For example, the time block 724 may correspond to business hours and/or when an object has been detected. More video frames may be stored by the memory 210 during the time block 724. In the example shown, the groups of video frames 730*f*, 730*h* and 730*j* may be stored, and the video frames 730*g*, 730*i* and 730*k* may not be stored.

The time lapse video may provide a sped up version of the video frames 730*a*-730*l*. The time lapse video may not comprise all the video data generated by the processor 550. The time lapse video may provide a general overview of the content in the captured video frames. In some embodiments, the time lapse video may be communicated to the cloud computing resources 104*a*-104*n*. The AI model 140 implemented by the cloud computing resources 104*a*-104*n* may analyze the time lapse video to confirm an operating status of the smart security floodlight 102*n*. For example, by analyzing the time lapse video, the AI model 140 may detect all black frames, which may indicate that the lens 516 has been tampered with.

The processor 550 may be configured to generate the video data VD_A-VD_N to record all events for evidentiary purposes. In some embodiments, the video data VD_A-VD_N communicated to the remote devices 104*a*-104*n* for storage may comprise a full video recording and/or time-lapse video stream. In some embodiments, the video data VD_A-VD_N may communicate the video data and metadata about the events (e.g., if the processor 550 performs computer vision operations locally). In some embodiments, the video data VD_A-VD_N may comprise the video data and the video data VD_A-VD_N may be stored in the video stream storage 210 and the metadata about the events may be stored in the metadata storage 212. The metadata may be generated by the AI model 140 in response to the computer vision operations performed on the video data VD_A-VD_N.

The metadata 212 may enable automated searching and display capabilities. For example, if evidence is requested about an event that takes place at a particular time, the processor 202 of the remote devices 104*a*-104*n* may search the metadata 212 for any events detected at the particular time. The processor 202 may generate the video stream associated with the matching metadata 212 from the video stream storage 210. The video stream storage 210 may present the requested video evidence as the video streams VS_A-VS_N for display as one of the video feeds 260*a*-260*n* on the companion app 130. In another example, if the evidence requested about an event corresponds to the detection of a person wearing a red shirt, the metadata 212 may be searched for any events that may be detected that comprise a person wearing a red shirt. If a match is found, then the video stream that corresponds to the matching metadata 212 may be streamed to the companion app 130.

Figure 17:
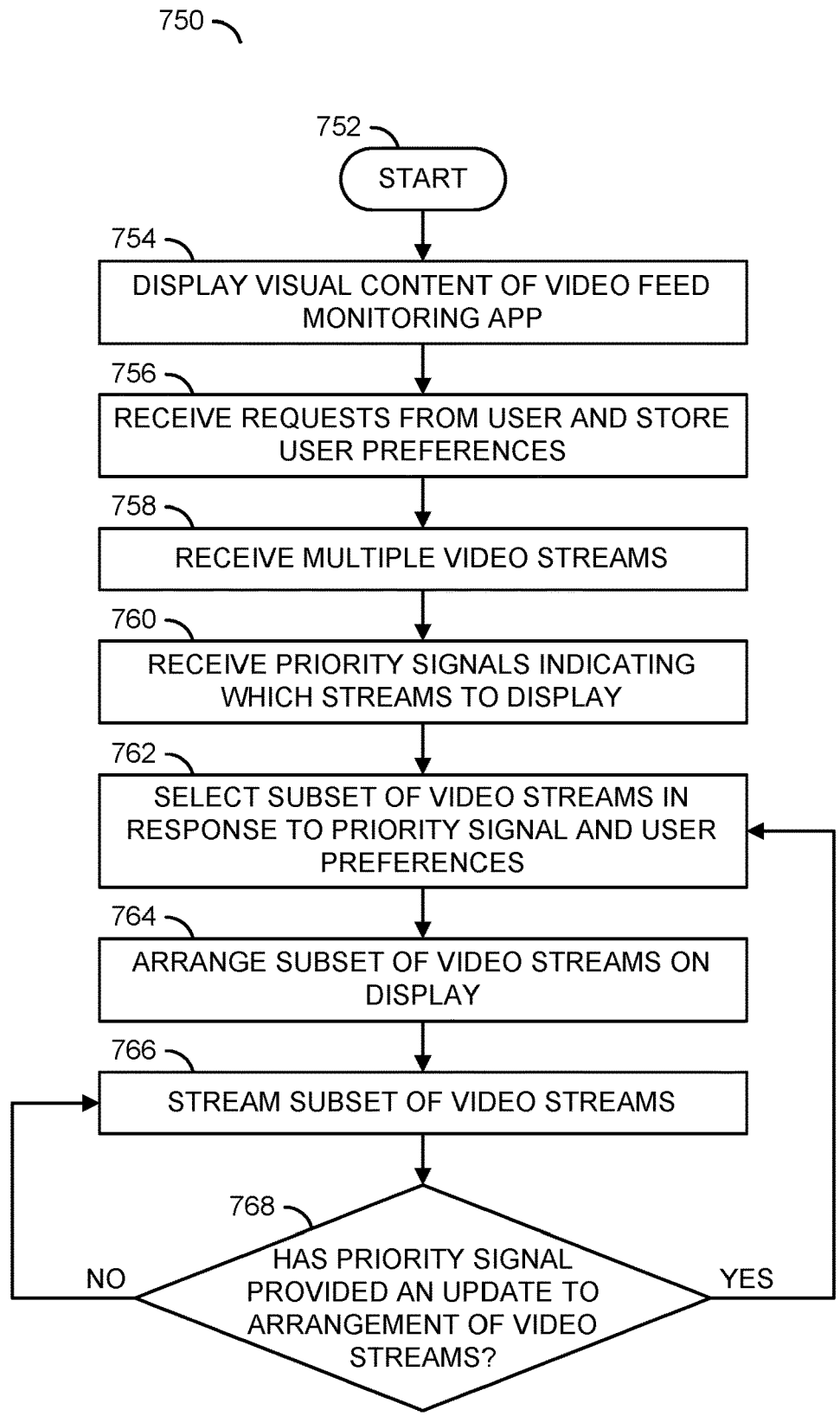
FIG. 17 is a flow diagram illustrating a method for intelligently selecting video streams on a video feed monitoring app.

Referring to FIG. 17, a method (or process) 750 is shown. The method 750 may intelligently select video streams on a video feed monitoring app. The method 750 generally comprises a step (or state) 752, a step (or state) 754, a step (or state) 756, a step (or state) 758, a step (or state) 760, a step (or state) 762, a step (or state) 764, a step (or state) 766, and a decision step (or state) 768. The step 752 may start the method 750. In the step 754, the touchscreen interface 120*c* of one or more of the user devices 106*a*-106*n* may display and/or update the visual content for the video feed monitoring app 130 (e.g., graphics, menus, the GUI, etc.). Next, in the step 756, the touchscreen interface 120*c* may receive requests from the user 302 and/or store the user preferences. The user 302 may use touch input with the video feed monitoring app 130 to select various user settings. The user settings may be communicated by the user devices 106*a*-106*n* as the signals FB_A-FB_N to the remote devices 104*a*-104*n*. The user settings may be stored as the user preferences 216. Next, the method 750 may move to the step 758.

In the step 758, the user devices 106*a*-106*n* may receive the multiple video streams VS_A-VS_N from the remote devices 104*a*-104*n*. Next, in the step 760, the user devices 106*a*-106*n* may receive the priority signals PRI_A-PRI_N from the remote devices 104*a*-104*n*. The priority signals PRI_A-PRI_N may be read by the processor 120*a* and the computer readable instructions of the video feed monitoring app 130 to determine which of the video streams VS_A-VS_N to display and the particular arrangement to display the video streams VS_A-VS_N. Next, the method 750 may move to the step 762.

In the step 762, the video feed monitoring app 130 may select a subset of the video streams VS_A-VS_N in response to the information about the arrangement of the video streams VS_A-VS_N. The arrangement may be determined in response to the priority signals PRI_A-PRI_N and/or the user preferences 216. For example, the video feed monitoring app 130 may comprise a viewport size that may display 6 to 9 of the video streams VS_A-VS_N simultaneously (e.g., at a comfortable viewing size). The priority signals PRI_A-PRI_N and/or the user preferences 216 may be used to determine which of the video streams VS_A-VS_N should be selected as the video feeds 260*a*-260*n* to display. Next, in the step 764, the video feed monitoring app 130 may arrange the subset of the video streams VS_A-VS_N on the touchscreen display 120*c* as the video feeds 260*a*-260*n*. In the step 766, the video feed monitoring app 130 may stream the video feeds 260*a*-260*n*. For example, the video feeds 260*a*-260*n* may display updated content as the video data from the video streams VS_A-VS_N is received (e.g., a real-time view of the video data VD_A-VD_N captured by the smart security devices 102*a*-102*n*). Next, the method 750 may move to the decision step 768.

In the decision step 768, the video feed monitoring app 130 may determine whether the priority signals PRI_A-PRI_N have provided an updated arrangement for the video streams VS_A-VS_N. It no updated arrangement has been received, then the method 750 may return to the step 766 (e.g., continue displaying the current arrangement of the video feeds 260*a*-260*n*). If an updated arrangement has been received then the method 750 may return to the step 762 (e.g., re-arrange the video feeds 260*a*-260*n*). The video feed monitoring app 130 may continually stream the video feeds 260*a*-260*n* and update the arrangement of the video feeds 260*a*-260*n* as the events are detected by the AI model 140.

Figure 18:
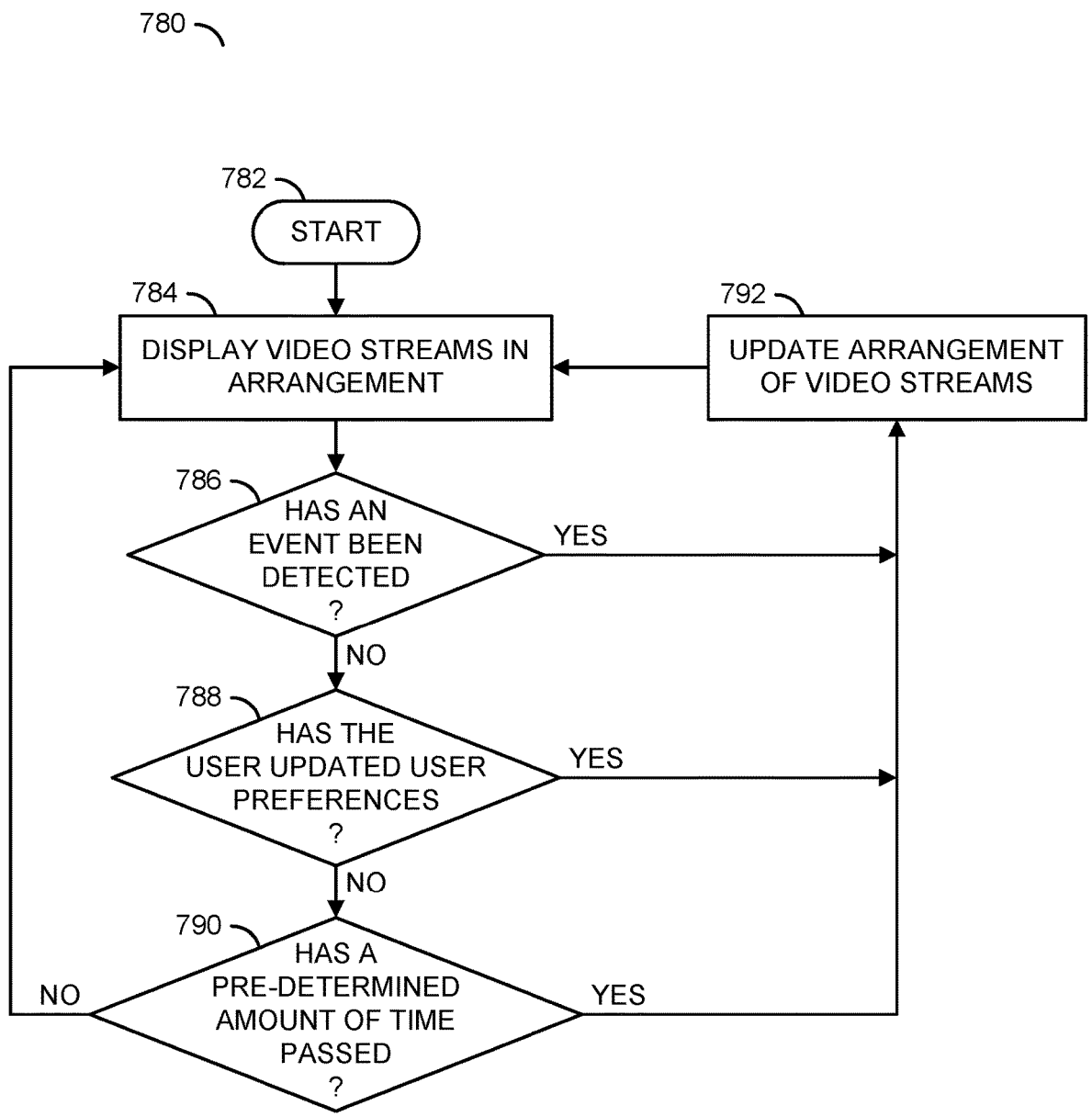
FIG. 18 is a flow diagram illustrating a method for determining an arrangement of video feeds based on various factors.

Referring to FIG. 18, a method (or process) 780 is shown. The method 780 may determine an arrangement of video feeds based on various factors. The method 780 generally comprises a step (or state) 782, a step (or state) 784, a decision step (or state) 786, a decision step (or state) 788, a decision step (or state) 790, and a step (or state) 792.

The step 782 may start the method 780. In the step 784, the video feed monitoring app 130 may display the video streams VS_A-VS_N as the video feeds 260*a*-260*n* in a particular arrangement based on the data from the priority signals PRI_A-PRI_N. Next, the method 780 may move to the decision step 786.

In the decision step 786, the AI model 140 may determine whether an event has been detected. In an example, the AI model 140 may perform the computer vision operations on the video data VD_A-VD_N received from the smart security devices 102*a*-102*n* to detect events. Similarly, the AI model 140 may perform audio analysis based on sounds in the video data VD_A-VD_N. If an event has been detected, then the method 780 may move to the step 792. If an event has not been detected, then the method 780 may move to the decision step 788.

In the decision step 788, the AI model 140 may determine whether the user 302 has updated the user preferences 216. For example, the user 302 may provide a request using the video feed monitoring app 130 to provide the feedback signals FB_A-FB_N to update the user preferences 216. If the user 302 has updated the user preferences 216, then the method 780 may move to the step 792. If the user 302 has not updated the user preferences 216, then the method 780 may move to the decision step 790.

In the decision step 790, the AI model 140 may determine whether a pre-determined amount of time has passed. For example, the AI model 140 may swap in or out various video streams VS_A-VS_N after particular amounts of time (e.g., every minute, every five minutes, every thirty seconds, etc.). If the pre-determined amount of time has not passed, then the method 780 may return to the step 784 (e.g., no update to the arrangement of the video feeds 260a-260n). If the pre-determined amount of time has passed, then the method 780 may move to the step 792.

In the step 792, the AI model 140 may determine the arrangement of the video streams VS_A-VS_N based on the detected events, the user preferences 216 and/or the amount of time that has passed. For example, new events may be moved to a location on the video feed monitoring app 130 that may be more prominent (e.g., the large location 260a shown in association with FIG. 6). In another example, one of the video feeds 260a-260n may remain in the arrangement in response to the user 302 providing the request to pin a particular one of the video feeds 260a-260n to a particular location. The remote devices 104a-104n may present the priority signals PRI_A-PRI_N and the video feed monitoring app 130 may update the arrangement of the video feeds 230a-230n. Next, the method 780 may return to the step 784.

Figure 19:
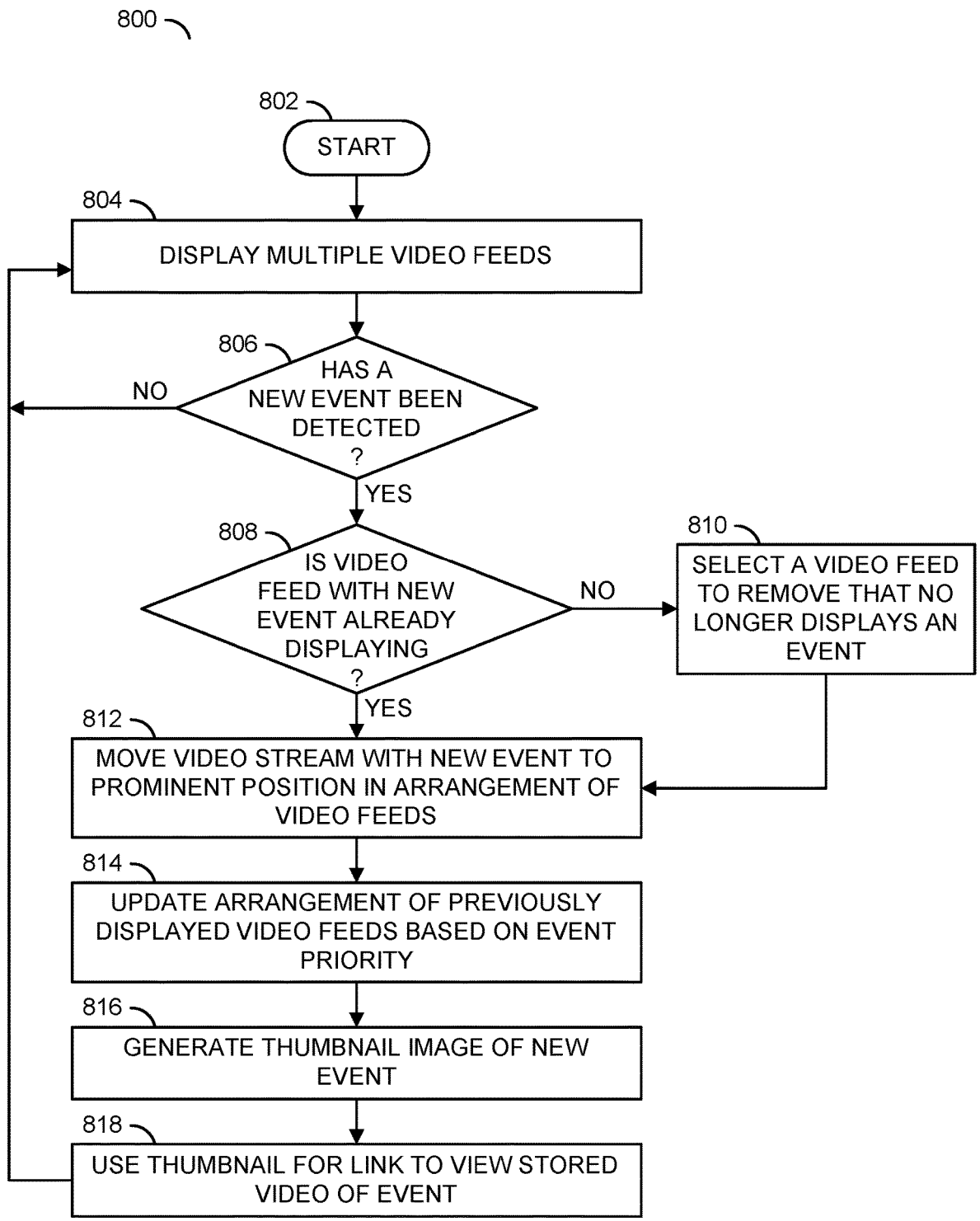
FIG. 19 is a flow diagram illustrating a method for swapping in and removing video feeds from a display interface in response to a detected event.

Referring to FIG. 19, a method (or process) 800 is shown. The method 800 may swap in and remove video feeds from a display interface in response to a detected event. The method 800 generally comprises a step (or state) 802, a step (or state) 804, a decision step (or state) 806, a decision step (or state) 808, a step (or state) 810, a step (or state) 812, a step (or state) 814, a step (or state) 816, and a step (or state) 818.

The step 802 may start the method 800. In the step 804, the video feed monitoring app 130 may display the multiple video feeds 260a-260n simultaneously. Next, the method 800 may move to the decision step 806.

In the decision step 806, the AI model 140 may determine whether there has been a new event detected in the video data VD_A-VD_N. If there has not been a new event detected, then the method 800 may return to the step 804. If there has been a new event detected, then the method 800 may move to the decision step 808.

In the decision step 808, the AI model 140 may determine whether one of the video feeds 260a-260n that is currently displayed on the video feed monitoring app 130 corresponds to the video data VD_A-VD_N with the new event detected. If the new event is already displayed by one of the video feeds 260a-260n, then the method 800 may move to the step 812. If the new event is not currently displayed by one of the video feeds 260a-260n, then the method 800 may move to the step 810. In the step 810, the AI model 140 may select one of the video feeds 260a-260n to remove. The AI model 140 may analyze the video data VD_A-VD_N to determine which of the video feeds 260a-260n do not display an event (or display a low priority event). For example, one of the video feeds 260a-260n may have been displaying an event, but the event has since ended. In another example, one of the video feeds 260a-260n may be one of the video feeds 260a-260n that was rotated in based on the pre-determined amount of time. In yet another example, one of the video feeds 260a-260n may have a low priority event (e.g., an animal detected may be low priority compared to a potential intruder). Next, the method 800 may move to the step 812.

In the step 812, the priority signals PRI_A-PRI_N may indicate which of the video streams VS_A-VS_N comprises the new event. The video feed monitoring app 130 may move the video stream with the new event to a prominent location among the video feeds 260a-260n (e.g., the video feed 260a may be the most readily visible). Next, in the step 814, the video feed monitoring app may update the arrangement of the previously displayed video feeds 260a-260n based on event priority. For example, the video stream that was playing as the video feed 260a may be deprecated to a next highest priority position (e.g., the video feed 260b). One or more of the video streams VS_A-VS_N may be removed from the display of the video feeds 260a-260n (e.g., replaced by the new event video stream). In the step 816, the remote devices 104a-104n may generate a thumbnail image for the new event. The thumbnail image may be stored as part of the video stream storage 210. Next, in the step 818, the video stream monitoring app 130 may use the thumbnail to display a link to the stored video for the new event. For example, the thumbnail may be part of the event thumbnails 392a-392i shown in association with FIG. 7. Next, the method 800 may return to the step 804.

Figure 20:
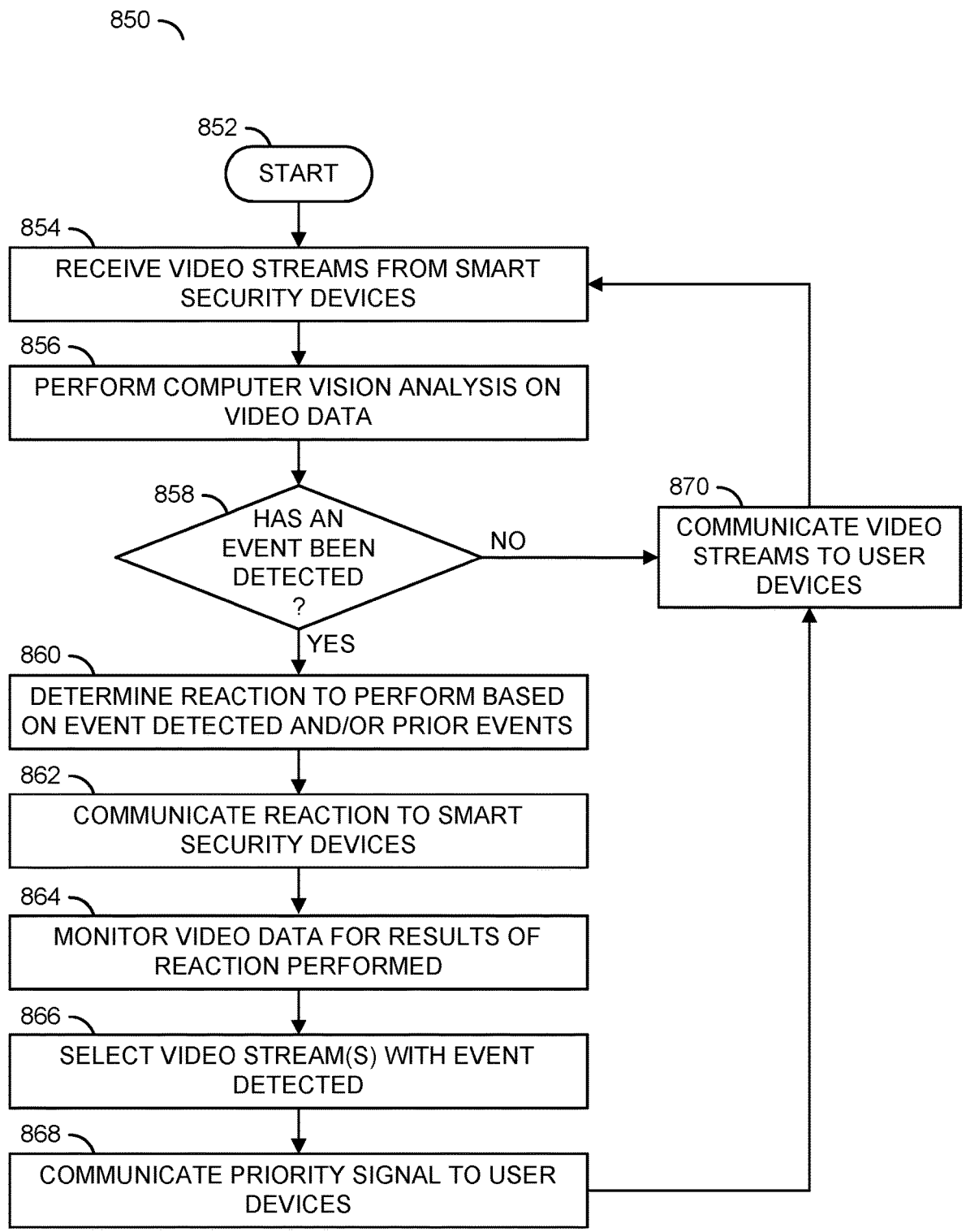
FIG. 20 is a flow diagram illustrating a method for communicating video streams to a video feed monitoring app and communicating reactions to a smart security device.

Referring to FIG. 20, a method (or process) 850 is shown. The method 850 may communicate video streams to a video feed monitoring app and communicate reactions to a smart security device. The method 850 generally comprises a step (or state) 852, a step (or state) 854, a step (or state) 856, a decision step (or state) 858, a step (or state) 860, a step (or state) 862, a step (or state) 864, a step (or state) 866, a step (or state) 868, and a step (or state) 870.

The step 852 may start the method 850. In the step 854, the remote devices 104a-104n may receive the video streams from the smart devices 102a-102n. In an example, each of the smart security devices 102a-102n may present the respective video data VD_A-VD_N to the remote devices 104a-104n. The video data VD_A-VD_N may be stored in the video stream storage 210. Next, in the step 856, the AI model 140 may perform the computer vision analysis on the video data VD_A-VD_N. The results of the computer vision analysis may be stored as the metadata 212. Next, the method 850 may move to the decision step 858.

In the decision step 858, the AI model 140 may determine whether an event has been detected. If an event has not been detected, the method 850 may move to the step 870. If an event has been detected, then the method 850 may move to the step 860. In the step 860, the AI model 140 may determine which of the reactions to perform based on the event detected and/or prior events. For example, the AI model 140 may determine that the event comprises the detection of a burglar based on the behavior and/or characteristics 656a-656n determined using the computer vision operations. In another example, the AI model 140 may determine that the event comprises a loiterer in response to performing computer vision operations on the visitor 50 after one of the reactions have already been performed (e.g., the audio reaction 670a asked the visitor 50 to leave the area and the visitor 50 has not left). Next, in the step 862, the AI model 140 may generate the reaction signals RCT_A-RCT_N to communicate the selected reaction to the appropriate smart security devices 102a-102n. For example, if the AI model 140 determines that the next reaction to perform should be to sound an alarm, the signal RCT_A sent to the smart security device 102a may be an instruction to use the integrated speaker 556 to sound the alarm. Next, the method 850 may move to the step 864.

In the step 864, the AI model 140 may monitor (e.g., continue to perform the computer vision operations on) the video data VD_A-VD_N to determine the results of the reaction performed. For example, if the reaction selected was to sound an alarm, then the AI model 140 may perform the computer vision operations on the video data VD_A-VD_N captured after the alarm was sounded to determine whether the desired result of the visitor 50 leaving the area has occurred. Next, in the step 866, the AI model 140 may select one or more of the video streams VS_A-VS_N (e.g., encoded versions of the video data VD_A-VD_N) that comprises the event detected. For example, if the video stream VS_A corresponds to the detection of the visitor 50 captured by the smart security device 102a, then the video stream VS_A may be selected. Next, the method 850 may move to the step 868.

In the step 868, the remote devices 104a-104n may communicate the priority signals PRI_A-PRI_N to the user devices 106a-106n. The priority signals PRI_A-PRI_N may indicate which of the video streams comprise the event and/or the arrangement to display the video streams VS_A-VS_N. Next, in the step 870, the remote devices 104a-104n may communicate the video streams VS_A-VS_N to the user devices 106a-106n. The video feed monitoring app 130 may use the video streams VS_A-VS_N and the priority signals PRI_A-PRI_N and/or the user settings 216 to arrange the video feeds 260a-260n. Next, the method 850 may return to the step 854.

Figure 21:
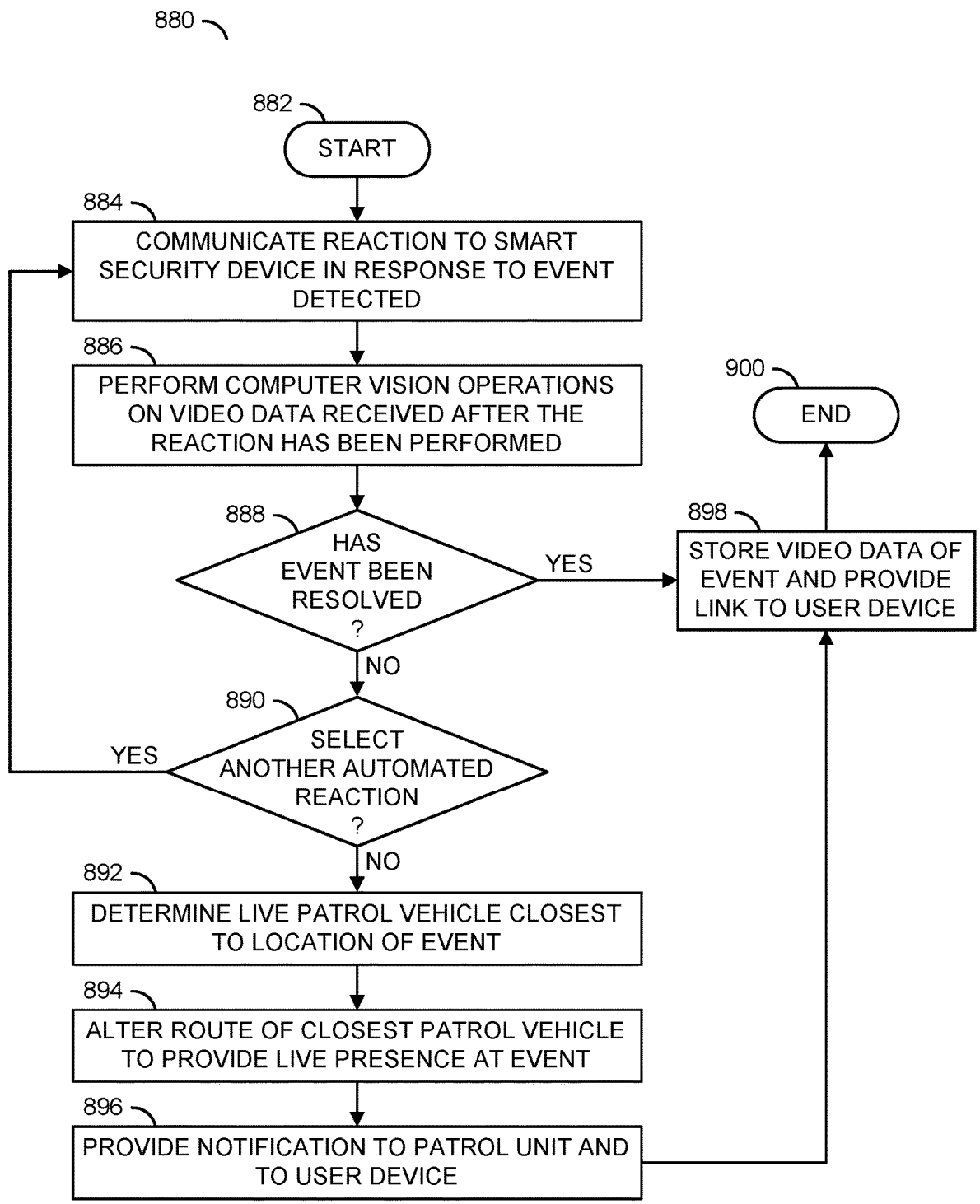
FIG. 21 is a flow diagram illustrating a method for selecting a live reaction based on analysis of an event after automated reactions are performed.

Referring to FIG. 21, a method (or process) 880 is shown. The method 880 may select a live reaction based on analysis of an event after automated reactions are performed. The method 880 generally comprises a step (or state) 882, a step (or state) 884, a step (or state) 886, a decision step (or state) 888, a decision step (or state) 890, a step (or state) 892, a step (or state) 894, a step (or state) 896, a step (or state) 898, and a step (or state) 900.

The step 882 may start the method 880. In the step 884, the remote devices 104a-104n may communicate the reactions selected (e.g., the signals RCT_A-RCT_N) by the AI model 140 to the smart security devices 102a-102n. The reactions may be selected by the AI model 140 in response to events detected using the computer vision operations performed on the video data VD_A-VD_N. Next, in the step 886, the AI model 140 may perform the computer vision operations on the video data VD_A-VD_N received from the smart security devices 102a-102n after the reaction has been performed. For example, the AI model 140 may perform computer vision operations, detect the event, select the reaction to perform and continue to perform computer vision operations to analyze the event during and after the reaction is performed by the smart security devices 102a-102n to determine an outcome and/or result of the reaction. Next, the method 880 may move to the decision step 888.

In the decision step 888, the AI model 140 may determine whether the event has been resolved. In an example, the event may be resolved when the visitor 50 detected leaves the field of view 702a-702b of one of the smart security devices 102a-102n. In another example, the event may be resolved when the property owner lets the visitor 50 into the property. If the event has been resolved, then the method 880 may move to the step 898. If the event has not been resolved, then the method 880 may move to the decision step 890.

In the decision step 890, the AI model 140 may determine whether to select another automated reaction. The automated reactions may be reactions that may be performed by the smart security devices 102a-102n without human interaction. For example, an automated reaction may comprise activating the intense light 530. In another example, an automated reaction may comprise sounding an alarm. In yet another example, the automated reaction may comprise releasing the consumable 564. In still another example, the automated reaction may comprise selecting the audio message 670a that informs the visitor 50 that a photo has been taken and sent to the authorities. If the AI model 140 determines that another one of the automated reactions should be performed, then the method 880 may return to the step 884. For example, the AI model 140 may prefer performing the automated reactions as initial reactions to avoid involving a live patrol guard and/or the receptionist 682. The AI model 140 may prefer escalating automated reactions (e.g., politely asking the visitor 50 to leave, sternly asking the visitor 50 to leave, sounding the alarm, flashing the lights, etc.) until the AI model 140 determines that the event may not be resolved without live intervention. If the AI model 140 determines that no more automated reactions should be performed (e.g., a live intervention may be needed to resolve the event), then the method 880 may move to the step 892.

In the step 892, the AI model 140 may determine which of the patrol vehicles 460a-460b (or a patrol guard on foot) is closest to the smart security device 102a-102n that captured the video data of the event. Next, in the step 894, the AI model 140 may generate the altered route 472 for the selected patrol vehicle 460a-460b (or patrol guard) in order to provide a live presence at the event. In the step 896, the AI model 140 may present a notification to the patrol unit via the video feed monitoring app 130. The notification may inform the patrol unit to follow the altered route 472 to the location of the event. Next, the method 880 may move to the step 898.

In the step 898, the remote devices 104a-104n may store the video data VD_A-VD_N of the event in the video stream storage 210 and provide a link to the event to the user 302 on the video feed monitoring app 130. For example, the link to the event may be one of the event thumbnails 392a-392i. Next, the method 880 may move to the step 900. The step 900 may end the method 880. The functions performed by the diagrams of FIGS. 1-21 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

What is claimed is:

1. A video feed monitoring app configured to be implemented with:
   a user interface configured to enable interaction with an operator, said interaction comprises (i) receiving requests from said operator and (ii) presenting visual content to a display; and
   a processor configured to (i) process said requests received from said user interface, (ii) determine groups of prominence for a plurality of video streams and (iii) update said display, where said video feed monitoring app is configured to:
   (i) receive said plurality of video streams from one or more smart security devices,
   (ii) receive a priority signal,
   (iii) select a subset of said plurality of video streams in response to (a) said priority signal and (b) a user preference,
   (iv) determine said subset of said video streams that are in (a) a first group of said prominence, (b) a second group of said prominence and (c) a third group of said prominence, and
   (iv) arrange said subset of said video streams on said display with (a) said first group of said prominence displayed together with a first size and at a first location, (b) said second group of said prominence displayed together with a second size and at a second location, and (c) said third group of said prominence displayed together with a third size and at a third location, wherein
      (a) said priority signal is generated externally from said video feed monitoring app based on events detected,
      (b) said subset of said video streams in said first group of said prominence, said second group of said prominence and said third group of said prominence are updated based on said priority signal,
      (c) said plurality of video streams not selected as said subset of said video streams are not output on said display, and
      (d) updating said video streams selected as said subset of said video streams comprises displaying said video streams on said display that comprise said events and removing said video streams from said display that do not comprise said events.

2. The video feed monitoring app according to claim 1, wherein (i) said events are detected in response to analysis performed locally by said smart security devices and (ii) said smart security devices are configured to communicate said priority signal to said video feed monitoring app.

3. The video feed monitoring app according to claim 1, wherein (i) said plurality of video streams are communicated to a cloud computing service, (ii) said cloud computing service is configured to detect said events and generate said priority signal and (iii) said plurality of video streams are communicated to said video feed monitoring app with said priority signal after said events are detected by said cloud computing service.

4. The video feed monitoring app according to claim 3, wherein (A) said video feed monitoring app is further configured to (i) receive said requests from said operator, (ii) select said subset of said video streams in response to said requests, (iii) generate a feedback signal comprising information about said requests from said operator and (iv) communicate said feedback signal to said cloud computing service and (B) said cloud computing service is configured to store said video streams.

5. The video feed monitoring app according to claim 4, wherein (i) said cloud computing service is configured to implement an artificial intelligence model for generating said priority signal in response to said events and (ii) said feedback signal provides training data for said artificial intelligence model for selecting said subset of said video streams, said first group of said prominence, said second group of said prominence and said third group of said prominence.

6. The video feed monitoring app according to claim 1, wherein (i) said video feed monitoring app is implemented in response to computer readable instructions executed on a mobile computing device and (ii) said video feed monitoring app is configured to facilitate communication between said mobile computing device and said smart security devices.

7. The video feed monitoring app according to claim 1, wherein said video feed monitoring app is further configured to update said subset of said video streams, said first group of said prominence, said second group of said prominence and said third group of said prominence in response to (a) said priority signal, (b) said requests from said operator and (c) a predetermined amount of time.

8. The video feed monitoring app according to claim 1, wherein said video feed monitoring app is further configured to communicate reactions to said smart security devices in response to said requests received from said operator.

9. The video feed monitoring app according to claim 1, wherein said video feed monitoring app is further configured to display a timestamp along with said video streams.

10. The video feed monitoring app according to claim 1, wherein an artificial intelligence model is configured to (a) detect said events using video analysis and said audio analysis on said plurality of video streams and (b) detect said events on each of said video streams from a plurality of said smart security devices simultaneously.

11. The video feed monitoring app according to claim 10, wherein (i) said video feed monitoring app is used by one or more of monitoring personnel and patrol guards and (ii) said artificial intelligence model is further configured to schedule a patrol route for said patrol guards for locations that implement said smart security devices.

12. The video feed monitoring app according to claim 10, wherein said artificial intelligence model is further configured to (i) monitor a plurality of patrol vehicles, each implementing a computing device with said video feed monitoring app and (ii) provide a notification to one of said computing devices implemented in one of said patrol vehicles closest to one of said events.

13. The video feed monitoring app according to claim 10, wherein said artificial intelligence model is configured to (i) enable communication of said video streams that are part of said subset of said video streams and (ii) disable communication of said video streams that are not part of said subset of said video streams.

14. The video feed monitoring app according to claim 13, wherein (i) said artificial intelligence model is configured to generate thumbnail versions of said video streams that are not part of said subset of said video streams and (ii) communicate said thumbnail versions to a computing device.

15. The video feed monitoring app according to claim 1, wherein (i) said subset of said video streams in said first group of said prominence are output on said display as live video feeds, (ii) said subset of said video streams in said second group of said prominence are output on said display as live thumbnail images that are updated less frequently than said live video feeds and (iii) said subset of said video streams in said third group of said prominence are output on said display as thumbnail images generated from a previous recording of said plurality of video streams.

16. A system comprising:
- a plurality of smart security devices each configured to (i) generate video frames from data captured of an area, (ii) perform reactions at said area in response to events detected using video analysis and audio analysis and (iii) communicate a video stream generated from said video frames; and
- a computing device configured to (i) receive said video streams from said plurality of smart security devices, (ii) receive a priority signal, (iii) select a subset of said video streams in response to (a) said priority signal and (b) a user preference and (iv) determine said subset of said video streams that are in (a) a first group of prominence, (b) a second group of said prominence and (c) a third group of said prominence and (v) arrange said subset of said video streams on a display of said computing device with (a) said first group of said prominence displayed together with a first size and at a first location, (b) said second group of said prominence displayed together with a second size and at a second location, and (c) said third group of said prominence displayed together with a third size and at a third location, wherein
  (a) said priority signal is generated external to said computing device based on said events detected,
  (b) said subset of said video streams in said first group of said prominence, said second group of said prominence and said third group of said prominence are updated based on said priority signal,
  (c) said video streams not selected as said subset of said video streams are not output on said display, and
  (d) updating said video streams selected as said subset of said video streams comprises displaying said video streams that comprise said events and removing said video streams that do not comprise said events.

17. The system according to claim 16, further comprising a remote device, wherein said remote device (i) receives said video streams communicated by said smart security devices, (ii) performs said video analysis and said audio analysis on said video streams, (iii) determines which of said video streams comprises said events, (iv) determines groups of said prominence for said video streams and (v) communicates said priority signal to said computing device.

18. The system according to claim 17, wherein (A) said computing device is configured to (i) receive input from a user, (ii) select said subset of said video streams in response to said input, (iii) generate a feedback signal comprising information about said input from said user and (iv) communicate said feedback signal to said remote device, (B) said remote device is configured to implement an artificial intelligence model for generating said priority signal in response to said events and (C) said feedback signal provides training data for said artificial intelligence model for selecting said subset of said video streams, said first group of said prominence, said second group of said prominence and said third group of said prominence.

19. The system according to claim 16, wherein (i) said computing device is configured to execute computer readable instructions, (ii) said computer readable instructions implement a companion app for said system, (iii) said companion app is configured to facilitate communication between said computing device and said smart security devices and (iv) said companion app is configured to update said subset of said video streams, said first group of said prominence, said second group of said prominence and said third group of said prominence in response to (a) said priority signal, (b) input from a user and (c) a predetermined amount of time.

20. The system according to claim 16, wherein said reactions comprise (i) a plurality of security responses implemented by said smart security devices and (ii) said plurality of security responses comprise at least one of (a) communication using two-way audio, (b) automated audio playback, (c) a siren, (d) flashing LEDs and (e) bright LEDs.

* * * * *